US012723140B2

(12) United States Patent
Rurack et al.

(10) Patent No.: US 12,723,140 B2
(45) Date of Patent: Sep. 1, 2026

(54) PARTICLES CONSISTING OF AN ORGANIC POLYMER CORE, A FIRST INORGANIC OXIDE SHELL INCORPORATING A MAGNETIC MATERIAL AND A MESOPOROUS SECOND INORGANIC SHELL

(71) Applicant: Bundesrepublik Deutschland, vertreten durch den Bundesminister für Wirtschaft und Energie, dieser vertreten durch den präsidenten der bundesantalt für materialforschung und-püfung, Berlin (DE)

(72) Inventors: Knut Rurack, Berlin (DE); Estela Climent Terol, Berlin (DE); Charlie Tobias, Berlin (DE)

(73) Assignee: Bundesrepublik Deutschland, vertreten durch den Bundesminister für Wirtschaft und Energie, dieser vertreten durch den Präsidenten der Bundesanstalt für Materialforschung und -prüfung, (BAM), Berlin (DE)

( * ) Notice: Subject to any disclaimer, the term of this patent is extended or adjusted under 35 U.S.C. 154(b) by 694 days.

(21) Appl. No.: 18/265,830

(22) PCT Filed: Nov. 25, 2021

(86) PCT No.: PCT/EP2021/083014

§ 371 (c)(1),
(2) Date: Jun. 7, 2023

(87) PCT Pub. No.: WO2022/122400

PCT Pub. Date: Jun. 16, 2022

(65) Prior Publication Data

US 2025/0270377 A1 Aug. 28, 2025

(30) Foreign Application Priority Data

Dec. 7, 2020 (DE) ......................... 102020132495.2

(51) Int. Cl.
*C08J 7/06* (2006.01)
*C08K 3/36* (2006.01)
(Continued)

(52) U.S. Cl.
CPC .................. *C08J 7/06* (2013.01); *C08K 3/36* (2013.01); *C08K 9/06* (2013.01); *C08J 2339/06* (2013.01);
(Continued)

(58) Field of Classification Search
None
See application file for complete search history.

(56) References Cited

U.S. PATENT DOCUMENTS

2019/0091647 A1* 3/2019 Sarma ...................... B01J 13/02

OTHER PUBLICATIONS

Magnetic mesoporous silica nanospheres as DNA/Drug carrier, Materials Letters, 67, (2012) 379-382 to Zhang et al. hereinafter "Zhang". (Year: 2012).*

* cited by examiner

*Primary Examiner* — Peter A Salamon
(74) *Attorney, Agent, or Firm* — Bachman & LaPointe, P.C.

(57) ABSTRACT

A core-shell particle having an organic polymer core which is completely covered by a first inorganic oxide shell, wherein the first inorganic oxide shell has a silica (SiO2), an alumina (Al2O3), or a titania (TiO2); wherein the first inorganic oxide shell has a layer of a magnetic material which is disposed directly on the polymer core; further having a mesoporous second inorganic oxide shell, wherein the mesoporous second inorganic oxide shell covers the first
(Continued)

inorganic oxide shell; wherein the mesoporous second inorganic oxide shell has silica (SiO2), alumina (Al2O3), or a titania (TiO2).

20 Claims, 38 Drawing Sheets

Specification includes a Sequence Listing.

(51) Int. Cl.
*C08K 9/06* (2006.01)
*C08K 3/22* (2006.01)
(52) U.S. Cl.
CPC ................ *C08K 2003/2227* (2013.01); *C08K 2003/2241* (2013.01)

| Material |  | Analyte  |  |
|---|---|---|---|
| pH-SRG-M-PS10<br>pH-SRG-S-PS10 |  | pH change |  |
| Hg-SRG-M-PS10 |  | Hg(II) |  |
| Pen-SRG-M-PS10 | $(EtO)_3$-Si-$(CH_2)_3$-NH-COOH-C10-TTT TCT GAA TTG GAT CTC TCT TCT TGA GCG ATC TCC ACA | Penicillin | $(EtO)_3$-Si-$(CH_2)_3$-NH-COOH-C10-TTT TCT GAA TTG GAT CTC TCT TCT TGA GCG ATC TCC ACA + Penicillin |

SEQUENCE LISTING

<160> NUMBER OF SEQ ID NOS: 20

<210> SEQ ID NO 1
<211> LENGTH: 18
<212> TYPE: DNA
<213> ORGANISM: artificial sequence
<220> FEATURE:
<223> OTHER INFORMATION: 54-C6-Amino Linker - cDNA
<300> PUBLICATION INFORMATION:
<301> AUTHORS: Dominik Sarma, Kornelia Gawlitza and Knut Rurack
<302> TITLE: Polystyrene Core#Silica Shell Particles with Defined
Nanoarchitectures as a Versatile Platform for Suspension Array
Technology
<303> JOURNAL: Langmuir
<304> VOLUME: 32
<305> ISSUE: 15
<306> PAGES: 3717-3727
<307> DATE: 2016-03-26
<308> DATABASE ACCESSION NUMBER: 10.1021/acs.langmuir.6b00373
<309> DATABASE ENTRY DATE: 2016-02-02

<400> SEQUENCE: 1
tttatgtcgt ttgctgta 18

<210> SEQ ID NO 2
<211> LENGTH: 12
<212> TYPE: DNA
<213> ORGANISM: artificial sequence
<220> FEATURE:
<223> OTHER INFORMATION: 5-carboxy C10 linker - c9DNA

<400> SEQUENCE: 2
tttatgtcgt tt 12

<210> SEQ ID NO 3
<211> LENGTH: 18
<212> TYPE: DNA
<213> ORGANISM: artificial sequence
<220> FEATURE:
<223> OTHER INFORMATION: 54-carboxy C10 linker - c15DNA

<400> SEQUENCE: 3
tttatgtcgt ttgctgta 18

<210> SEQ ID NO 4
<211> LENGTH: 15
<212> TYPE: DNA
<213> ORGANISM: artificial sequence
<220> FEATURE:
<223> OTHER INFORMATION: 54-6-carboxyfluorescein (FAM) modification -
tDNA
<300> PUBLICATION INFORMATION:
<301> AUTHORS: Dominik Sarma Kornelia Gawlitza and Knut Rurack
<302> TITLE: Polystyrene Core Silica Shell Particles with Defined
Nanoarchitectures as a Versatile Platform for Suspension
Array Technology
<303> JOURNAL: Langmuir
<304> VOLUME: 32
<305> ISSUE: 15

```
<306> PAGES: 3717-3727
<307> DATE: 2016-03-26
<308> DATABASE ACCESSION NUMBER: 10.1021/acs.langmuir.6b00373
<309> DATABASE ENTRY DATE: 2016-02-02

<400> SEQUENCE: 4

tacagcaaac gacat                                                    15


<210> SEQ ID NO 5
<211> LENGTH: 9
<212> TYPE: DNA
<213> ORGANISM: artificial sequence
<220> FEATURE:
<223> OTHER INFORMATION: 54-6-carboxyfluorescein (FAM) modification -
      tDNA

<400> SEQUENCE: 5

aaacgacat                                                            9


<210> SEQ ID NO 6
<211> LENGTH: 15
<212> TYPE: DNA
<213> ORGANISM: artificial sequence
<220> FEATURE:
<223> OTHER INFORMATION: 54-6-carboxyfluorescein (FAM) modification, one
      mismatching Base
      comparing to tDNA - t-DNA-1M-Center

<400> SEQUENCE: 6

tacagcagac gacat                                                    15


<210> SEQ ID NO 7
<211> LENGTH: 15
<212> TYPE: DNA
<213> ORGANISM: artificial sequence
<220> FEATURE:
<223> OTHER INFORMATION: 54-6-carboxyfluorescein (FAM) modification, one
      mismatching Base
      comparing to tDNA - t-DNA-1M-3End

<400> SEQUENCE: 7

tacagcaaac gacgt                                                    15


<210> SEQ ID NO 8
<211> LENGTH: 15
<212> TYPE: DNA
<213> ORGANISM: artificial sequence
<220> FEATURE:
<223> OTHER INFORMATION: 54-6-carboxyfluorescein (FAM) modification, two
      mismatching Bases
      comparing to tDNA - t-DNA-2M

<400> SEQUENCE: 8

tacagcagac gacgt                                                    15


<210> SEQ ID NO 9
<211> LENGTH: 15
<212> TYPE: DNA
<213> ORGANISM: artificial sequence
<220> FEATURE:
<223> OTHER INFORMATION: 54-6-carboxyfluorescein (FAM) modification,
      four mismatching Bases comparing to tDNA - t-DNA-4M

<400> SEQUENCE: 9

tgcagcagac ggcgt                                                    15


<210> SEQ ID NO 10
```

```
<211> LENGTH: 22
<212> TYPE: DNA
<213> ORGANISM: artificial sequence
<220> FEATURE:
<223> OTHER INFORMATION: 54-C6-Amino Linker - HPV6
<300> PUBLICATION INFORMATION:
<301> AUTHORS: Nubia Munoz, M.D., F. Xavier Bosch, M.D., Silvia de
      Sanjose, M.D., Rolando Herrero, M.D., Xavier Castellsague, M.D.,
      Keerti V. Shah, Ph.D., Peter J.F. Snijders, Ph.D., and Chris
      J.L.M. Meijer, M.D. for the International Agency for Research on
      Cancer Multicenter Cervical Cancer Study Group
<302> TITLE: Epidemiologic Classification of Human Papillomavirus Types
      Associated with Cervical Cancer
<303> JOURNAL: The New England Journal of Medicine
<304> VOLUME: 348
<305> ISSUE: 6
<306> PAGES: 518-527
<307> DATE: 2003-02-06
<308> DATABASE ACCESSION NUMBER: 10.1056/NEJMoa021641
<309> DATABASE ENTRY DATE: 2003-02-06

<400> SEQUENCE: 10

ttttccgtaa ctacatcttc ca                                              22


<210> SEQ ID NO 11
<211> LENGTH: 19
<212> TYPE: DNA
<213> ORGANISM: artificial sequence
<220> FEATURE:
<223> OTHER INFORMATION: 54-6-carboxyfluorescein (FAM) modification -
      HPV6RC
<300> PUBLICATION INFORMATION:
<301> AUTHORS: Nubia Munoz, M.D., F. Xavier Bosch, M.D., Silvia de
      Sanjose, M.D., Rolando Herrero, M.D., Xavier Castellsague, M.D.,
      Keerti V. Shah, Ph.D., Peter J.F. Snijders, Ph.D., and Chris
      J.L.M. Meijer, M.D. for the International Agency for Research on
      Cancer Multicenter Cervical Cancer Study Group
<302> TITLE: Epidemiologic Classification of Human Papillomavirus Types
      Associated with Cervical Cancer
<303> JOURNAL: The New England Journal of Medicine
<304> VOLUME: 348
<305> ISSUE: 6
<306> PAGES: 518-527
<307> DATE: 2003-02-06
<308> DATABASE ACCESSION NUMBER: 10.1056/NEJMoa021641
<309> DATABASE ENTRY DATE: 2003-02-06

<400> SEQUENCE: 11

tggaagatgt agttacgga                                                  19


<210> SEQ ID NO 12
<211> LENGTH: 23
<212> TYPE: DNA
<213> ORGANISM: artificial sequence
<220> FEATURE:
<223> OTHER INFORMATION: 54-C6-Amino Linker - HPV11
<300> PUBLICATION INFORMATION:
<301> AUTHORS: Nubia Munoz, M.D., F. Xavier Bosch, M.D., Silvia de
      Sanjose, M.D., Rolando Herrero, M.D., Xavier Castellsague, M.D.,
      Keerti V. Shah, Ph.D., Peter J.F. Snijders, Ph.D., and Chris
      J.L.M. Meijer, M.D. for the International Agency for Research on
      Cancer Multicenter Cervical Cancer Study Group
<302> TITLE: Epidemiologic Classification of Human Papillomavirus Types
      Associated with Cervical Cancer
<303> JOURNAL: The New England Journal of Medicine
<304> VOLUME: 348
<305> ISSUE: 6
<306> PAGES: 518-527
<307> DATE: 2003-02-06
<308> DATABASE ACCESSION NUMBER: 10.1056/NEJMoa021641
<309> DATABASE ENTRY DATE: 2003-02-06

<400> SEQUENCE: 12

ttttctgtgt ctaaatctgc tac                                             23
```

```
<210> SEQ ID NO 13
<211> LENGTH: 20
<212> TYPE: DNA
<213> ORGANISM: artificial sequence
<220> FEATURE:
<223> OTHER INFORMATION: 54-6-carboxyfluorescein (FAM) modification -
      HPV11RC
<300> PUBLICATION INFORMATION:
<301> AUTHORS: Nubia Munoz, M.D., F. Xavier Bosch, M.D., Silvia de
      Sanjose, M.D., Rolando Herrero, M.D., Xavier Castellsague, M.D.,
      Keerti V. Shah, Ph.D., Peter J.F. Snijders, Ph.D., and Chris
      J.L.M. Meijer, M.D. for the International Agency for Research on
      Cancer Multicenter Cervical Cancer Study Group
<302> TITLE: Epidemiologic Classification of Human Papillomavirus Types
      Associated with Cervical Cancer
<303> JOURNAL: The New England Journal of Medicine
<304> VOLUME: 348
<305> ISSUE: 6
<306> PAGES: 518-527
<307> DATE: 2003-02-06
<308> DATABASE ACCESSION NUMBER: 10.1056/NEJMoa021641
<309> DATABASE ENTRY DATE: 2003-02-06

<400> SEQUENCE: 13

gtagcagatt tagacacaga                                                 20


<210> SEQ ID NO 14
<211> LENGTH: 21
<212> TYPE: DNA
<213> ORGANISM: artificial sequence
<220> FEATURE:
<223> OTHER INFORMATION: 54-C6-Amino Linker - HPV16
<300> PUBLICATION INFORMATION:
<301> AUTHORS: Nubia Munoz, M.D., F. Xavier Bosch, M.D., Silvia de
      Sanjose, M.D., Rolando Herrero, M.D., Xavier Castellsague, M.D.,
      Keerti V. Shah, Ph.D., Peter J.F. Snijders, Ph.D., and Chris
      J.L.M. Meijer, M.D. for the International Agency for Research on
      Cancer Multicenter Cervical Cancer Study Group
<302> TITLE: Epidemiologic Classification of Human Papillomavirus Types
      Associated with Cervical Cancer
<303> JOURNAL: The New England Journal of Medicine
<304> VOLUME: 348
<305> ISSUE: 6
<306> PAGES: 518-527
<307> DATE: 2003-02-06
<308> DATABASE ACCESSION NUMBER: 10.1056/NEJMoa021641
<309> DATABASE ENTRY DATE: 2003-02-06

<400> SEQUENCE: 14

ttttacctac gacatgggga g                                               21


<210> SEQ ID NO 15
<211> LENGTH: 18
<212> TYPE: DNA
<213> ORGANISM: artificial sequence
<220> FEATURE:
<223> OTHER INFORMATION: 54-6-carboxyfluorescein (FAM) modification -
      HPV16RC
<300> PUBLICATION INFORMATION:
<301> AUTHORS: Nubia Munoz, M.D., F. Xavier Bosch, M.D., Silvia de
      Sanjose, M.D., Rolando Herrero, M.D., Xavier Castellsague, M.D.,
      Keerti V. Shah, Ph.D., Peter J.F. Snijders, Ph.D., and Chris
      J.L.M. Meijer, M.D. for the International Agency for Research on
      Cancer Multicenter Cervical Cancer Study Group
<302> TITLE: Epidemiologic Classification of Human Papillomavirus Types
      Associated with Cervical Cancer
<303> JOURNAL: The New England Journal of Medicine
<304> VOLUME: 348
<305> ISSUE: 6
<306> PAGES: 518-527
<307> DATE: 2003-02-06
<308> DATABASE ACCESSION NUMBER: 10.1056/NEJMoa021641
<309> DATABASE ENTRY DATE: 2003-02-06
```

<400> SEQUENCE: 15
ctccccatgt cgtaggta 18

<210> SEQ ID NO 16
<211> LENGTH: 22
<212> TYPE: DNA
<213> ORGANISM: artificial sequence
<220> FEATURE:
<223> OTHER INFORMATION: 54-C6-Amino Linker - HPV18
<300> PUBLICATION INFORMATION:
<301> AUTHORS: Nubia Munoz, M.D., F. Xavier Bosch, M.D., Silvia de Sanjose, M.D., Rolando Herrero, M.D., Xavier Castellsague, M.D., Keerti V. Shah, Ph.D., Peter J.F. Snijders, Ph.D., and Chris J.L.M. Meijer, M.D. for the International Agency for Research on Cancer Multicenter Cervical Cancer Study Group
<302> TITLE: Epidemiologic Classification of Human Papillomavirus Types Associated with Cervical Cancer
<303> JOURNAL: The New England Journal of Medicine
<304> VOLUME: 348
<305> ISSUE: 6
<306> PAGES: 518-527
<307> DATE: 2003-02-06
<308> DATABASE ACCESSION NUMBER: 10.1056/NEJMoa021641
<309> DATABASE ENTRY DATE: 2003-02-06

<400> SEQUENCE: 16
ttttgcttct acacagtctc ct 22

<210> SEQ ID NO 17
<211> LENGTH: 19
<212> TYPE: DNA
<213> ORGANISM: artificial sequence
<220> FEATURE:
<223> OTHER INFORMATION: 54-6-carboxyfluorescein (FAM) modification - HPV18RC
<300> PUBLICATION INFORMATION:
<301> AUTHORS: Nubia Munoz, M.D., F. Xavier Bosch, M.D., Silvia de Sanjose, M.D., Rolando Herrero, M.D., Xavier Castellsague, M.D., Keerti V. Shah, Ph.D., Peter J.F. Snijders, Ph.D., and Chris J.L.M. Meijer, M.D. for the International Agency for Research on Cancer Multicenter Cervical Cancer Study Group
<302> TITLE: Epidemiologic Classification of Human Papillomavirus Types Associated with Cervical Cancer
<303> JOURNAL: The New England Journal of Medicine
<304> VOLUME: 348
<305> ISSUE: 6
<306> PAGES: 518-527
<307> DATE: 2003-02-06
<308> DATABASE ACCESSION NUMBER: 10.1056/NEJMoa021641
<309> DATABASE ENTRY DATE: 2003-02-06

<400> SEQUENCE: 17
aggagactgt gtagaagca 19

<210> SEQ ID NO 18
<211> LENGTH: 31
<212> TYPE: DNA
<213> ORGANISM: artificial sequence
<220> FEATURE:
<221> NAME/KEY: misc_feature
<222> LOCATION: (28) ... (28)
<223> OTHER INFORMATION: 54-6-carboxyfluorescein (FAM) modification - 34-4-((4-(dimethylamino)phenyl)azo) benzoic Acid (DABCYL) modification - DNA beacon - n at position 28 stays for the modified nucleotide thymidine which is modified at the 5' position with a hexyl chain ending in a primary amine, also called "amc6dt", corresponding to a modified thymine with a spacer; concretely a thymine-acrylamido-C6-NH2 linker
<300> PUBLICATION INFORMATION:
<301> AUTHORS: S Turner, K M Pryer, V P Miao, J D Palmer
<302> TITLE: Investigating deep phylogenetic relationships among cyanobacteria and plastids by small subunit rRNA sequence analysis -continued <303> JOURNAL: J Eukaryot Microbiol
<304> VOLUME: 46
<305> ISSUE: 4
<306> PAGES: 327 - 338
<307> DATE: 1999-08-01
<308> DATABASE ACCESSION NUMBER: 10.1111/j.1550-7408.1999.tb04612.x
<309> DATABASE ENTRY DATE: 1999-08-01

<400> SEQUENCE: 18
tagaagggtt accttgttac gacttctnct a 31

<210> SEQ ID NO 19
<211> LENGTH: 19
<212> TYPE: DNA
<213> ORGANISM: artificial sequence
<220> FEATURE:
<223> OTHER INFORMATION: rc-DNA beacon

<400> SEQUENCE: 19
aagtcgtaac aaggtaacc 19

<210> SEQ ID NO 20
<211> LENGTH: 39
<212> TYPE: DNA
<213> ORGANISM: artificial sequence
<220> FEATURE:
<223> OTHER INFORMATION: 54-carboxy C10 linker - Pen-COOH
<300> PUBLICATION INFORMATION:
<301> AUTHORS: Juan Zhao, Wenjuan Guo, Meishan Peia and Feng Ding
<302> TITLE: GR#Fe3O4NPs and PEDOT#AuNPs composite based electrochemical
aptasensor for the sensitive detection of penicillin
<303> JOURNAL: Analytical Methods
<304> VOLUME: 8
<305> ISSUE: 22
<306> PAGES: 4391 - 4397
<307> DATE: 2016-05-10
<308> DATABASE ACCESSION NUMBER: 10.1039/c6ay00555a
<309> DATABASE ENTRY DATE: 2016-05-10

<400> SEQUENCE: 20
ttttctgaat tggatctctc ttcttgagcg atctccaca 39

PARTICLES CONSISTING OF AN ORGANIC POLYMER CORE, A FIRST INORGANIC OXIDE SHELL INCORPORATING A MAGNETIC MATERIAL AND A MESOPOROUS SECOND INORGANIC SHELL

INCORPORATION BY REFERENCE OF ASCII TEXT FILE

This application incorporates-by-reference all material in the ASCII text file filed herewith and named 23-164_seq_jan_2024.txt. This file was created on Jan. 31, 2024, and the size of the file is 10.0 KB.

FIELD AND BACKGROUND

The present invention relates to the design of core-shell particles and their use in multiplexed assays, particularly to the design and synthesis of an inorganic shell disposed on a polymer core.

Methods for the rapid and sensitive detection of priority analytes are gaining importance in different fields such as medical diagnostics, environmental monitoring, safety/security, occupational health, food sectors, even forensics.

Among all of the methods employed, bead-based assays are well established and popular because of fast reaction kinetics, small sample amounts needed and the variety of possible architectures of the carrier materials. The beads, i.e. particles, are commonly used in different microfluidic formats, which combine fast automated analysis with high throughput, like, e.g., flow cytometry. Typically, polystyrene or silica particles are used as carrier platforms for their low costs, commercial availability in large batches and different sizes. Polystyrene particles possess excellent scattering properties due to their high refractive index, which aligns with the requirements of flow cytometry. In addition, the incorporation of fluorescent dyes for multiplexing purposes is comparatively easy, but their chemical modification is rather tedious and inflexible. On the other hand, silica particles, despite their lower refractive index can easily be modified via silane chemistry. Thus, due to the limitations of the existing particles, the employment of core-shell particles that combines excellent scattering properties with a straightforward modification is highly desirable, and some examples of polystyrene/silica core-shell particles have been disclosed already, e.g. in U.S. Pat. No. 6,103,379 A and DE 10 2016 105 122 A1. However, their particles are not magnetic, not coded and comprise only a plain silica shell.

The incorporation of magnetic properties as well as the incorporation of a mesoporous shell on one hand facilitate very much the handling of the particles—simply by using magnets—and the sensitivity of an assay, because of the strongly increased surface area in a mesoporous shell compared to a plain shell, allowing for the attachment of many more probe or reporter molecules as well as for the implementation of delivery functions.

Different procedures have been reported to obtain magnetic core-shell particles with a mesoporous silica shell. CN 101236816 A discloses the synthesis of a magnetic inner core in a mesoporous hollow ball, whereas CN 106710773 A discloses monodisperse magnetic porous silica pellets. In both cases there is no polystyrene core. Therefore, their employment for multiplexing purposes is limited.

SUMMARY OF THE INVENTION

According to an embodiment a core-shell particle is suggested which comprises an organic polymer core which is completely covered by a first inorganic oxide shell and which optionally contains an organic dye immobilized in it. The inorganic oxide of the first inorganic oxide shell is selected from: a silica ($SiO_2$), an alumina ($Al_2O_3$), and a titania ($TiO_2$), wherein the first inorganic oxide shell further comprises a layer of a magnetic material which is disposed directly on the polymer core. The core-shell particle further comprises a mesoporous second inorganic oxide shell, which covers the first inorganic oxide shell; wherein the mesoporous second inorganic oxide shell also comprises a silica ($SiO_2$), a titania ($TiO_2$), or an alumina ($Al_2O_3$).

According to an embodiment, a method for producing the core-shell particle according to any of the embodiments mentioned above is suggested. The method comprises:

- providing a core comprising an organic polymer material, wherein the organic polymer material optionally comprises an organic dye immobilized in the core;
- depositing a first layer comprising a magnetic material on the core which does not completely cover the core;
- producing a first inorganic oxide shell comprising a silica ($SiO_2$), an alumina ($Al_2O_3$), or a titania ($TiO_2$) directly on the layer comprising the magnetic material and on a surface of the polymer core which is not covered by the layer comprising the magnetic material, so that the silica, the alumina and the titania are covering the magnetic layer completely as a substantially closed shell; and
- producing a mesoporous second inorganic oxide shell, wherein the mesoporous second inorganic oxide shell covers the first inorganic oxide shell; and wherein the mesoporous second inorganic oxide shell comprises silica ($SiO_2$), alumina ($Al_2O_3$), or titania ($TiO_2$).

According to an embodiment, a method for detecting an analyte is suggested, wherein the method comprises:

- providing a core-shell particle as disclosed herein;
- wetting the particle with a sample comprising an unknown concentration of the analyte; and
- detecting a signal generated by recognition of a fluorescently labeled analyte by a recognition unit which is coupled to the mesoporous second inorganic shell; or
- detecting a signal generated by recognition of an analyte by a reporter which is coupled to the mesoporous second inorganic shell, wherein the reporter changes its color, fluorescence, electrochemically generated luminescence or redox behavior upon analyte binding; or
- detecting a signal generated by a reporter which is released from the mesoporous second inorganic oxide shell upon analyte recognition by a pore closing material.

BRIEF DESCRIPTION OF THE DRAWINGS

A full and enabling disclosure of the present invention, including the best mode thereof, to one of ordinary skill in the art, is set forth more particularly in the remainder of the description, including reference to the accompanying figures.

FIG. 1B, panel b) illustrates a second embodiment comprising a second synthetic route to core-shell particles. Particularly, [i.—optional doping of particles synthesized from polystyrene and PVP (PSXY) with dye (I or II);] ii. and iii.—assembling a mesoporous silica shell by first creating the templating by using micelle-forming templating agents (MFT) and, if indicated, structure-directing mediators (SDM) before convergently growing the silica shell by using TEOS; and iv.—removing the MFT by washing (Z@PSXY).

FIG. 1C, panel b) illustrates a second embodiment comprising the functionalization of the core-shell particles. Particularly, i.—removing the MFT by washing; ii.—coupling a first molecule, e.g. a reporter molecule to the inner and outer pore surface; and iii.—coupling a second molecule, e.g. a surface-property modulating molecule such as a passivating or antifouling agent to the inner and outer pore surface. Alternatively, steps ii. and iii. can be interchanged.

FIG. 1C, panel c) illustrates a third embodiment comprising the functionalization of the core-shell particles. Particularly, i.—removing the MFT by washing; and ii.—coupling of two functional molecules, e.g. a reporter molecule and an antifouling agent to the inner and outer pore surface in a single step. FIG. 1C, panel d) illustrates a fourth embodiment comprising the functionalization of the core-shell particles. Particularly, i.—coupling a first molecule, e.g. a surface-property modulating molecule such as a passivating or antifouling agent only to the outer pore surface; ii.—removing the MFT by washing; and iii.—coupling a second molecule, e.g. a reporter molecule only to the inner pore surface. According to embodiments polyethylene glycol (PEG) comprising 6 through 40 ethylene glycol units, preferably 6 through 9 ethylene glycol units, can be used as an antifouling agent. It can be coupled to the corresponding surface, e.g., starting out from a (3-[methoxy(polyethylene oxy)propyl]trimethoxy silane, comprising, e.g., six to forty ethylene glycol units ($PEG_{6-40}$-PTMS).

FIG. 1D, panel b) illustrates another embodiment comprising a preparation method of gated materials. Particularly, i.—removing the MFT by washing; ii.—coupling an anchor molecule to the inner and outer pore surface; iii.—loading the pores with an indicator molecule; and iv.—closing the pores with a pore-closing material. FIG. 1D, panel c) illustrates another embodiment comprising a preparation method of gated materials as suggested. Particularly, i.—coupling a first molecule, e.g. an anchor molecule only to the outer pore surface; ii.—removing the MFT by washing; iii.—coupling a second molecule, e.g. a surface-property modulating molecule such as a passivating agent only to the inner pore surface; iv.—loading the pores with an indicator molecule; and v.—closing the pores with a pore-closing material.

Figure 1A:
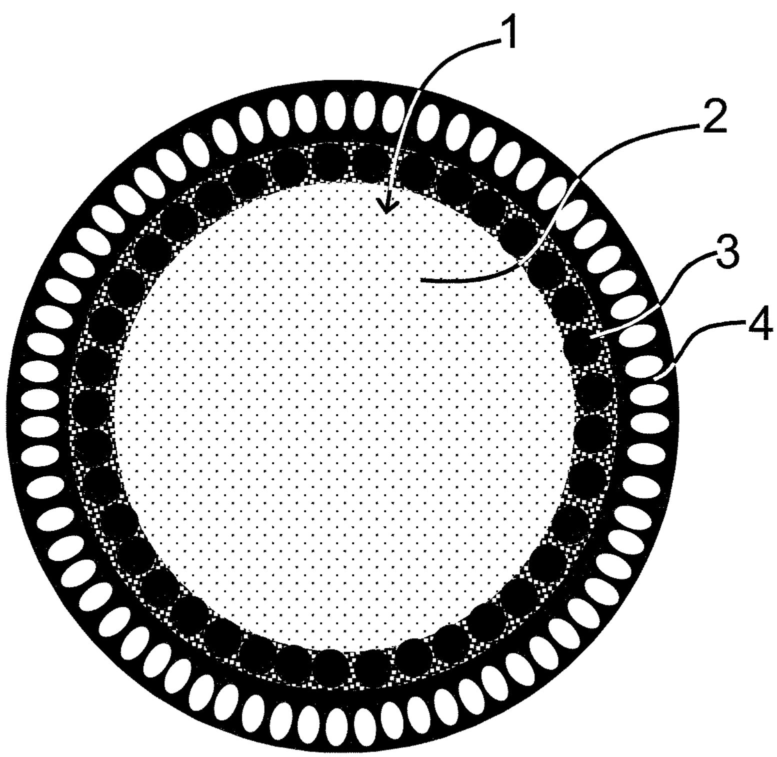
FIG. 1A illustrates the architecture of the core-shell particles as suggested. Particularly, 1—designates the polymer core; 2—designates the dye entrapped within or coupled to the core; 3—designates the magnetic material within a first inorganic shell which covers the polymer core; and 4—designates a mesoporous second inorganic shell.
Figure 1B:
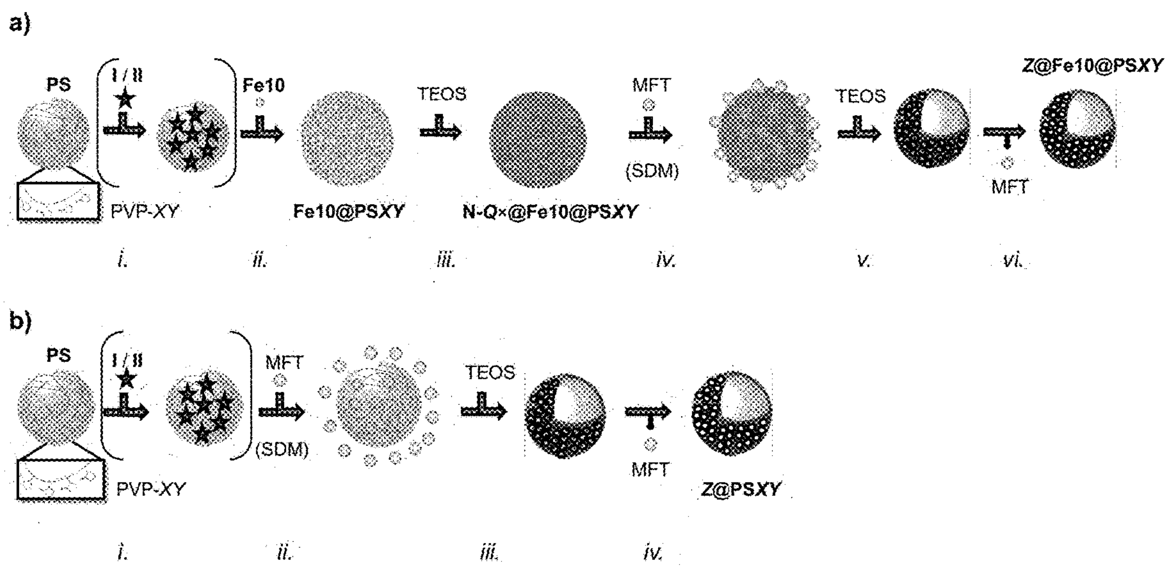
FIG. 1B, panel a) illustrates a first embodiment comprising a first synthetic route to core-shell particles. Particularly, [i.—optional doping of particles synthesized from polystyrene and PVP10 or PVP 40, i.e., PVP with an average molecular weight of 10 kD or 40 kD, (PSXY) (XY=10, 40) with dye (I or II);] ii.—assembling a first shell using the magnetic material (Fe10); iii.—stabilizing the first shell with silica nanoparticles (N-Q×@Fe10@PSXY); iv. and v.—assembling a second mesoporous silica shell by first creating the templating by using micelle-forming templating agents (MFT) and, if indicated, structure-directing mediators (SDM) before convergently growing the silica shell by using TEOS; and vi.—removing the MFT by washing (Z@Fe10@PSXY).
Figure 1C:
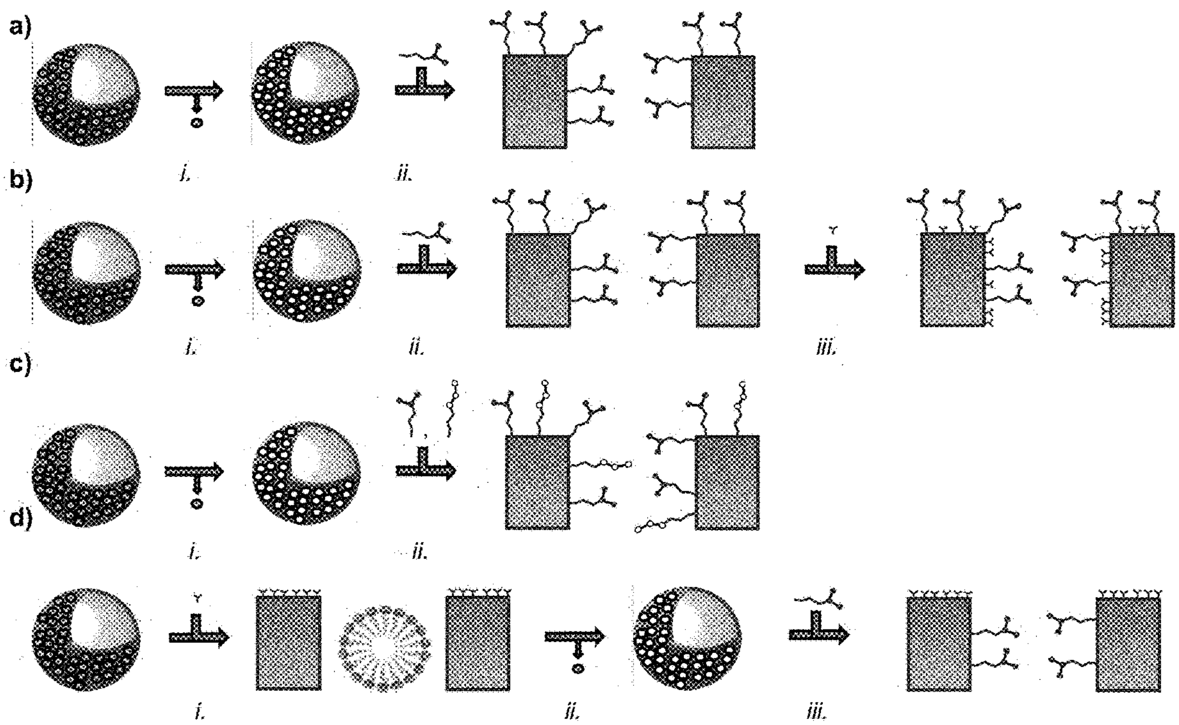
FIG. 1C, panel a) illustrates a first embodiment comprising the functionalization of core-shell particles. Particularly, i.—removing the MFT by washing; and ii.—coupling a reporter molecule to the inner and outer pore surface.
Figure 1D:
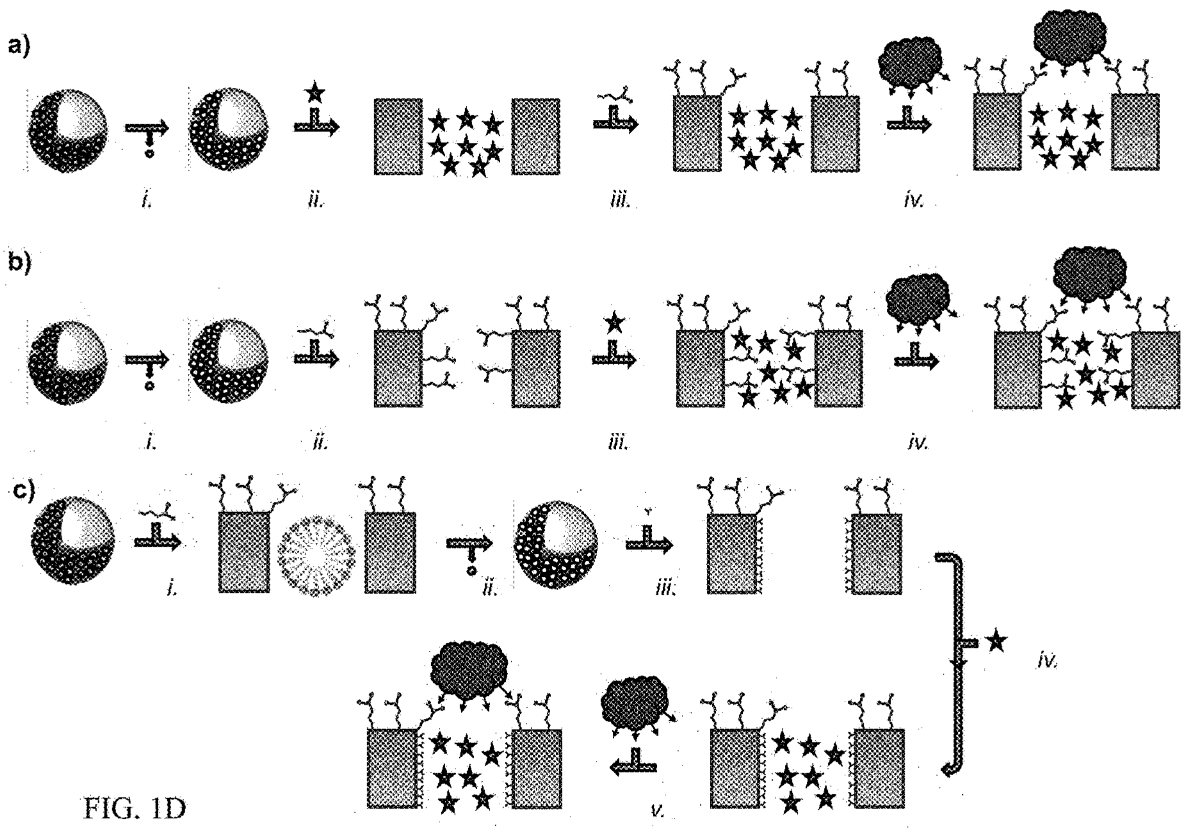
FIG. 1D, panel a) illustrates an embodiment comprising a first preparation method of gated materials. Particularly, i.—removing the MFT by washing; ii.—loading the pores with an indicator molecule; iii.—coupling an anchor molecule only to the outer pore surface; and iv.—closing the pores with a pore-closing material.
Figure 2:
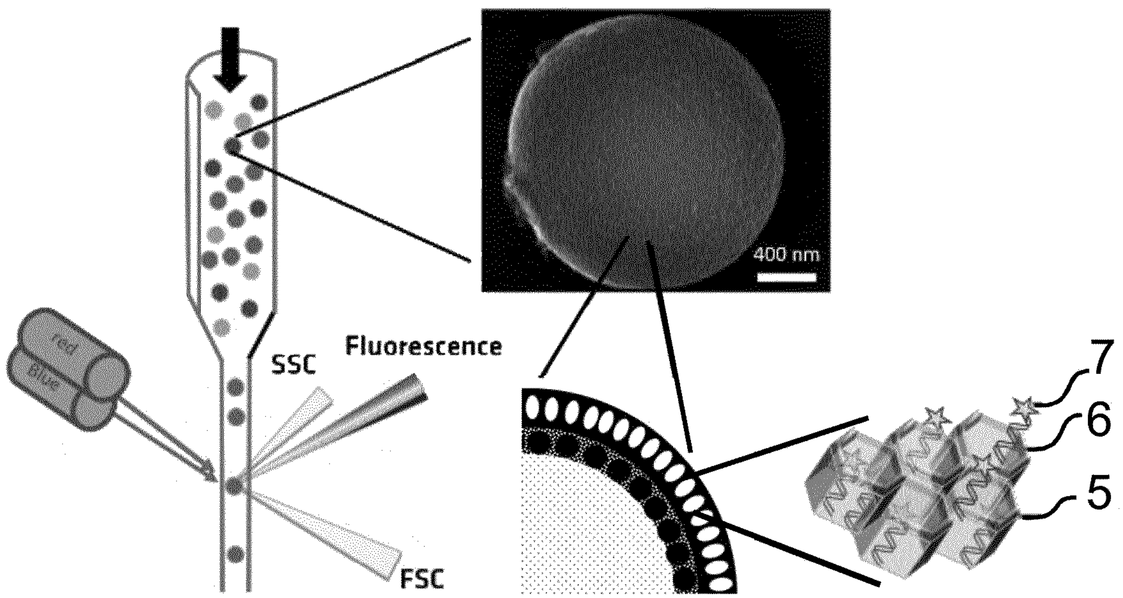
FIG. 2 illustrates very schematically an embodiment of an analyte detection method. It comprises the individual particle analysis of different cohorts of the core-shell particles of a multiplexing assay in a particle analyzer (e.g. a flow cytometer or a fluorescence activated cell sorter). Therein, reference sign 5—indicates a pore of the mesoporous silica comprising the silica shell 3; reference sign 6—a paired strand of DNA, consisting of an oligonucleotide which is covalently bound to the surface of the mesoporous shell and which hybridizes with a complementary target strand, the latter being labeled with reference sign 7, —a fluorescence label, whose signal can be detected and the presence of the analyte be detected. Instead of the particle sorter, other flow-through measurement units might be used, e.g., monophasic microfluidic analysis or biphasic microfluidic analysis such as with parallel or serial extraction in parallel-flow or droplet-based microfluidics.
Figure 3:
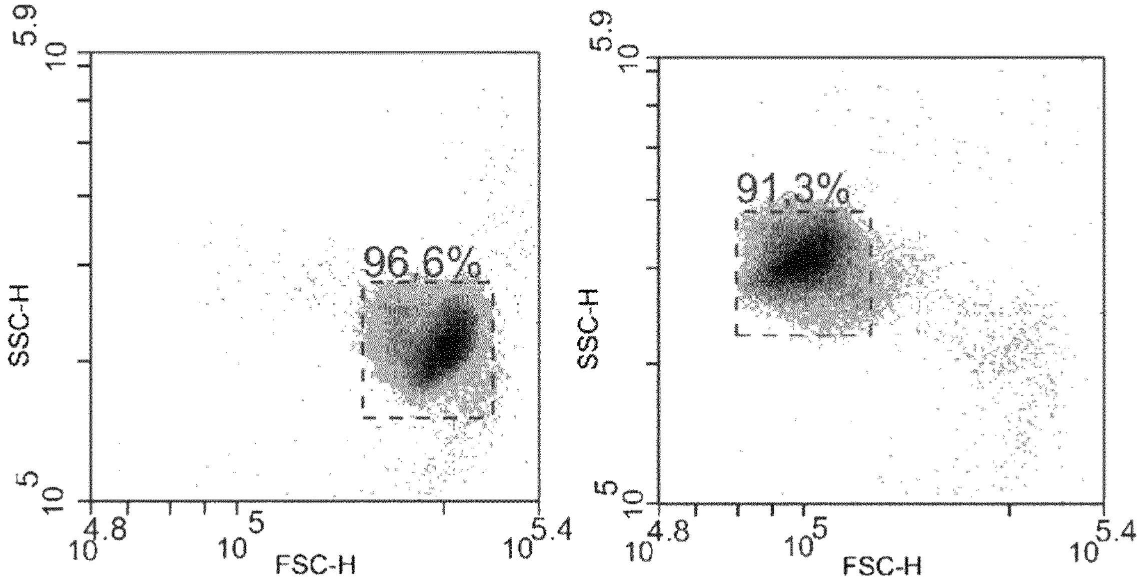
FIG. 3 is a dot plot of SSC (side scattered light) vs. FSC (forward scattered light) as typically obtained with a flow cytometer showing the dispersity of particles PS40 (left) and PS10 (right).
Figure 4:
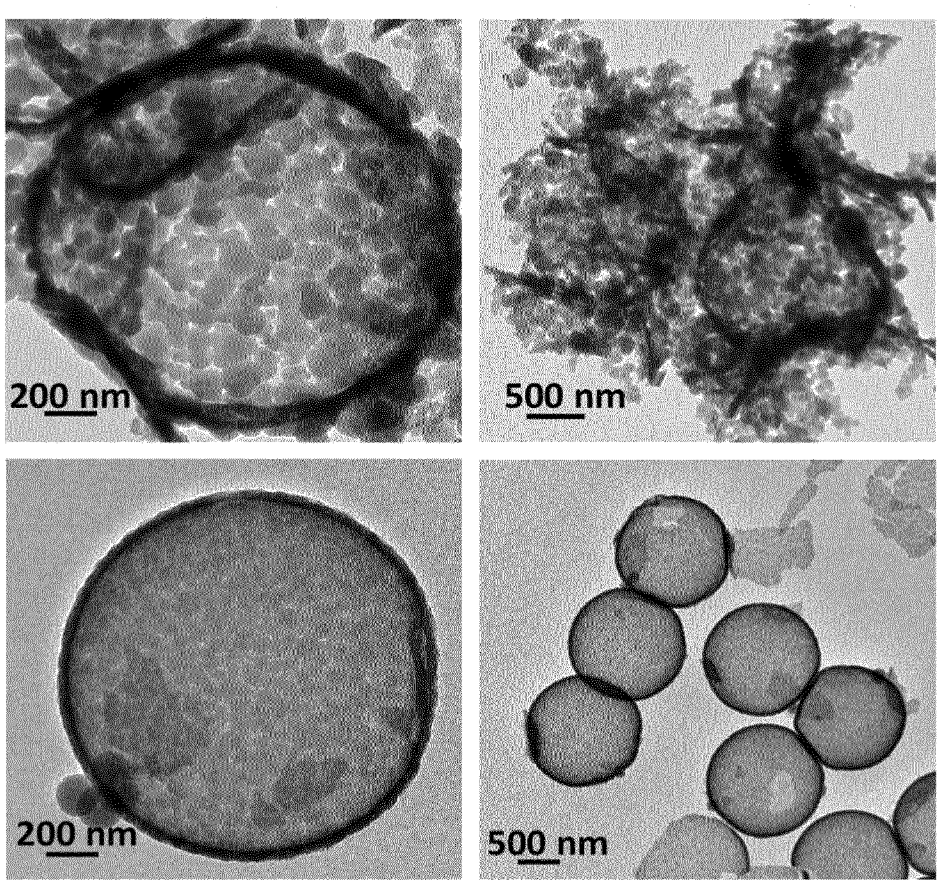
FIG. 4 reproduces TEM micrographs of calcinated M-PS10 (top) and M-PS40 (bottom), showing the different shell types as a function of the PS core used.

In the following detailed description, reference is made to the accompanying figures, which form a part hereof, and in which show by way of illustration specific embodiments and features of the invention. It is to be understood that other embodiments may be utilized, and structural or logical changes may be made without departing from the scope of the present invention. The following detailed description, therefore, is not to be taken in a limiting sense, and the scope of the present invention is defined by the appended claims.

DETAILED DESCRIPTION

As used in this description (above and below) and claims, the use of the word "a" or "an" when used in conjunction with the term "comprising" in the claims and/or the specification may mean "one", but it is also consistent with the meaning of "one or more", "at least one", and "one or more than one".

As used in this description (above and below) and claims, the use of the word "or" in the claims is used to mean "and/or" unless explicitly indicated to refer to alternatives only or the alternatives are mutually exclusive, although the disclosure supports a definition that refers to only alternatives and "and/or".

As used in this description (above and below) and claims, the used word "about" before a numerical value indicates a range of numerical values encompassing, i.e. including, a statistical deviation from the indicated numerical value by ±5%.

As used in this description (above and below) and claims, the words "comprising" (and any form of comprising, such as "comprise" and "comprises"), "having" (and any form of having, such as "have" and "has"), "including" (and any form of including, such as "includes" and "include"), "containing" (and any form of containing, such as "contains" and "contain") or "encompassing" (and any form of encompassing, such as "encompass" and "encompasses") are inclusive or open-ended and do not exclude additional, unrecited elements or method steps.

As used in this description (above and below) and claims, the term "nanoparticle" is to be understood as encompassing typically a solid body of spherical or nearly spherical shape having an arithmetically detectable mean diameter between 1 nm and 100 nm. Because of the convergent synthesis approach used in the present description, non-magnetic nanoparticles used in the present description are interconnected and located on the external surface of a core particle or a core particle carrying a shell, thus forming a corresponding next shell. Typically, the supermagnetic nanoparticles as used in the present description and claims comprise iron oxide particles with arithmetically mean diameters from 5 nm through 20 nm, having a typical diameter range of 7±2 nm, nonporous silica nanoparticles from 2 through 40 nm, having a typical diameter range of 5±3 nm, mesoporous MCM-41-type particles from 20 through 150 nm, having a typical diameter range of 50±10 nm, and mesoporous SBA-15-type particles from 30 through 300 nm, having a typical diameter range of 150±50 nm. Once grown into a shell because of the convergent synthesis process, the non-magnetic particles used in the present description, e.g., the nonporous silica nanoparticles are interconnected such that no singular particles are observable in the shell.

As to the iron oxide particles, it is noted, that some authors claim 100 nm, others 50 nm to be an upper range for obtaining superparamagnetic particles. We obtained typical maximal diameters of 9 nm particles (7±2 nm) for particles that possess superparamagnetic properties. As to the superparamagnetic properties of these particles it is noted that they, e.g. for iron oxide nanoparticles, are depending on the presence of merely one single magnetic domain. Size related information in the scientific literature diverges and according to our knowledge, a typical size ranges from 3 nm to 150 nm. Typically, 50 nm is the conventional upper limit, but larger ones have been described or can be produced in principle as well.

As used in this description (above and below) and claims, the term "micro-particle" is to be understood as encompassing typically spherical objects, e.g. core-shell-particles having an arithmetically calculated median outer diameter from 1 μm through 20 μm. The outer diameter of nano- and microparticles can typically be detected by using, e.g., electron microscopy or light scattering techniques.

The term "silica shell" as used herein designates a shell which either directly covers the organic polymer core or—where the magnetic material is disposed atop the core—covers the magnetic material as first inorganic oxide shell and hence, protects the magnetic material e.g. from dissolution under acidic conditions during further handling and/or prevents leakage of a dye which is incorporated in the polymer core, e.g. simply by steric hindrance and thus might be diluted upon diffusion. Typically, it comprises silica ($SiO_2$) nanoparticles which are formed, e.g. by hydrolysis, from a precursor compound, e.g., tetraethylorthosilicate, comprising silicon in a so-called sol-gel process, e.g. a Stöber-process (Stöber, W. et al., J Colloid Interface Sci, 1968, 26 (1), 62-69). Alternatively, the inorganic oxide shell can also comprise nanoparticles comprising alumina ($Al_2O_3$; e.g., S. M. Nazemosadat et al., Ceram. Int. 2018, 44, 596-604) or titania (e.g., S. Karmaruddin et al., Catal. Today 2011, 161, 53-58). Both nanoparticles may be generated using a similar approach from a soluble precursor, e.g. aluminum isopropoxide for alumina or titanium n-butoxide for titania in a sol-gel process. Hence, advantageously, the first inorganic oxide shell and the mesoporous second inorganic oxide shell can be prepared in a convergent synthesis.

As used in this description (above and below) and claims, the terms "fluorescence", "fluorescent", "fluorescence measurement", "fluorescent dye", "fluorescent moiety" and any related thereto term is to be understood as comprising an optical property or its detection, e.g., an excitation wavelength, an emission wavelength, a fluorescence intensity, a fluorescence quantum yield, a fluorescence lifetime or decay, a fluorescence quenching or bleaching and/or a ratio of any of their values and its/their detection.

In particular, a fluorescence of an entity, e.g. a chemical substance or ion, is typically characterized by an excitation wavelength (or an excitation wavelength range) and an emission wavelength (or an emission wavelength range). Typically, each of the indicated ranges has at least one distinct maximum. Accordingly, a "first fluorescence" as used herein comprises a "first excitation wavelength" or "first excitation wavelength range" and/or a "first emission wavelength" or "first emission wavelength range" and, respectively, a "second fluorescence" as used herein comprises a "second excitation wavelength" or "second excitation wavelength range" and/or a "second emission wavelength" or "second emission wavelength range".

As to the size (diameter) of the core-shell particles discussed here, their size is adapted to single particle handling, e.g. in flow-through measurement set-ups or in multiplexing suspension array fluorescence immunoassay (SAFIA) and, hence, is in the range of 100 nm through 5 μm, preferably 250 nm through 3 μm, preferably 750 nm through 1500 nm. Particularly, the organic polymer core typically has an average arithmetic diameter of 0.05 to 1.8 μm, for example 0.1 to 1.5 μm, 0.2 to 1 μm or 0.5 to 1.5 μm; one shell comprising the inorganic oxide and covering the magnetic layer has a thickness in the range of 10 to 200 nm, for example 10, 20, 25, 30, 35, 40, 45, 50, 55, 75, 100, 125, 150, 175, 190, or 200 nm; and the entire core-shell particle has an average arithmetic diameter of 0.1 to 2 μm, for example 0.5 μm to 2.5 μm, preferably 0.8 μm to 2 μm. The mean arithmetic diameter of these size ranges can be determined for sufficiently monodisperse particles, for example, by using known scattered light techniques or, for example, by (scanning) electron microscopy.

According to an embodiment a core-shell particle is suggested which comprises an organic polymer core which is covered by a first layer of a magnetic material which is disposed directly on the polymer core followed by a first inorganic oxide shell selected from: a silica ($SiO_2$), an alumina ($Al_2O_3$), and titania ($TiO_2$). The core-shell particle further comprises a mesoporous second inorganic oxide shell, which covers the first inorganic oxide shell; wherein the mesoporous second inorganic oxide shell comprises silica ($SiO_2$), titania ($TiO_2$), or alumina ($Al_2O_3$).

Advantageously, the quantity of the magnetic material is adjusted such as to maintain optical transparency of the magnetic first inorganic shell which is required for excitation and measurement in the event of a dye-coded core. Advantageously, the first inorganic shell atop the magnetic layer allows the interaction of the micelle-forming templating agents (MFT) and structure-directing mediators (SDM) with the surface of the first inorganic shell, before the second mesoporous shell comprising silica, alumina or titania is convergently formed.

According to an embodiment the polymer core comprises an organic fluorescent dye which is either covalently coupled to the polymer core or at least one of its constituents or sterically entrapped within a polymer network comprising the organic polymer core, and wherein the first inorganic oxide shell and the mesoporous second inorganic oxide shell insulates or shields both, the polymer core from leaking of a dye and the magnetic material from dissolution, e.g. in acidic external environment.

Advantageously, the first inorganic oxide shell, optionally together with the mesoporous second inorganic oxide shell protect the organic polymer core by preventing any direct fluid contact from leaking of a dye which is enclosed, e.g. sterically entrapped, within the organic polymer core. Further, the first inorganic oxide shell, optionally together with the mesoporous second inorganic oxide shell, protect the magnetic material which is deposited directly on the core and buried beneath the first inorganic oxide shell from dissolution, e.g. in acidic environment, the particle is in contact with. Particularly, protection is important against organic solvents and acids, not against plain water, because typically used dyes will not leach into water.

According to an embodiment a type and/or concentration of the dye within the polymer core is adjusted such as to allow particle coding, which may be used in multiplexing assays comprising cohorts of different core-shell particles, wherein, typically, differently coded particles of different cohorts comprise a sensitivity for different analytes.

Advantageously, by different types of dyes or by different concentrations of the dye associated with the core, the core-shell particles can be coded. Such coding allows the design of multiplex assays, i.e. simultaneous detection of different analytes within one run comprising use of differently coded core-shell particles, each cohort of identically coded particles being specific for another analyte. Multiplex assays allow reducing costs and enhancing performance of analyte detection. The employment of different dyes and/or different concentrations of a dye in the core allows the obtaining of a large number of codes that can allow the simultaneous detection of a large number of analytes.

According to an embodiment the dye mentioned above is a fluorescent dye comprising an excitation wavelength and an emission wavelength.

Advantageously, by carefully selecting different dyes with different excitation and/or emission wavelengths, different particles can be recognized in a mixed suspension. Such mixed particle suspensions are attractive to use in multiplex assays (see above).

According to an embodiment, the magnetic material comprises nanoparticles, wherein the nanoparticles comprise at least one of: Fe, $Fe_2O_3$, $Fe_3O_4$, Co, Ni, Gd, Dy, $CrO_2$, MnAs, MnBi, EuO, NiO/Fe, and $Y_3Fe_5O_{12}$.

Advantageously, magnetic material facilitates the handling of the particles during the preparation of sensing particles and also allows their accumulation or pre-concentration in a chamber during an assay, e.g. a microfluidic assay, likewise the integration of washing steps into the assay workflow or protocol, improving detection performance and sensitivity of the assay.

According to an embodiment, the magnetic nanoparticles comprise $Fe_2O_3$ or $Fe_3O_4$ and are attached to the organic polymer core through electrostatic interactions.

As disclosed further below the magnetic nanoparticles are prepared in the presence of PVP as well, wherein the PVP molecules are covering and solubilizing these superparamagnetic nanoparticles. Therefore, they are easily deposited on the polystyrene core and facilitate the growth of the first inorganic oxide shell, protecting them from destruction during further handling.

Advantageously, the electrostatic interactions allow the incorporation of the magnetic layer on the polymer core; before convergent synthesis of the first inorganic oxide shell allows for the creation of a uniform shell around the particle.

According to an embodiment, the inorganic oxide of the first inorganic oxide shell and of the mesoporous second inorganic oxide shell is silica.

Advantageously, different silica precursor substances are available and the surface properties, especially roughness and hence, specific surface area available for chemical coupling/linking of functional groups, of the silica shells generated by convergent synthesis can easily be tuned according to a current requirement of an assay format or analyte species.

According to an embodiment, the mesoporous second inorganic shell comprises a silica and can be differentiated according to their pore geometry, e.g. either (2D- or 3D-) cylindrical or (3D-) cage-type structures. Cylindrical structures with hexagonal symmetry are selected from a MCM-41 type material (comprising pores with diameters of about 2.5±0.5 nm), a SBA-15 type material (comprising pores with diameters of about 13±7 nm), a UVM-7 type material (comprising bimodal distribution of the pores with diameters of about 2±0.5 nm and 20±10 nm), a HMS type material (comprising pores with diameters of about 3±1 nm), a FSM-16 type material (comprising pores with diameters of about 3±1 nm), a FDU-15 type material (comprising pores with diameters of about 7±3 nm), a COK-12 type material (comprising pores with diameters of about 7±2 nm), or structures with cubic symmetry such as a MSU-X type material (comprising pores with diameters of about 4±2 nm), a MSU-H type material (comprising pores with diameters of about 3±1 nm), a MCM-48 type material (comprising pores with diameters of about 4±1.5 nm), a SBA-16 type material (comprising pores with diameters of about 10±5 nm), a FDU-12 type material (comprising pores with diameters of about 15±5 nm) or a KIT-5 type material (comprising pores with diameters of about 9±5 nm). In contrast, cage-type mesocaged solids such as a FDU-1 (Imm) type material, a SBA-1 (Pmn) and a AMS-8 (Fdm) type material consist of spherical or ellipsoidal cages that are connected 3-dimensionally by smaller cage-connecting windows. All these materials are silica based.

In other words, the mesoporous second inorganic shell according to an embodiment comprises a silica and is selected from one of:

- 2-dimensional structures, i.e. cylindrical pores, or 3-dimensional structures, i.e. cage-type structures,
- a MCM-41 type material, comprising pores with diameters of about 2.5±0.5 nm;
- a SBA-type material, comprising pores with diameters of about 13±7 nm;
- a UVM-7 type material comprising a bimodal distribution of the pores with diameters of about 2±0.5 nm (first mode) and of about 20±10 nm (second mode);
- a HMS type material comprising pores with diameters of about 3±1 nm;
- a FSM-16 type material comprising pores with diameters of about 3±1 nm;
- a FDU-15 type material (comprising pores with diameters of about 7±3 nm);
- a COK-12 type material (comprising pores with diameters of about 7±2 nm);
- a structure with cubic symmetry such as MSU-X comprising pores with diameters of about 4±2 nm;
- a structure with cubic symmetry such as MSU-H (comprising pores with diameters of about 3±1 nm;
- a MCM-48 type material (comprising pores with diameters of about 4±1.5 nm);
- a SBA-16 type material (comprising pores with diameters of about 10±5 nm);
- a FDU-12 type material (comprising pores with diameters of about 15±5 nm);
- a KIT-5 type material (comprising pores with diameters of about 9±5 nm); and
- a cage-type mesocaged solid such as FDU-1 (Imm), SBA-1 (Pmn) and AMS-8 (Fdm), each comprising spherical or ellipsoidal cages that are connected 3-dimensionally by smaller cage-connecting windows.

Mesoporous materials, e.g. the listed ones above, are a class of porous materials with pore sizes in the lower nanometric range, between 2 nm and 50 nm, and for which the pores commonly show an ordered or regular arrangement. Ordered mesoporous materials have a homogeneous pore size, ranging from 2 nm-50 nm, a high pore volume (0.1-2 $cm^3 g^{-1}$) and a high to very high specific surface area (100-1300 $m^2 g^{-1}$), and their mesopores are most commonly three-dimensionally ordered in a hexagonal, cubic or lamellar arrangement. Mesoporous inorganic oxide materials are chemically inert and stable at high temperatures, their synthesis requires inexpensive and non-hazardous precursors that allow for facile production upscaling and can be chemically modified using well-known alkoxide functionalization chemistry. Such materials have thus been extensively used in catalysis, separation, adsorption, storage, biomolecule immobilization, biomedical tissue regeneration, drug delivery, chemical and biochemical sensing.

Advantageously, different pore sizes allow to adjust an accessible surface to, e.g., a size (or molecular weight) of a biomolecule to be anchored or to a reporter to be stored inside the mesopores. Different pore sizes also guarantee that the clogging of pores can be avoided. When small molecule reporters are anchored to the pore walls, small pore sizes already guarantee unhampered diffusion of further small molecules deeper into the pores. When larger biomolecule reporters are anchored, only larger pore sizes guarantee unhampered diffusion. Mesoporous materials have numerous advantages, such as narrow pore size distributions and high surface areas, their inner and outer walls being independently or cooperatively functionalizable with organic molecules in a straightforward way while being biocompatible and possessing low toxicity. In addition, mesoporous materials show significant potential for sensing, drug delivery, adsorption and catalysis.

According to an embodiment, the mesoporous layer comprises the MCM-type material and the pores of the MCM-type-material can be expanded from 3 nm until 5 nm; or the mesoporous layer comprises the SBA-type material and the pores of the SBA-type material can be expanded from 6 nm until 20 nm through employment of pore expanders, e.g., 1,3,5-trimethylbenzene (TMB).

Advantageously, the employment of pore expander molecules such as alkanes or TMB allows for the generation of pores with larger diameters, which facilitates diffusion of certain molecules within the pores of the material. Pore expander molecules are incorporated in the hydrophobic core of a micelle and lead to a swelling of the micelle, possessing a larger diameter.

According to an embodiment, the pores of the mesoporous inorganic oxide shell, whether it comprises a convergently grown silica shell, a convergently grown alumina shell, or a convergently grown titania shell, are substantially regularly arranged.

Advantageously, the regular arrangement, beside a not mentioned here substantially constant thickness of the mesoporous shell allows for standardized particle properties. Standardized particles or—put differently—particles with a standardized (and reproducibly obtainable) architecture guarantee more reliable and reproducible applications.

According to an embodiment, the pores of the mesoporous second inorganic oxide shell contain an indicator or a recognition unit (e.g., an oligonucleotide) wherein the indicator or the recognition unit is grafted to an inner pore surface and/or to an outer pore surface; wherein the indicator is selected from: a fluorescent dye, an electrochemically active substance, a redox-active substance, and an electrochemiluminescently active substance producing a signal change after the interaction with the analyte; wherein the recognition unit is selected from: a short nucleic acid oligomer which is able to pair with a corresponding nucleic acid sequence sought for; and wherein the indicator and the oligonucleotide is adapted to bind and/or to indicate an analyte or a labeled analyte.

Advantageously, the high specific surface area of the mesoporous shell allows to attach significantly more indicator or recognition units per particle, yielding more sensitive analyses and lower detection limits. Advantageously, said indicator attached to the mesoporous shell can directly bind and indicate an analyte when an optically or electrochemically signaling indicator is used. Alternatively, if the recognition unit by itself, e.g. an oligonucleotide, does not possess a signaling function it can be used to directly bind a labeled analyte, whose presence is recognizable as it is enriched in or at the mesoporous second inorganic shell from a sample through binding to the recognition unit.

According to an embodiment the analyte is selected from a metal ion, an inorganic anion, a sugar, a hormone, a drug, a pesticide, a toxin, a chemical warfare agent and a DNA or RNA strand.

Advantages of sensitively and selectively detecting such analytes in fields of medical, biochemical, environmental, food, forensic, and technical applications are apparent.

13 According to an embodiment, the mesoporous second inorganic oxide shell comprises an anchor molecule which is covalently linked to an outer pore surface and/or to an inner surface of the mesoporous material. The anchor molecule is selected from:

(a) an oligonucleotide, a hapten, a cyclodextrin, a calixarene, a curcubituril, a cavitand, a crown ether, a pillararene, an organic thiol (e.g., a mercaptopropylsilane or a thiol-terminating oligo(ethylene glycol)), a peptide (e.g., for enzyme-triggered release), and an organic oligoamine; and wherein the anchor molecule is adapted to bind the pore-closing material;

or (b) wherein the anchor molecule is selected from an oligoamine, a photochromic molecule (e.g. a spiropyran), and a thermoresponsive molecule (e.g. an oligo-(N-isopropylacrylamide); and wherein the anchor molecule is adapted to swell/de-swell upon interaction with an external stimulus selected from protons, light and temperature.

Advantageously, the individual choice from a large library of anchor molecules in conjunction with the flexibility of choosing a pore-closing material allows for purpose-fit assay design.

According to an embodiment, the pores of the mesoporous second inorganic oxide shell contain a reporter, the reporter being selected from: a dye, an electrochemically active substance, a redox-active substance, and an electrochemiluminescently active substance.

Advantageously, an aspect ratio of the pores, i.e. a ratio of their length to their diameter is well above 1, typically above 5. That allows for effective reporter loading capacity and for fast release in an assay while guaranteeing high sensitivity.

According to an embodiment, once the reporter is a dye, the dye is selected from: a dye, particularly a fluorescent dye, a chemiluminescent dye, and an electrochemiluminescent dye, i.e. comprises at least an absorption wavelength, and optionally comprises an emission wavelength.

Advantageously, fluorescence detection is by far the most sensitive optical detection method. That allows to further enhance an assay sensitivity for the given analyte, provided the release of the reporter molecules is triggered by the presence of the analyte, i.e. binding of the analyte by the pore-closing material and thus opening of the pores.

According to an embodiment, the pores are capped, i.e. closed by a pore-closing material which is adapted to specifically bind an analyte.

Advantageously, a tremendous signal amplification can be obtained upon a single analyte recognition event (trigger).

According to an embodiment, the pores which contain the reporter are opened upon specifically binding the analyte by the pore-closing material or by the anchor molecule, which is triggering a prompt release of the reporter into the surrounding liquid phase.

Advantageously, a sensitivity of the pore-closing material, i.e. avidity of an antibody or antibody fragment can be selected such as to allow for fast analyte detection within a few minutes.

According to an embodiment, the pore closing material is selected from: an antibody, a Fab or $F(ab')_2$ fragment of an antibody, an aptamer, protein A, protein G, avidin, streptavidin, biotin, a carbohydrate binding molecule, a lectin, an enzyme, an affinity ligand, a nucleic acid oligomer able to bind a specific analyte or electrostatically bind as a polyanion to a polycationically decorated pore surface, a molecule which is able to react with an organic thiol, and a molecule or material that can swell/de-swell or change its conformation in the presence/absence of analyte species, e.g., protons, or in response to a stimulus, e.g., light or temperature.

Advantageously, the swelling/de-swelling or the conformational change of an anchor molecule when being equivalent to the pore-closing material produces a change in the space that the molecule inhabits at or in the pore openings. Typically, the conformation of such an anchor molecule acting as pore-closing material changes from bulky, efficiently closing the pore, to collapsed or lean, leaving a void or opening at the pore outlet, while the molecule remains still covalently bound at the surface, allowing the diffusion of the reporters through the pore opening from the pores. The advantage of using triggers such as protons, light or temperature is that it allows for a precise environmental control of the analytical assay. Further advantages of using organic thiols are related to the possibility of coupling pore-closing materials via disulfide bond formation which can be used for detecting redox active analytes that are able to reduce the disulfide bond, forming two thiols and thus leading to an opening of the pore. Oligonucleotides which are not bound to nanoparticles can be used as pore-closing material due to their properties as polyanions based on the phosphate backbone of the oligonucleotides, where polycations on the surface of the mesoporous material (for example a simple APTES surface or covalently anchored oligoamines) act as anchor molecule on the surface of the mesoporous material. It is therefore not the ability of oligonucleotides to form via base-pairing a double strand, which is used to close the pores, as single strands and double strands do not differ significantly in their ability to close pores.

Further, these different types of molecules offer the design of a plethora of assays, i.e. allow for specific recognition of numerous types of analytes. Therefore, applications of the suggested core-shell particles relate to fields of medical, biochemical, environmental, food, forensic, and technical applications. Materials which change their conformation in response to an external trigger further allow for a precise environmental control of the analytical assay. Examples are organic oligoamines that are lean at basic pH, in the absence of protons, and swell upon protonation because of the electrostatic repulsion between the positively charged ammonium groups, a photochromic molecule, e.g. a spiropyran or an azobenzene that changes from a nonpolar neutral state to a polar charged state (spiropyran to merocyanine conversion upon irradiation with UV light (and where switching back is possible with visible light), and an oligo-(N-isopropylacrylamide) that is in its hydrated swollen state at temperatures below the lower critical solution temperature (LCST, between 30-40° C.) and in its non-hydrated collapsed state at temperatures above the LCST.

According to an embodiment, the pore-closing material is selected from: a nanoparticle comprising of gold or silver, a carbon nanodot or a quantum dot or semiconductor nanocrystal (e.g., CdS, CdS with a ZnS shell) that has a diameter between 2 nm and 25 nm, chosen so that it matches the diameter of the pore of the mesoporous material, and being decorated with an antibody, a Fab or $F(ab')_2$ fragment of an antibody, an aptamer—wherein an aptamer is considered to comprise a synthetic oligonucleotide or a synthetic peptide which are able to specifically bind an analyte, a protein A, a protein G, an avidin, streptavidin, a biotin, a carbohydrate binding molecule, a lectin, an enzyme, an affinity ligand, a nucleic acid oligomer which is able to pair with a corresponding sequence sought for or able to bind a specific analyte, a molecule which is able to react with an organic thiol, and a molecule that can bind to a cyclodextrin, a calixarene, a curcubituril, a cavitand, a crown ether, a pillararene, and an organic thiol.

Advantageously, nanoparticles as pore-closing material allow actuation (e.g., heating of gold nanoparticles) or tracking (e.g., luminescence of carbon nanodots or quantum dots), offering still higher flexibility in the design of an assay in the fields of medical, biochemical, environmental, food, forensic, and technical applications.

According to an embodiment, the pore closing material is anchored at or close to pore openings of the mesoporous second inorganic oxide shell by a molecule selected from: a hapten, an oligonucleotide, a cyclodextrin, a calixarene, a curcubituril, a cavitand, a crown ether, a pillararene, a peptide, an organic thiol, and an organic oligoamine. Said anchoring may comprise a covalent bonding of the molecule at accessible surface of the mesoporous second inorganic oxide shell.

Advantageously, deposited reporter molecules such as dyes, electrochemically active substances and redox active substances can diffuse from the pores to the solution if a pore has been opened through interaction of the analyte with the pore-closing material or with the anchor molecules attached to the surface of the mesoporous shell material, this interaction leading to a disruption of covalent or non-covalent bonds between the pore-closing material and the anchor molecules and the diffusion of the pore-closing material away from the mesoporous shell. In case of the anchor molecule acting as the pore-closing material, interaction of the analyte with the pore-closing material leads to a change in conformation of the pore-closing material, opening the pores and leading to a diffusion of the deposited reporters out of the pores. Both cases allow to detect a change in the concentration of reporter molecules still residing in the mesoporous shell material and reporter molecules diffused out into the solution by measuring the signal of the particles and/or of the solution after their separation by centrifugation, in flow after collection of the particles with a magnet or in flow after gating on a scattering signal from the particles. As the interaction of one analyte molecule with the pore-closing material or the anchor molecules is commonly sufficient to open a pore and allow the diffusion of hundreds of reporter molecules out of the pores into the solution, a strong amplification of the signal results. As indicated by the definition above, recognition units (such as DNA) themselves cannot report on the concentration of an analyte as they generate no signal; they require the analyte being labeled (labeled analyte).

According to an embodiment, a method for producing the core-shell particle according to any of the embodiments mentioned above is suggested. The method comprises:

- providing a core comprising an organic polymer material;
- depositing a first layer comprising a magnetic material on the core which does not completely cover the core;
- producing a first inorganic oxide shell comprising a silica ($SiO_2$), an alumina ($Al_2O_3$), or a titania ($TiO_2$) directly on the layer comprising the magnetic material and on a surface of the polymer core which is not covered by the layer comprising the magnetic material, so that the silica, the alumina and the titania are covering the magnetic layer completely as a substantially closed shell; and
- producing a mesoporous second inorganic oxide shell, wherein the mesoporous second inorganic oxide shell covers the first inorganic oxide shell; and wherein the mesoporous second inorganic oxide shell comprises silica ($SiO_2$), alumina ($Al_2O_3$), or titania ($TiO_2$).

Advantageously, the convergent synthesis of the shells can create uniform shells through the formation of MFT with the help of SDM directly at the surface, which avoids the formation of inhomogeneities such as open areas or cavities in the shell during assembly of already preformed particles by divergent methods.

According to an embodiment, providing the core comprising the organic polymer material comprises polymerizing a monomer in a presence of a polyvinylpyrrolidone, and wherein depositing the first inorganic oxide shell and depositing the mesoporous second inorganic oxide shell comprises generating inorganic oxide nanoparticles from a soluble inorganic oxide precursor in a presence of a polyvinylpyrrolidone, wherein the polyvinylpyrrolidone has a median molecular weight of between 7.000 to 40.000 Dalton, preferably between 10,000 to 40,000 Dalton.

Advantageously, selecting the molecular weight of the PVP allows to tune the surface properties of the outermost inorganic oxide shell. Particularly, a specific surface area, a roughness, a morphology of the shell can be adjusted, having smoother surface with PVP of lower molecular weights (like 10 KDa), more rugose surface with intermedium molecular weights (ca. 40 KDa) or a surface in which some nanoparticles produce much more rugosity with higher molecular weights (ca. 360 KDa). According to typical embodiments the PVP is selected to have an average molecular weight in the range from 7,000 Daltons to 360,000 Daltons, preferably a range from 7,000 to 40,000 Daltons, more preferably from 10,000 to 40,000 Daltons.

According to an embodiment, the monomer comprises styrene or a derivative of styrene comprising two polymerizable groups, and the organic polymer core hence comprises a spherical polystyrene particle which is decorated at its surface with PVP chains, which during depositing the magnetic layer, the iron oxide nanoparticles of which are also decorated at their surface with PVP, or the first inorganic oxide shell are covered with a convergently grown shell comprising the inorganic oxide, e.g. with silica, alumina, or titania as convergently overgrown nanoparticles.

Advantageously, negative charges of the PVP chains allow for the electrostatic interaction between the organic polymer core and the precursors able to form the magnetic layer or the first inorganic oxide shell through a convergent route that allows for the adjustment of a specific surface area, a roughness or a morphology of the shell.

According to an embodiment, depositing the second inorganic oxide shell comprises applying a templating agent which is selected from a micelle forming surfactant and a micelle forming block-copolymer and optionally, in addition to the templating agent, applying a structure-directing agent which is selected from a structure-directing mediator, e.g. NaCl or $MgSO_4$ to obtain at least substantially regularly arranged open pores, whereas typically, the pore openings are accessible to a fluid which is wetting the core-shell particle.

It is noted, that in the related scientific literature, "structure-directing" is often also used for surfactants, but then in conjunction with "agent" or "reagent". Here, a different definition is followed, distinguishing between MFT (micelle forming templating agents) and SDM (structure directing mediators), because not only surfactants, but also block-copolymers are MFT. SDM, which are primarily inorganic salts, are thus termed "structure-directing mediators" (and not "agents"). This terminology used here allows to clearly distinguish between these different functions. SDM can modulate the assembly of a micelle at a surface (and presumably also the assembly between micelles). Another type of structure-directing agent are the pore expanders mentioned below. For clarity, these are designated as "pore expanders". Advantageously, the employment of structure-directing mediators increases the ionic strength in the synthesis solution and facilitates the interaction of the micelle-forming templating agents with each other, with the surface of the polymer core or with the surface of the first inorganic oxide shell incorporating the magnetic layer and among the formed micelles, facilitating the convergent growing of the mesoporous silica shell directly on the particles and not in the solution.

According to an embodiment, the templating agent of the method above is selected from CTAB and Pluronic 123. Further, optionally, a pore expander is used during depositing the second inorganic oxide shell; wherein the optionally used pore expander is selected from an alkane which is selected from: hexane, heptane, octane, nonane, decane; from N,N-dimethylhexadecylamine (DMHA); from 1,3,5-trimethylbenzene (TMB); from triisopropylbenzene; from xylene; and from tetrapropoxysilane (TPOS).

Advantageously, the employment of pore expander molecules such as TMB allow the possibility to create bigger pores, which can allow a faster diffusion and better accessibility of the pores and prevents steric hindrance for larger molecules. Pore expander molecules are incorporated in the hydrophobic core of a micelle and lead to a swelling of the micelle, possessing a larger diameter.

According to an embodiment, the suggested method further comprises:

- depositing and/or coupling inside and/or outside the pores a reporter,
- wherein the reporter is selected from: a dye, an electrochemically active substance, a redox-active substance, a fluorescent indicator and a fluorescent molecular probe; or
- depositing and/or coupling inside and/or outside the pores a recognition unit,
- wherein the recognition unit is selected from: a short nucleic acid oligomer which is able to pair with a corresponding nucleic acid sequence sought for.

Advantageously, reporters or recognition units coupled to the outer and/or inner walls of the pores allow to obtain a much higher number of reporters or recognition units per particle than their coupling to nonporous particles, allowing to bind (recognize) much more analyte or labeled analyte per particle, and resulting in stronger measurable signals and higher sensitivities. Particularly, reporters such as fluorescent indicators (molecular probes) which comprise a specific receptor unit for selected analytes and recognition units such as nucleic acid oligomers due to their specificity allow to obtain highly analyte-specific and analyte-sensitive core-shell particles. Such particles are attractive especially for multiplex assays, comprising the simultaneous detection of different analytes in one sample/one run.

Coupling of reporters also has the advantage of pre-orientation of the molecules on the surface.

According to an embodiment, in the event that the reporter is deposited but not covalently coupled inside the pores, the method further comprises:

- closing the pores with a pore-closing material, wherein the pore-closing material is adapted to specifically bind an analyte; or
- closing the pores with a pore-closing material, wherein the anchor molecule is adapted to specifically bind an analyte.

Advantageously, the procedure indicated allows an independent correlation between the chemical interaction and the signal generation, allowing a strong chemical amplification of the signal due to the fact that the presence of one molecule of analyte is able to produce the release of hundreds of molecules of dye.

According to an embodiment the suggested method for producing the described core-shell particles further comprises:—grafting molecules to the surface of the mesoporous surface of the second inorganic shell as an anchor molecule for the pore-closing material, wherein the anchor molecule is selected from a hapten, a cyclodextrin, a calixarene, a curcubituril, a cavitand, a crown ether, a pillararene, a peptide, an oligonucleotide, an organic thiol and an organic oligoamine.

Advantageously, said anchor molecules allow for tailoring release behavior of the pore closing material. Especially they allow to tune the distance between the particle surface and the pore-closing material to be adjusted through the chain length of the anchor molecules, allowing to modulate access of the analyte to the recognition sites of the release system. It is noted that organic oligoamines can serve as both, pore-closing materials by swelling with protons and, in their protonated state, anchor molecules for bulky anionic species, e.g. oligonucleotide strands with their phosphate backbone. The choice of pore diameter and molecular dimensions as well as grafting density allows to choose the purpose-fit approach.

According to an embodiment, the pore-closing material is selected from: a nanoparticle comprising of gold or silver, a carbon nanodot, a quantum dot, and a semiconductor nanocrystal (e.g., CdS, CdS with a ZnS shell), wherein a diameter of the nanoparticle has a diameter between 2 nm and 25 nm, and the particle is chosen to have a diameter that matches the diameter of the pore of the mesoporous material of the mesoporous second inorganic shell, wherein the nanoparticle is carrying an antibody, a Fab or $F(ab')_2$ fragment of an antibody, an aptamer, a protein A, a protein G, an avidin, a streptavidin, a biotin, a carbohydrate binding molecule, a lectin, an enzyme, an affinity ligand, a nucleic acid oligomer which is able to pair with a corresponding sequence sought for or able to bind a specific analyte, a molecule which is able to react with an organic thiol, and a molecule that can bind to a cyclodextrin, a calixarene, a curcubituril, a cavitand, a crown ether, a pillararene, and an organic thiol. Therein "carrying" comprises a covalent bond (e.g. via silane chemistry) with the listed species or adsorbed species or species which are held by electrostatic interaction; "carrying" is equivalent to "being decorated with".

Advantageously, besides controlling analyte-triggered indicator release, the pore-closing material allows for actuation (e.g., heating of gold nanoparticles) or tracking (e.g., luminescence of carbon nanodots or quantum dots), endowing the system with additional means of control.

According to an embodiment, the pore-closing material is selected from a (bio) molecule able to interact with the analyte, such an antibody, a Fab or $F(ab')_2$ fragment of an antibody, an aptamer, protein A, protein G, avidin, streptavidin, biotin, a carbohydrate binding molecule, a lectin, an enzyme, an affinity ligand which is able to bind the analyte, a nucleic acid oligomer able to bind a specific analyte or electrostatically bind as a polyanion to a polycationically decorated pore surface, a molecule which is able to react with an organic thiol and a molecule or material that can swell/de-swell in the presence/absence of analyte species, e.g., a proton. Herein, an aptamer is considered to comprise a synthetic oligonucleotide or a synthetic peptide which are able to specifically bind an analyte. Molecules or materials that can swell/de-swell as a response to protons as an external chemical stimulus comprise an oligoamine. In other words, molecules or materials that can swell in the presence of protons or another chemical stimulus; and de-swell in the absence of protons and the chemical stimulus comprise, e.g., oligoamines. Molecules or materials that can swell/de-swell as a response to light as an external stimulus comprise a spiropyran or an azobenzene. In other words, molecules or materials that can swell as a response to a specific wavelength or wavelength range; and de-swell in the absence of a corresponding exposition encompass, e.g., a spiropyran or an azobenzene. Molecules or materials that can swell/de-swell as a response to temperature as an external stimulus comprise an oligo-(N-isopropylacrylamide).

Advantageously, the interaction of the (bio)molecule with the analyte interrupts the interaction of the pore-closing material with the anchor molecules attached to the surface of the porous support material, leading to a pore opening and the release of the reporters from the pores for sensitive signal generation.

According to an embodiment, in the event that the corresponding inorganic oxide shell comprises silica, for producing the first inorganic oxide shell and/or the second mesoporous inorganic oxide shell as a precursor in a sol-gel process a silicon alkoxide is used which is selected from: $Si(OCH_3)_4$, $Si(OC_2H_5)_4$, $Si(O\text{-}nC_3H_7)_4$, $Si(O\text{-}i\text{-}C_3H_7)_4$, $Si(O\text{-}n\text{-}C_4H_9)_4$, and $Si(O\text{-}i\text{-}C_4H_9)_4$.

Advantageously, the condensation of the silanes around the micelles or around the aggregated micelles assembled on the surface of the particle allows to obtain shells comprising of ordered mesoporous silica materials. Silica shells are further advantageous for coupling widely available functional silanes such as e.g., (3-aminopropyl)triethoxysilane, (3-glycidyloxypropyl)trimethoxysilane or (3-mercaptopropyl)trimethoxysilane to their surface, allowing to graft a wide variety of organic or bioorganic molecules to the silica surface.

According to an embodiment, if the corresponding inorganic oxide shell comprises alumina, for producing the first inorganic oxide shell and/or the second mesoporous inorganic oxide shell as a precursor in a sol-gel process an organic aluminum compound is used which is selected from: aluminum isopropoxide, aluminum chloride, or aluminum nitrate nonahydrate.

In the event, that the corresponding inorganic oxide shell comprises titania, for producing the first inorganic oxide shell and/or the second mesoporous inorganic oxide shell as a precursor in a sol-gel process a titanium compound is used according to an embodiment, wherein the precursor is selected from: titanium tetraisopropoxide ($Ti[OCH(CH_3)_2]_4$) or titanium n-butoxide ($Ti[OC_4H_9]_4$).

Advantageously, besides the advantages listed before for mesoporous silica, mesoporous alumina possesses specific catalytic properties and mesoporous titania shows exceptional inertness.

According to an embodiment, a pH value during producing the first and/or second inorganic shell is alkaline due to added ammonia cations, and the micelle-forming templating agent is a surfactant selected from: a cationic alkyltrimethylammonium surfactant according to formula $C_nH_{2n}TA^+$, wherein n=8-18, e.g. CTABr, CTACl; an anionic alkylsulfonate surfactant according to formula $C_nH_{2n}SO_3^{2-}$, wherein n=12-18, with a cation selected from:

- $Na^+$, $K^+$, $Ca^{2+}$, and $Mg^2$; and an alkylphosphate surfactant according to formula $C_nH_{2n}PO_4^{3-}$, wherein n=12-22, with a cation selected from $Na^+$ and $K^+$; or
- the pH value during producing the magnetic first inorganic oxide shell and/or the mesoporous second inorganic shell is acidic, and the micelle-forming templating agent is selected from: a Pluronic, comprising a triblock copolymer such as $(PEO)_m(PPO)_n(PEO)_m$, $EO{=}CH_2CH_2O$, and $PO{=}CH(CH_3)CH_2O$), e.g. P123, F127, and F108; wherein P and F stand for the physical form of paste and flakes, respectively; or
- wherein the pH value during producing the magnetic first and/or mesoporous second inorganic shell is neutral, and the templating agent is selected from a Pluronic, preferably from Pluronic 123.

Advantageously, the employment of different micelle-forming templating agents allows to obtain different mesoporous materials with different pore sizes and symmetries, offering a plethora of functionalization possibilities to generate specifically tailored materials for an intended application. Further, the convergent synthesis of the mesoporous second inorganic shell can be adapted to yield uniform shells in which chemical receptors or indicators can be chemically attached to the surface, obtaining as a result standardized particles.

According to an embodiment, a method for detecting an analyte in a sample is suggested, wherein the method comprises:

- providing a core-shell particle as described above;
- wetting said core-shell particle with the sample comprising an unknown concentration of the analyte; and
- detecting a signal generated by recognition of a fluorescently labeled analyte by a recognition unit which is coupled to the mesoporous second inorganic shell; or
- detecting the signal generated by recognition of an analyte by a reporter which is coupled to the mesoporous second inorganic shell, wherein the reporter changes its color, fluorescence, electrochemically generated luminescence or redox behavior upon analyte binding; or
- detecting a signal generated by a reporter which is released from the mesoporous second inorganic oxide shell upon analyte recognition by a pore closing material.

Advantageously, the procedure indicated allows a very sensitive detection compared with recognition units coupled to nonporous particles because much more recognition units can be coupled to a mesoporous shell with a much higher specific surface area, allowing to bind already very small amounts of analyte per particle. Further, the procedure indicated allows a huge chemical amplification of the signal due to the fact that the presence of one molecule of analyte is able to interact with the closing material and release hundreds of molecules of reporter that have been previously loaded into the pores of the mesoporous shell. After separation by centrifugation, in a fluidic system after collection with a magnet or by gating on the scattering signal of the particles, the signal of the released reporter can be measured in solution whereas the signal of the reporters still residing in non-opened pores can be correlated with the scattering signal of the particles, e.g., in a flow cytometer or fluorescence-activated cell sorter.

According to an embodiment, the suggested above method further comprises:

- separating and/or counting particles which comprise either:
  - stepped fluorescence signals associated with a coding of the cores of the particles with different concentrations of a dye;
  - fluorescence signals appearing in different wavelength ranges which are associated with a code (coding) provided by different spectral fluorescence properties of dye-coded particles belonging to different particle cohorts; and/or
  - fluorescence signals decaying with different fluorescence lifetimes associated with a code (coding) provided by different fluorescence lifetimes of dyes used for coding particles of different cohorts.

In other words, according to an embodiment, the suggested method further comprises: separating and/or counting particles which comprise stepped fluorescence signals associated with a coding of the cores of the particles with different concentrations of a dye (concentration or intensity coding), fluorescence signals appearing in different wavelength ranges associated with a coding of the cores of the particles with dyes with different spectral fluorescence properties (color coding) or fluorescence signals decaying with different fluorescence lifetimes associated with a coding of the cores of the particles with dyes with different fluorescence lifetimes (lifetime coding) coding the core of the particles.

Advantageously, the procedure indicated provides a strong signal compared with reporters coupled to nonporous particles because much more reporters can be coupled to a mesoporous shell with a much higher specific surface area, allowing to bind much more analyte per particle. Particle coding allows multiplexing and thus faster analysis of complex samples.

Each embodiment described above may be combined with any other embodiment or embodiments unless clearly indicated to the contrary.

Suitable precursors for generating any of the mentioned first and second silica shells of the core-shell particle are selected from silicon alkoxides such as $Si(OCH_3)_4$, $Si(OC_2H_5)_4$, $Si(O\text{-}nC_3H_7)_4$, $Si(O\text{-}i\text{-}C_3H_7)_4$, $Si(O\text{-}n\text{-}C_4H_9)_4$, or $Si(O\text{-}i\text{-}C_4H_9)_4$. A typical precursor is tetraethyl orthosilicate (TEOS). If the magnetic first inorganic shell and/or the mesoporous second inorganic shell comprises alumina, suitable precursors are selected from: aluminum isopropoxide, aluminum chloride, and aluminum nitrate nonahydrate. If the magnetic first inorganic shell and/or the mesoporous second inorganic shell comprises titania, a suitable precursor is selected from: an organic titanium compound such as titanium tetraisopropoxide, titanium tetraisopropoxide (Ti $[OCH(CH_3)_2]_4$) and titanium n-butoxide ($Ti[OC_4H_9]_4$).

For the embodiments comprising as the magnetic first inorganic shell a silica shell or as the mesoporous second inorganic shell a silica shell, depending on the reaction conditions of the used sol-gel-process, which is typically based on the hydrolysis of TEOS or another precursor, which is often described as Stöber-technique, and particularly depends on the mass average molecular weight of polyvinylpyrrolidone (PVP) and its amount present in the sol-gel process, the roughness and porosity of the structural inorganic shell and thus, its surface accessible to (bio) chemical modification can advantageously be tuned (Sarma et al, Langmuir 2016, 32, 3717-3727). The average molecular weight (MW) indicated for commercially available PVP (e.g. PVP 40 and PVP 10 as used herein) is the MW, i.e. the mass average molar mass, which is defined in its common sense. According to said common sense the molar mass distribution (or molecular weight distribution) describes the relationship between the number of moles of each polymer species ($N_i$) and the molar mass ($M_i$) of that species. In particular, the mass average molar mass (often loosely termed weight average molar mass) is another way of describing the molar mass of a polymer. Some properties are dependent on molecular size, so a larger molecule will have a larger contribution than a smaller molecule. The mass average molar mass is calculated by the formula $$\overline{M}_w = \frac{\sum_i N_i M_i^2}{\sum_i N_i M_i}.$$

A well-established method to measure the diameter of core-shell particles, even of nanoparticles is, e.g., electron microscopy, especially scanning electron microscopy or transmission electron microscopy. Other methods comprise, e.g., light scattering, especially dynamic light scattering.

As used herein, the indicated particle size relates typically to values detected by electron microscopy using the signals generated in transmission electron microscopy (TEM) or scanning electron microscopy (SEM). For scanning electron microscopy, the signal generated by backscattered electrons (BSE) as measured with, e.g., a BSE detector of a commercially available electron microscope can be used to establish the particle diameter and to calculate a corresponding mean value. For transmission electron microscopy a FEI Talos™ F200S (200 kV) transmission scanning electron microscope was used.

As to the above-mentioned multiplexing approach, a particular dye (e.g., dye C1) can be incorporated in the organic polymer comprising the core using different concentrations of the dye (a, b, c, . . . , z) so that each doped concentration of dye C1 in the core (C1a, C1b, C1c, . . . , C1z) corresponds to a specific recognition chemistry against a certain analyte attached to the mesoporous shell. As to the incorporation, a mere physical entrapment or adsorption as well as covalent linking are possible, depending on core material and circumstances. However, as suggested herein, the fluorescent moiety to be integrated into the organic polymer core is preferably a fluorescent dye which is discernibly different from a dye S used for transducing the analytical binding event taking place at or in the shell through interaction with an indicator, a probe, a sensor molecule, a molecular sensor or by labelling an analyte, a competitive agent, an analyte binding molecule, a primary antibody, a secondary antibody, an oligonucleotide etc. This dye used to indicate or label the binding molecule (dye S) can be used to monitor the interaction of the binding molecule with the analyte.

As an alternative, the core can be encoded with different dyes C1, C2, . . . , C10, having sufficiently different fluorescence properties, that, instead of the different concentrations of the previously described approach, correspond to a specific recognition chemistry against a certain analyte attached to the mesoporous shell.

A technical objective of the present application is to develop a bead platform for which the core particle can be doped or encoded in a straightforward manner, whereas the silica shell offers highest possible sensitivity when functionalized with (bio)chemical binders. By this approach the aim is to create different types of particles by using different concentrations of a doped dye or differently fluorescent doped dyes that can serve as a platform for different separate assays and/or for different analytes using such a platform in a multiplexed approach.

Functional core-shell particles are highly sought after in analytical chemistry and molecular biology, especially in methods suitable for single-particle analysis such as flow cytometry and bead arrays or single bead arrays. The beads (particles) are addressable and used to identify specific binding events that occur on their surface. Advantageously, they allow for facile multiplexed detection of several analytes in a single run. The present application aims to provide a powerful bead (core-shell particle) platform of which the core can be doped (i.e. labelled with at least one dye) in a straightforward manner while the shell offers highest possible sensitivity when functionalized with (bio)chemical binders. The polystyrene particles were coated with different kinds of mesoporous silica shells in a convergent growth approach, in which the silica shell is formed on the core via soluble precursors in a sol-gel process, having as a result a more homogeneous shell, allowing for better control of the shell structure and thickness. Other approaches, such as divergent methods, in which the chemical coupling of the particles is often performed through layer-by-layer techniques, might provide better control of the properties of the silica entities attached to the core, yet lead to a less homogeneous multilayer shell.

The synthesis of silica shells on core particles can be performed through divergent or convergent methods. The divergent approach uses pre-synthesized colloidal $SiO_2$ particles, often commercially available particles, and assembles them on the surface of polymer core particles through chemical coupling or layer-by-layer (LbL) assembly. Alternatively, convergent methods use the direct formation of the silica shell on the polystyrene core via soluble precursors in a sol-gel process. Although divergent methods provide better control of the properties of the silica nanoparticles as such, they are either dependent on time- and cost-intensive multistep procedures such as LbL techniques or require functionalization of the silica nanoparticles prior to chemical coupling to the core particles. In the second case, this primary chemical functionalization, which is necessary for the assembly of the shell on the core, strongly limits any further chemical modification of the silica shell, making the anchoring of biochemical recognition entities more difficult and therefore being detrimental for their use in bioanalytical assays. In addition, LbL techniques and chemical coupling both inherently lead to multilayer shells. In contrast, convergent methods provide a more homogeneous shell, allowing for better control of the shell structure and thickness, the only requirement being that the core particles carry functional groups (usually physically adsorbed or chemically grafted macromolecules) that can interact with the silica seeds once these are formed in situ, attracting them for further growth and shell overgrowth to the core particle's surface predominantly through multivalent electrostatic or hydrogen bonding interactions. Advantageously, the convergent approach yields a thin silica shell of tailored roughness and retains a native silica surface which is ideal for the anchoring of any other chemical or biochemical functional entity through straightforward silane chemistry during further build-up of a particle-based assay platform.

Mesoporous shells allow to obtain distinctly higher surface areas in comparison with conventional nonporous shells. While assessing the potential of narrow—as well as wide-pore silicas such as MCM-41 and SBA-15, respectively, especially synthesis of the latter shells, which are much more suitable for biomolecule anchoring, was optimized. By altering the pH and both, the amount and type of mediator or structure-directing salt applied during the micelle-templated shell synthesis, the shell porosity can be tuned. The structure-directing mediator plays a key role, since it is responsible for the increase of the interactions between silica seeds and the non-ionic block copolymers as the micelle-forming templating agent during convergent growth of the silica shell.

Our studies showed that the best performing material resulted from a synthesis using neutral conditions and $MgSO_4$ as a structure-directing mediator. The analytical potential of the particles was approved in flow cytometric DNA assays after their respective functionalization for individual and multiplexed detection of short oligonucleotide strands. These experiments revealed that a two-step modification of the silica surface with amino silane and succinic anhydride prior to coupling of an amino-terminated capture DNA (c-DNA) strand is superior to coupling carboxylic acid-terminated c-DNA to aminated core-shell particles, yielding limits of detection down to 5 pM for a hybridization assay using labelled complementary single-strand target DNA 15mers (t-DNA).

Exemplarily, the potential of the use of the particles in multiplexed analysis was shown according to an embodiment with the aid of dye-doped core particles carrying a respective SBA-15 shell, i.e. a shell comprising of orderly arranged cylindrical mesopores corresponding to SBA-15 type porosity.

Characteristic genomic sequences of human Papilloma Viruses (HPV) were chosen as the t-DNA analytes here, since their high relevance as carcinogens and the high number of different pathogens is a relevant model case. The described core-shell particles showed a promising performance and allowed to unequivocally detect the different high- and low-risk HPV types in a single experimental run as will be demonstrated further below.

In general, single-particle analyses or bead-based assays play an increasingly important role in the bioanalytical sciences, especially for DNA and RNA diagnostics and profiling. Such techniques are commonly based on spherical particles which can be tailored in a flexible and individual way for different detection systems, i.e., well plates, planar arrays or flow cytometers. Bead-based assays are popular because of their fast reaction kinetics, the small amounts of sample required and the variety of possible architectures of the carrier beads. Furthermore, in recent years especially flow cytometry gained in popularity as a tool which provides a fast and automated measurement with a high throughput, for instance, in comparison to classic methods such as ELISA (enzyme-linked immunosorbent assay). Moreover, robust cytometers can be used outside of a laboratory environment and miniaturized versions are intensively developed.

Typically, polystyrene or silica particles are used as carrier platforms, because they can be produced at low cost in large batches with tunable particle sizes. Polystyrene particles are commonly used in commercial assays because their high refractive index endows them with excellent scattering properties, which are particularly beneficial for flow cytometry or other types of single-particle analysis methods. In addition, the option of facile dye incorporation makes multiplexing possible and has been established commercially. However, polystyrene particles are rather inflexible in their chemical modification, which leads to restrictions with respect to the fields of application or renders the preparation procedures more complex. Silica particles on the other hand have inferior scattering properties but are easier to modify via silane chemistry. Both types of particles are nowadays used for bead-based bioassays, but especially the combination of the advantageous features of both materials in a core-shell particle format is very promising. The suggested core-shell particles enable robust and fast yet highly sensitive multiplexing assays. Although and core-shell particles have become increasingly popular in bioanalytical applications, examples using the combination of polymer core and silica shell are still sparse.

As indicated above, the synthesis of such type of materials can be performed through divergent methods in which already colloidal $SiO_2$ particles are transferred onto the surface of polystyrene particles through for instance layer-by-layer approach. Alternatively, we suggest a convergent method to be employed in which the silica shell is formed on the core via soluble precursors in a sol-gel process. Whereas divergent methods such as the chemical coupling of the particles or layer-by-layer techniques often provide better control of the properties of the silica entities attached to the core, convergent methods commonly provide a more homogeneous shell, allowing for better control of the shell structure and thickness.

With the aim to improve the performance of such type of particles in particular with respect to the sensitivity of an assay, we reasoned that the incorporation of a mesoporous shell would be a promising path because mesoporous scaffolds are usually characterized by a high specific surface area. For instance, in comparison to nonporous silica particles, mesoporous silica particles show at least an up to 5-10-times increased surface area which would allow the attachment of a much larger number of probe/receptor units. Whereas nonporous silica particles possess a specific surface area of about 10 $m^2\ g^{-1}$, silica particles comprising a mesoporous surface have a specific surface area up to two orders of magnitude above that value, e.g. 1,200 $m^2\ g^{-1}$. Like its nonporous analogue, mesoporous silica also shows a high thermal stability and is biocompatible. In addition, because mesoporous silicas are synthesized via micelle-templated routes, their porosity and particle size can be tuned by choice of micelle-forming templating agent and adjustment of reaction conditions. However, to our knowledge, polystyrene core/mesoporous silica shell particles have been prepared up to now only through divergent methods. Here, we suggest a convergent route to such core-shell particles, including synthesis method optimization and illustrating the multiplexed detection of single DNA strands as an exemplarily embodiment for the gain in performance of a bioanalytical application by using the suggested core-shell particles.

According to embodiments the core-shell particles as disclosed herein may comprise:

a) A polystyrene core, which can contain embedded fluorescent dyes with the aim to produce color- and/or fluorescence-coded particles, b) A magnetic layer of ((super)paramagnetic nanoparticles, for instance Fe, Co, Ni, Gd, Dy, $CrO_2$, MnAs, MnBi, EuO, NiO/Fe, $Y_3Fe_5O_{12}$), with the aim to facilitate the handling of the particles in an assay (in addition to that, magnetic properties facilitate particle handling already during functionalization procedures), c) A mesoporous silica, alumina or titania shell (corresponding, e.g. for $SiO_2$ to MCM-n (n=41, 48), HMS, MSU-n, MSU-V, FSM-16, FDU-n (n=12, 15), SBA-n (n=1, 2, 3, 8, 11-16), COK-12, UVM-7, KIT-5, $Al_2O_3$ type MCM-41, $TiO_2$ type MCM-41 or SBA-15). This outermost shell can be formed using different precursors, e.g. alkoxysilanes, aluminum isopropoxide for alumina or titanium n-butoxide for titania, all in a sol-gel process, and be modified with organic groups using organosilanes (for instance, modification with amino groups using 3-aminopropyltriethoxysilane (APTES) or carboxylic acid groups by a ring opening linker elongation reaction of the amino groups with succinic anhydride) for further incorporation of sensing moieties, haptens, oligonucleotides or aptamers. On the other hand, this mesoporous shell can act as a carrier material, containing certain reporter or indicator substances, which can be colored, fluorescent, chemiluminescent, electrochemiluminescent, electrochemically or redox-active, in its pores and anchor molecules attached to the surface, which, together with the pore-closing material, form the pore-closing gate, and can interact with a certain analyte of interest and trigger the release of the reporter dye from the pores in the sense of a gated release system. Corresponding triggered release of an indicator from a porous silica material has previously been disclosed in EP 3 379 250 A1.

The entire disclosure of EP 3 379 250 A1 is included by reference into the present application. It describes an indicator reservoir, comprising a porous support material having pores and an indicator substance which is contained in the pores of the porous support material, wherein the pores of the porous support material are closed by a pore-closing material, the pore closing material forming non-covalent bonds with the porous support material, wherein the pore-closing material is selected to specifically bind an analyte in a liquid selected from: a liquid foodstuff, a liquid agricultural sample and a liquid used to extract the analyte from a non-liquid foodstuff or agricultural product; and wherein the indicator substance is released from unclosed pores, when the analyte specifically binds to the pore closing material and the non-covalent bonds are disengaged. Further, said reference discloses an embodiment, wherein the pore-closing material is non-covalently bound to the porous support material by an anchor molecule that is attached to the porous support material, wherein this compound that exemplifies the anchor molecule and is attached to the porous support material comprises a hapten, an organic molecule, a complex of a metal with an organic ligand, a nucleic acid, a strand fragment of a nucleic acid, or any epitope or peptide molecule and/or wherein the pore-closing material comprises an antibody, an antibody fragment, a receptor protein, or an aptamer. According to an embodiment the pore-closing material is adapted to specifically bind an analyte substance or a specific group of analyte substances selected from: a toxin, an antibiotic, a hormone or a hormonally-effective substance, an allergen, a digestion deficiency causing substance, a transmissible spongiform, a genetically modified organism or constituent thereof, an adulterant, a nutrition additive, or an enzyme, and/or wherein the pore-closing material is adapted to specifically bind to an analyte microorganism or a specific group of analyte micro-organisms selected from: a bacteria, a bacteria spore, a pathogen, a mold, a yeast, a protozoon, a zoonosis causing agent, or a virus, and/or wherein the pore-closing material is adapted to specifically bind to an analyte comprising a specific sequence or a group of specific sequences of nucleotides.

According to an embodiment, inside the pores of the mesoporous second inorganic shell instead of sterically loaded indicator substances, indicator substances may be enclosed covalently as well, being selectively attached to the inner walls of the pores able to bind and indicate an analyte.

According to an embodiment, depending on the synthesis sequence employed, the indicator substances covalently attached to the inner pores can be homogeneously distributed throughout the inner pore walls, when the micelle-forming templating agent has been removed prior to coupling of the indicator substances, or preferentially localized at the pore openings, when the coupling of the indicator substances is carried out with the micelle-forming templating agent still inside the pores of the mesoporous second shell. In the latter case, the inner of the pores can be functionalized for instance with a second type of indicator substance.

Thus, the design, and generation of polystyrene-magnetic-mesoporous silica materials as a sensing platform is suggested, that allows obtaining light and strongly scattering particles on the one hand (due to the polystyrene core employed which has a lower density of ca. 1.05 g $mL^{-1}$ compared to ca. 2 g $mL^{-1}$ for silica yet a higher refractive index of ca. 1.6 compared to ca. 1.4 for silica) and more easy-to handle particles for flow cytometry applications due to the magnetic properties on the other hand. The magnetic properties render any reaction or washing steps during sample treatment much easier and allow for producing a focused, i.e., guided by a magnetic field detection. Thus, we suggest a combination of dye-doped, magnetic and easily to functionalize particles which are employable in single particle analysis formats. The combination of different types of materials and shells provides robust particles which are applicable as modular high-performance analytical sensing platforms, which are using flow cytometry or microfluidics. In other words, with the suggested core-shell particles a single sensing platform is suggested which is applicable in different assays for simultaneous detection of multiple analytes, so called multiplexing analysis.

With the employment of core-shell particles comprising as proposed herein, different dyes in a polystyrene core, a magnetic layer and a mesoporous shell on top of the same as sensing platform, different multiplexing assays can be performed, employing flow cytometry or microfluidics.

Special advantages are obtained, as

- doped polystyrene as a core offers doping via different dye concentrations, different dyes, dyes with different luminescence lifetimes or mixtures with different ratios of two or more dyes;
- the magnetic layer facilitates handling of the particle during the different functionalization and/or assay steps such as washing or preconcentration, because they can be easily caught with a magnet;
- the magnetic layer allows additional focusing of the particles in fluid flow by external magnetic fields;
- the magnetic layer allows assembly of the particles on electrodes, enabling electrochemical or electrochemiluminescent sensing;
- the magnetic layer also offers the possibility to combine optical (single particle analysis) with electrochemical sensing;
- the monodisperse particles provide a single sensing platform applicable in multiplexed analytical methods;
- the mesoporous shell, i.e. the second shell, provides enhanced specific surface area in comparison with a nonporous shell (plain silica shell). On one hand, many more sensing molecules can be attached to a single particle, improving the sensitivity of the system;
- the mesoporosity on the other hand can be used to prepare gated indicator-releasing materials for sensing purposes, in which the reported signal stems from indicators that have been loaded into the mesopores before closing the pores with a dedicated recognition chemistry. For such systems, the recognition reaction in which the analytes interact with anchor molecules attached to the pore openings, leading to an opening of the pores by releasing a pore-closing material, is independent of the analytical detection of the indicators released from the mesopores once the gate has been opened by the analyte. As commonly much more indicators can be stored in the mesopores than anchor molecules are required to enable closing of the pore openings with a pore-closing material, binding of few analyte molecules leads to a massive release of indicators, showing amplified chemical detection. As a consequence, also no labeling or use of secondary binding agents is necessary to produce a signal. It is noted that amplified detection and focused detection do not pertain to the same feature. As explained above, focusing is possible via the magnetic function, amplification via gating of the second shell. As mentioned, ungated mesoporous second shells also lead to higher sensitivities, yet because of the possibility to anchor more binding units to the surface rather than true signal amplification.

In view of the above, aspects of the present invention can be summarized as:

1. A hybrid doped polymer-multi-shell magnetic particle which comprises:

a) a polymer particle as a core, which can be dye-doped;

b) a first layer which is magnetic around the polymer core;

c) a first shell, comprising silica, alumina or titania, which protects the magnetic layer from degradation;

d) a second shell, comprising silica, alumina or titania, which can be a porous shell, containing certain sensing molecules able to interact with the analyte of interest and also an indicator entrapped in the pores able to be released specifically in presence of the analyte.

2. The hybrid particle as described in Aspect 1, in which the polymer core is formed by polymerization of styrene or a styrene derivative.

3. The hybrid particle as described in Aspect 1, in which the polymer core and the magnetic nanoparticles are stabilized by a polyvinylpyrrolidone (PVP), the PVP having an average molecular weight in the range from 7,000 Daltons to 360,000 Daltons, preferably a range from 7,000 to 40,000 Daltons, more preferably from 10,000 to 40,000.

4. The hybrid particle as described in Aspect 1, in which the polymer core contains a fluorescent dye.

5. The hybrid particle as described in Aspect 1, in which the magnetic layer is formed by $\gamma$-$Fe_2O_3$ or $Fe_3O_4$ nanoparticles attached through electrostatic interactions to the polymer core.

6. The hybrid particle as described in Aspect 1, in which the second shell comprises a mesoporous silica support material, wherein the mesoporous silica shell is formed around the first silica shell, coating the magnetic layer, through the employment of micelle-forming templating agents (such as surfactants or block co-polymers able to undergo self-assembly into micelles), an ionic salt structure-directing mediator (such as $MgSO_4$ or NaCl) and tetraethylorthosilicate as silica precursor. As disclosed above, herein two types of structure-directing auxiliaries or agents are used: the templates for mesoporous silica growth and the ionic salt mediators. When considering nomenclature, it is important to note that not all of the templates are considered as surfactants (the templating agents for SBA for instance are usually block-copolymers). Also, in respect to the disclosure above, the following nomenclature is proposed:

All agents that form micelles and without which no 3D objects, i.e. silica structures, can be grown are considered as micelle-forming templating agents (MFT), e.g., surfactant or block-copolymer.

All agents that determine the assembly between micelles or assemblies of micelles with the particle surface, in particular with the PVP chains of the core particle, are considered as structure-directing mediators (SDM), e.g., NaCl, $MgSO_4$.

All agents that modulate the diameter of micelles through incorporation into the hydrophobic cores of the micelles, thus swelling the micelles and leading to larger diameters, are considered as core expanders, e.g., TMB, alkanes.

7. The hybrid particle as described in Aspect 1 wherein the interactions between the magnetic layer and the polystyrene core rely on PVP entities available at the surface of the core particles and of the iron oxide nanoparticles. PVP is directly employed in the synthesis of both, the core and the Fe10 particles. Particularly, PVP chains are incorporated into the particle's surface, stabilizing the particles in suspension. The PVP chains are (like "hairs") sticking out more or less from the surface. Their effect depends on the molecular weight (chain length). As described in the case of core synthesis, PVP10 chains lie rather flat on the particle's surface, allowing for smooth silica shells. Different thereto, PVP40 chains protrude to some degree from the surface, allowing to assemble a raspberry-like monolayer of silica nanoparticles on the particle's surface. Long PVP360 chains form rather a "lawn" that leads to the assembly of a multilayer comprising silica nanoparticles. For the particle architectures described herein, PVP40 (and to a lesser degree PVP10) have been proven as useful. Longer-chained PVPs do not lead to well-defined hierarchical architectures and hence, are not used herein.

8. The hybrid particle as described in Aspect 1, in which the silica shell contains, adsorbed or covalently bound, different sensing moieties endowing the material with sensing properties (see below).

9. The hybrid particle as described in Aspect 1, in which the sensing material comprises a porous support material having pores and a reporter molecule which is contained in the pores of the porous support material, wherein the pores of the porous support material are closed by a pore-closing material which is forming covalent or non-covalent bonds with the porous support material or with anchor molecules attached to the surface of the porous support material, wherein the pore-closing material is selected to specifically bind an analyte ("to sense the analyte") in a liquid sample, and wherein the optical reporter molecule is released from unclosed pores, when the analyte specifically binds to the pore-closing material.

Molecules used as sensing moieties and/or pore-closing materials are selected from (bio)chemical receptors, e.g.: antibodies or their corresponding antigen binding fragment (Fab, $F(ab')_2$), enzymes or protein receptors and also oligonucleotides, molecular beacons or aptamers. Particularly, monoclonal or polyclonal antibodies directed towards at least one epitope of the analyte and their Fab or $F(ab')_2$ fragments are used. Sensing moieties can also be selected from protein A, protein G, avidin, streptavidin, biotin, a carbohydrate binding molecule, such as a lectin; an enzyme, an affinity ligand and others, known to the skilled person. Pore-closing materials can also be selected from a nanoparticle comprising of gold or silver, a carbon nanodot or a quantum dot or semiconductor nanocrystal (e.g., CdS, CdS with a ZnS shell) that has a diameter between 2 nm and 25 nm, chosen so that it matches the diameter of the pore of the mesoporous material, and being decorated with an antibody, a Fab or $F(ab')_2$ fragment of an antibody, an aptamer, protein A, protein G, avidin, streptavidin, biotin, a carbohydrate binding molecule, a lectin, an enzyme, an affinity ligand, a nucleic acid oligomer which is able to pair with a corresponding sequence sought for or able to bind a specific analyte. Sensing moieties can also be selected from chemical indicators that comprise of a fluorophore unit and a receptor unit and that can be coupled covalently to the surface of the mesoporous shell material. Moreover, and according to an embodiment described herein with respect to HPV analysis, the sensing molecule may also be a short nucleic acid oligomer which is able to pair with a corresponding sequence sought for.

Molecules used as anchor molecules for the pore-closing materials are selected from a hapten against which a certain antibody (or its corresponding antigen binding fragment (Fab, $F(ab')_2$) or protein receptor has been generated, an oligonucleotide, an organic thiol (e.g., a mercaptoalkane) or an organic oligoamine (e.g., (2-aminoethyl)-ethane-amine oligomers). These molecules can be directly grafted to the surface of the mesoporous material as silanes (e.g., (3-mercaptopropyl)trimethoxysilane, (3-(2-aminoethylamino)propyl)dimethoxymethylsilane) or after reaction with a reactive silane (e.g, (3-aminopropyl)triethoxysilane, (3-glycidyloxypropyl)trimethoxysilane).

Reporter molecules confined within the pores and massively released upon pore-opening may be selected to comprise an optical reporter (e.g., a fluorescent species such as a substance comprising the structure of a fluorescein, a rhodamine or a BODIPY), a redox reporter (e.g. methylene blue, ferrocene, anthraquinone, viologen, atto MB2 or nile blue) and/or an electrochemiluminescent reporter (e.g., Au nanocluster, luminol, N-(aminobutyl)-N-(ethylisoluminol), a Ruthenium or an Osmium complex with any combination of three ligands comprising the structure of a (2,2'-bipyridine) or a tri-(1,10-phenanthroline) or two ligands comprising the structure of a (2,2':6',2"-terpyridine) and two counterions perchlorate, tetrafluoroborate or hexafluorophosphate, or a bis(2-(pyridin-2-yl)phenyl) iridium complex with any combination of a third ligand comprising the structure of a (2,2'-bipyridine) or tri-(1,10-phenanthroline) and a counterion perchlorate, tetrafluoroborate or hexafluorophosphate). Advantageously, the magnetic core-shell particles can be collected at an electrode surface very easily and hence, allow direct detection and/or quantification of corresponding reporter molecules.

10. The hybrid particle as described in Aspect 1 wherein the second shell comprising silica provides stability to the hybrid particle towards a pH-value, particularly under acidic conditions, and provides protection to the magnetic first inorganic shell and to the core from changes of the pH-value.

The described embodiments have versatile application areas for the detection of small molecules and biomolecules in the areas of medical and veterinary diagnostics, environmental analysis, safety and security as well as food chemistry and pharmaceutical applications. With the aim to demonstrate the feasibility of suggested embodiments, some examples describing the used laboratory methods and materials are given below.

Advantages of the suggested hybrid core-shell particles in comparison to previously known particles comprise a combination of the following:

- A combination of magnetic properties and a high specific surfaces area which is accessible to chemical modification and/or binding of specific recognition moieties
- Magnetic properties are provided by magnetic nanoparticles in a shell, whereas previously known particles with a magnetic core result in heavy particles, which are not adapted for flow cytometry detection due to their fast sedimentation.
- Different options to individually code particles of a lot (cohort) providing the application of different lots (cohorts) in a mixture and still allowing to differentiate between them, i.e., applicability as a platform for multiplexing.
- Providing magnetic optical sensor particles with a high degree of variability of functionalization options: The core as well as the shell may be modified using established techniques.
- High monodispersity and hence, excellent applicability in single particle-based analysis methods, which are based, e.g., on flow-through cytometers.
- Improved handling of the particles during the production and application workflows, i.e., continuous as well as discontinuous work (due to magnetic layer) becomes possible which is combined with excellent monodispersity, excellent scattering and dispersing properties as well as easy doping (due to polymer core a dye of a certain concentration may be included into the polymer core e.g. by swelling/shrinking).

Greatly increased specific surface area of the particle surface (shell surface) for binding of probe molecules or for use in indictor release systems to achieve significantly better sensitivities (due to ordered mesoporous shell).

As to the applicability of the suggested heterogeneous core-shell particles in a suspended state in microfluidic assay formats in comparison to lateral flow assays—another type of rugged assays applicable for on-site-analysis—the following advantages are obtained:

Single particle measurements are possible.

Less material is consumed.

Measuring times are significantly shorter.

Washing and processing steps are easier.

Multiplexing is easier.

High flow rate measurements are possible allowing for high throughput analysis.

Only very small sample volumes are required for microfluidics or micro-cytometry.

PRACTICAL EXAMPLES

Processes for obtaining the suggested core-shell particles, methods used for their characterization, obtained results and application examples are described below.

Materials and General Techniques

All chemicals and solvents were purchased from Sigma-Aldrich, ABCR, Merck and J. T. Baker in the highest quality available. Oligonucleotides were purchased from Metabion and purified by HPLC. Buffers were prepared with ultrapure reagent water, which was obtained by running demineralized water (by ion exchange) through a Milli-Q® ultrapure water purification system (Millipore Synthesis A10). A mixture of 50 mM tris(hydroxymethyl)aminomethane (Tris)-HCl and 80 mM $MgCl_2$, (pH 8) was used for the measurements.

UV/vis-absorption spectroscopy, flow cytometric analysis, zeta potential measurements, scanning electron microscopy (SEM), transmission electron microscopy (TEM) and $N_2$ adsorption/desorption were employed to characterize the synthesized compounds and materials. UV/vis spectra were measured with a Specord 210 plus from Analytik Jena. Flow cytometric analysis was performed on a BD Accuri $C_6$ equipped with 488 nm and 635 nm lasers for excitation. Forward scattered (FSC) and sideward scattered light (SSC) were collected at 1800 and 90°, respectively, whereas the fluorescence in channel FL1 (blue channel, 533/30 nm; λexc=488 nm) was used for recording the analytical signal and the fluorescence in channel FL 4 (red channel, 675/25 nm; λexc=640 nm) for decoding in the multiplexing experiments. Zeta potential measurements were performed on a Zetasizer Nano-ZS from Malvern. TEM images and STEM scans, as well as energy-dispersive X-ray spectroscopy (EDX) analyses, were performed with a Talos F200S scanning/transmission electron microscope, ThermoFisher Scientific. High-resolution scanning electron microscopy (SEM) and transmission mode imaging SEM (T-SEM) were performed on a Zeiss Supra 40 equipped with a high-resolution cathode (Schottky field emitter), an In-Lens SE secondary electron detector used in the high-resolution mode, and a single unit transmission setup. $N_2$ adsorption/desorption isotherms were recorded with a Micromeritics ASAP2010 automated sorption analyzer. Limits of detection (LOD, according to DIN 32645:2008-11) and limits of quantification (LOQ) were determined as described below.

Synthesis of Polystyrene Cores PS10 and PS40

The polymerization reaction was carried out in test tubes in a heating carousel. In brief, in the test tubes, 170 mg poly(vinylpyrrolidone) (PVP10 for PS10 or PVP40 for PS40, i.e., PVP with an average molecular weight of either 10 kD or 40 kD) were dissolved in ethanol (abs.), before 1 mL styrene, previously filtered through basic aluminum oxide, was added, and the mixture was flushed for 30 min with argon. The reaction was started by addition of 1 mL of a solution of 105 mg of 4,4'-azobis(4-cyanovaleric acid) (ACVA) in 10 mL methanol, prepared under an argon atmosphere. The reaction was left to proceed overnight, stirring at 70° C. under an argon atmosphere. Afterwards, the particles were centrifuged (10 min, RAD 99 mm, 6000 rpm) and washed three times with 20 mL methanol before drying them in a vacuum at room temperature.

Doping of Polystyrene Cores with Red BODIPY Dyes I, II

Figure 14:
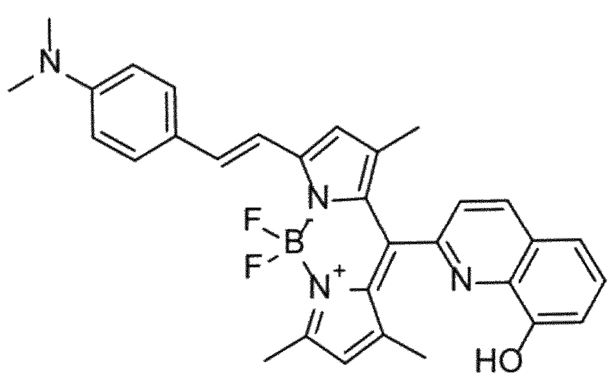
FIG. 14 shows the chemical structure of BODIPY dye I, (E)-2-(3-(4-(dimethylamino)styryl)-5,5-difluoro-1,7,9-trimethyl-5H-5$\lambda^4$,6$\lambda^4$-dipyrrolo[1,2-c:2',1'-f][1,3,2]diazaborinin-10-yl) quinolin-8-ol.

BODIPY dye I, (E)-2-(3-(4-(dimethylamino)styryl)-5,5-difluoro-1,7,9-trimethyl-5H-5λ$^4$,6λ$^4$-dipyrrolo[1,2-c:2',1'-f][1,3,2]diazaborinin-10-yl)quinolin-8-ol (see FIG. 14 for chemical structure) was prepared according to Yu et al., Chem. Asian J. 2006, 1, 176-187 by heating 4-dimethylaminobenzaldehyde (39 mg, 0.26 mmol) and 2-(5,5-difluoro-1,3,7,9-tetramethyl-5H-4λ$^4$,5λ$^4$-dipyrrolo[1,2-c:2',1'-f][1,3,2]diazaborinin-10-yl)quinolin-8-ol (78 mg, 0.2 mmol), prepared according to Moon et al., J. Org. Chem. 2004, 69, 181-183, at reflux for 15 h in a solution of toluene (dry, 20 mL), glacial acetic acid (0.7 mL) and piperidine (0.8 mL) in the presence of a small amount of activated 4-Q molecular sieves. The mixture was cooled to room temperature, the solvents were removed under vacuum, and the crude product was isolated through column chromatography on silica with ethyl acetate/petroleum ether (20%) as eluent. The blue fraction was collected and recrystallized from chloroform/methanol to give I as a blue powder.

Figure 39:
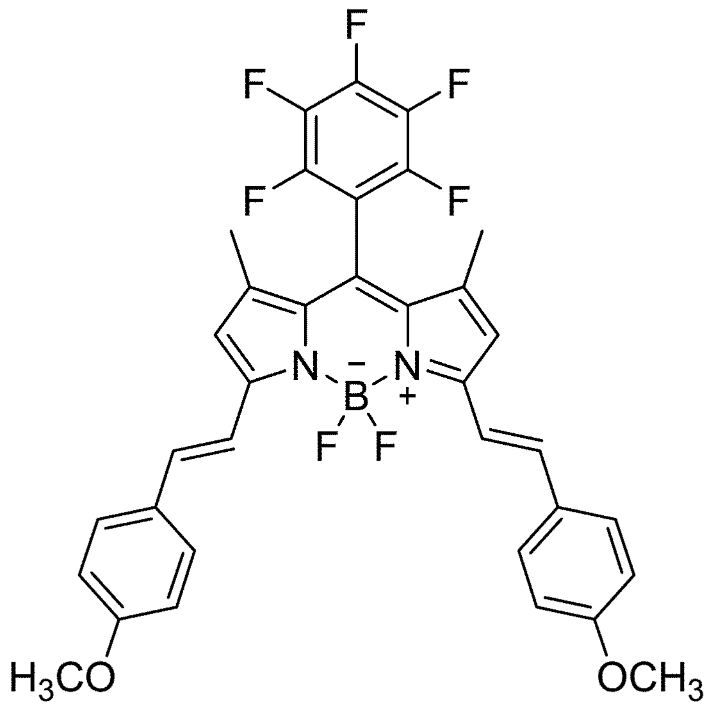
FIG. 39 shows the chemical structure of dye II, 5,5-difluoro-3,7-bis((E)-4-methoxystyryl)-1,9-dimethyl-10-(perfluorophenyl)-5H-4$\lambda^4$,5$\lambda^4$-dipyrrolo[1,2-c:2',1'-f][1,3,2]diazaborinin.

BODIPY dye II, 5,5-difluoro-3,7-bis((E)-4-methoxystyryl)-1,9-dimethyl-10-(perfluorophenyl)-5H-4λ$^4$,5λ$^4$-dipyrrolo[1,2-c:2',1'-f][1,3,2]diazaborinine (see FIG. 39 for chemical structure) was prepared according to Xu et al., Tetrahedron 2014, 70, 5800-5805 by dissolving 2,3,4,5,6-pentafluorobenzaldehyde (196 mg, 1 mmol) in 20 mL of dry DCM in a round bottom flask before adding 2,4-dimethylpyrrole (234 mg, 2.2 mmol) and two drops of trifluoroacetic acid. The reaction mixture was stirred for 3 h at room temperature in nitrogen. After complete consumption of aldehyde (monitored by TLC), tetrachloro-p-benzoquinone (270 mg, 1.1 mmol) was added to the reaction mixture. 1 h later, 4 mL of triethylamine and 5 mL of $BF_3{\cdot}OEt_2$ were added to the mixture and stirring was continued at room temperature for 1 h. After completion of the reaction, the solvent was removed under reduced pressure and the residue was purified by silica gel column chromatography using DCM/hexane (1/6, v/v) to give 5,5-difluoro-1,3,7,9-tetramethyl-10-(perfluorophenyl)-5H-4λ$^4$,5λ$^4$-dipyrrolo[1,2-c:2',1'-f][1,3,2]diazaborinine as a golden solid. In a next step, the previous product (82 mg, 0.2 mmol) and 4-methoxylbenzaldehyde (60 mg, 0.44 mmol) were dissolved in 25 mL of toluene in a three-neck round bottom flask, followed by addition of two drops of piperidine under nitrogen. The reaction mixture was heated to 110° C. before adding two drops of acetic acid. The resulting mixture was refluxed for 4 h. After the reaction was completed, the toluene was removed under reduced pressure. The residue was purified by silica gel column chromatography using DCM/hexane (1/5, v/v) as eluent to give I as a green solid.

Doping of the particles with dyes I and II was performed by preparing a stock solution (5%) by re-dispersing 500 mg of PS40 in 10 mL Milli-Q water. 1.3 mL of this solution were added to 130 μL THF and immediately mounted onto a rotator which was operated for 1 h at 40 rpm at room temperature. Then four different concentrations of a red emitting BODIPY dye (either I or II) in THF were added to the solutions, namely 0.4, 0.2, 0.1 and 0.05 mM. After continuing rotation for another 2 h, the particles were centrifuged, washed twice with 1.6 mL Milli-Q water and dried in a vacuum at room temperature.

Direct Coating of Polystyrene Cores with Nonporous (Plain) Silica Shell (N-PS40)

The formation of a nonporous shell covering the polymer cores was performed in a $NH_3$-catalyzed sol-gel reaction with TEOS as precursor. A 1% (w/v) dispersion of PS core particles was prepared in 50 mL ethanol in a round-bottom glass equipped with a magnetic stirrer. After addition of 1 mL of Milli-Q water, the suspension was treated in an ultrasonic bath to remove air bubbles, homogeneously distributing the particles. 1.5 mL TEOS and 1.5 mL $NH_4OH$ were then added. After 24 h of reaction at room temperature, the particles were separated from the suspension by centrifugation and washed twice with water and once with ethanol according to Sarma, D. et al., Langmuir 2016, 32(15), 3717-3727. The particles were dried in a vacuum for 4 h and stored at room temperature. Obtained particles served as a reference sample.

Direct Coating of Polystyrene Cores with MCM-41-Type Silica Shells (M-PS10 and M-PS40)

The coating of the polystyrene cores, without a magnetic material layer, was performed according to Qi, G. et al., *Chem. Mater.* 2010, 22 (9), 2693-2695, by dispersing 50 mg of PS10 and PS40 in 15 mL vials in 1 mL ethanol abs., 1.3 mL Milli-Q water and 50 μL ammonia (32%). To this reaction mixture were given 10 mg CTAB (cetyltrimethylammonium bromide) and the dispersion was sonicated with a sonotrode (Hielscher UP200S, amplitude 75, cycle 0.5) for 5 min, 10 min or 20 min. Afterwards, 20 μL TEOS (tetraethyl orthosilicate) were added and the reaction was stirred for 24 h. Subsequently, the particles were centrifuged (5 min, RPM 6000) and washed three times with 20 mL ethanol, followed by drying in a vacuum at room temperature.

Direct Coating of Polystyrene Cores with SBA-15-Type Silica Shells (Sn-PS10 and Sn-PS40; n=1-6)

For direct coating of polystyrene cores, without a first layer comprising magnetic material, i.e. directly with mesoporous silica SBA-15 possessing larger pores than MCM-41, two synthetic routes were adapted from: Sun, Z. et al., J. Mater. Chem. A 2014, 2 (43), 18322-18328; Yang, J. et al., RSC Adv. 2014, 4 (89), 48676-48681; and Rosenholm, J. M. et al., Microporous Mesoporous Mater. 2011, 145 (1), 14-2. First, for an acidic route, a solution of 60 mg Pluronic P123 in 30 mL of HCl (2M) was prepared in water. Then, 180 mg $MgSO_4$ in case of S1-PSXY and 5.8 mg CTAB in case of S2-PSXY (XY=10, 40) and 150 mg of either PS10 or PS40 particles were added. The dispersion was sonicated with a sonotrode (amplitude 75, cycle 0.5) for 5 min. 0.160 mL TEOS were added under vigorous stirring, before stirring of the reaction mixture was continued for 24 h at room temperature. For a neutral synthesis route, solutions of 50 mg P123 and 0.58 g NaCl for S3-PSXY and 180 mg $MgSO_4$ for S4-PSXY (XY=10, 40) in 40 mL Milli-Q water and 16.09 mL ethanol (abs.) were prepared. For the latter approach, the concentration of $MgSO_4$ was further modified, resulting in the preparation of S5-PSXY in presence of 540 mg $MgSO_4$ and of S6-PSXY in presence of 60 mg $MgSO_4$. For the coating, either 0.1 g PS10 or PS40 particles were added, and the dispersion was sonicated with a sonotrode (amplitude 75, cycle 0.5) for 5 min. Subsequently, 0.222 mL TEOS were added under vigorous stirring, before stirring for a further 24 h at 36° C. Afterwards, the mixtures were transferred to a Teflon container and hydrothermally treated for 24 h at 100° C., before centrifuging the particles (5 min, 6000 rpm) and washing them three times with 20 mL ethanol. The last step was again the drying in a vacuum at room temperature.

Functionalization with Amino Groups (NH2-Z-PSXY; XY=10, 40; Z=N, M, Sn; n=1-6)

The used abbreviation Sn with n=1-6 relates to the six different approaches S1-S6 to obtain mesoporous silica shells by using different types of structure-directing mediators and pH as already described above for direct coating of polystyrene cores with MCM-41-type silica shells. For the functionalization with amino groups, 20 mg of the N-PS40, M-PSXY and Sn-PSXY particles were dispersed in 800 μL ethanol. To activate the surface and remove the residual surfactant from inside of the pores, 400 μL of 1 M HCl in EtOH were added and the mixture was sonicated in a sonication bath for 5 min. The particles were washed twice with 400 μL ethanol and re-dispersed in 400 μL ethanol. For the amino modification, 4 μL (3-aminopropyl)triethoxysilane (APTES) were added and the mixture was left to react in a thermomixer (800 rpm) at 40° C. overnight. The particles were washed three times with an EtOH/H2O mixture (1/1), before drying in a vacuum at room temperature.

Functionalization with Carboxylic Acid Groups (COOH-Z-PSXY; XY=10, 40; Z=N, M, Sn; n=1-6)

For obtaining materials COOH-N-PS40, COOH-M-PSXY and COOH—Sn-PSXY modified with carboxylic acid groups, 5 mg of the corresponding NH2-N-PS40, NH2-M-PSXY or NH2-Sn-PSXY particles were dispersed in 1.5 mL EtOH (abs.) in a 2 mL Eppendorf tube. 30 μL of succinic anhydride in DMF (10%, 10 mg in 100 μL) were added and the mixture was left to react in a thermomixer (800 rpm) at 40° C. overnight. Afterwards, the particles were washed three times with an EtOH/H2O mixture (1/1). In the last step, 500 μL ethanol were added to give a final concentration of 1% (w/v) as stock solution.

Coupling of c-DNA to Particles (DNA-Z-PSXY, DNA'-S4-PS40; XY=10, 40; Z=N, M, Sn; n=1-4)

The used abbreviation Sn with n=1-4 relates to the four different approaches S1-S4 to obtain mesoporous silica shells by using different types of structure-directing mediators and pH as already described above for direct coating of polystyrene cores with MCM-41-type silica shells (approaches S5 and S6 were not used here). From the 1% (w/v) stock solutions, 5 μL of COOH-Z-PSXY particles were dispersed in 100 μL 2-(N-morpholino)ethanesulfonic acid buffer (MES buffer; pH 5, 0.1 M). To this dispersion, 40 μL of a freshly prepared 1-ethyl-3-(3-dimethylaminopropyl) carbodiimide (EDC) solution and 80 μL of a N-hydroxysulfosuccinimide (S-NHS) solution in MES buffer (both 1 mg per 100 μL) were added. After 15 min at room temperature, 12 μL of a solution of single-stranded DNA 5'-C6 amino-TTT ATG TCG TTT GCT GTA-3' (c-DNA, 0.1 mM) were added and the mixture was left to react in a thermomixer (1000 rpm) at 45° C. overnight, yielding DNA-N-PS40, DNA-M-PSXY and DNA-Sn-PSXY. In case of the carboxylic acid-modified DNA, 12 μL of DNA solution 5'-carboxy C10-TTT ATG TCG TTT GCT GTA-3' (c9-DNA, 0.1 mM) were added directly to the EDC and S-NHS mixture and after 15 min the NH2-S4-PS40 particles were added, obtaining DNA'-S4-PS40. Afterwards, 100 μL tris (hydroxymethyl)aminomethane chloride and sodium lauryl sulfate buffer (0.1 M TRIS-HCl with 0.05% SDS) were added and, after centrifugation, the mixture was washed twice with 500 μL TRIS/SDS (0.1 M TRIS-HCl with 0.05% SDS). Finally, the particles were re-dispersed in 200 μL 0.1 M TRIS-HCl (pH 8) to reach a sock solution concentration of 0.025%.

Hybridization with FAM-Labelled DNA

A volume of 5 μL of the stock solution of the c-DNA-modified particles DNA-Z-PSXY (XY=10, 40; Z=N, M, Sn; n=1-4) and DNA'-S4-PS40 were mixed with 95 μL of hybridization buffer (50 mM TRIS and 80 mM $MgCl_2$; pH 8) before addition of 5 μL of solutions containing different concentrations of a target oligonucleotide strand (t-DNA) complementary to the c-DNA and fluorescently labelled with 6-carboxyfluorescein (FAM), 5'-(6-FAM)-TAC AGC AAA CGA CAT-3'. The concentrations used were 2, 0.2, 0.1, 0.02, 0.01, 0.002, 0.0002, 0.00002 and 0.00001 pmol $\mu L^{-1}$. The particle suspensions were incubated in a thermomixer for 30 min at room temperature at 600 rpm before measurement. Control experiments with buffer containing no t-DNA were also performed.

Grafting of Molecular Beacon

A molecular beacon consisting of single-stranded DNA labelled with FAM as reporter molecule at the 5' region and 4-dimethylaminoazobenzene-4'-sulfonyl chloride (DABCYL) as quencher molecule at the 3' region (DNA-Beacon: 5'-FAM-TAGAAGGGTTACCTTGT-TACGACTTCT[$AmC_6$dT]CTA-DABCYL-3') was grafted covalently through its residual amino group, located on a thymine group of the complementary stem sequence region, to the particles COOH-S4-PS via an active-ester-method, following a similar procedure described above for DNA-S4-PS particles. 5 μL of 1% (w/v) COOH-S4-PS stock solutions were suspended in 100 μL 2-(N-morpholino)ethanesulfonic acid (MES) buffer (pH 5, 0.1 M), and subsequently 40 μL of a freshly prepared 1% (1-ethyl-3-(3-dimethylaminopropyl)carbodiimide hydrochloride) (EDC) solution in MES buffer and 80 μL of a 1% N-hydroxysulfosuccinimide (Sulfo-NHS) solution in MES buffer were added. After stirring for 15 min at room temperature, 6 μL of a 0.2 mM DNA beacon solution in tris(hydroxymethyl) aminomethane (Tris) buffer were added to the suspensions containing COOH-S4-PS. The mixtures were left to react in a thermomixer (1000 rpm) at 45° C. overnight, and 100 μL of Tris-HCl 0.1 M with 0.05% sodium dodecyl sulfate (SDS; pH 8) were added. After centrifugation (5 min; 6000 rpm), the particles were washed two times with 500 μL of the same Tris/SDS solution. Finally, the particles were dispersed in 200 μL 0.1 M Tris-HCl (pH 8), to obtain Beacon-S4-PS stock solutions with concentration of 0.25% v. The particles were stored at −20° C.

Hybridization Assays with DNA Strand Complementary to Beacon (cDNA

The optimization of the assay conditions and the assessment of the system's performance were carried out on a fluorometer and a flow cytometer, respectively. For the flow cytometric assays, an ELISA microplate was prepared by adding 100 μL hybridization buffer (50 mM Tris-HCl, $MgCl_2$80 mM, pH 8), 5 μL 0.25‰ Beacon-S4-PS stock solution and 5 μL hybridization buffer containing various amounts of DNA with sequences that are complementary to the sequence of the beacon (rc-DNA beacon sequence: 5'-AAGTCGTAACAAGGTAACC-3') into each well. The microplate was stirred 30 min at room temperature before an aliquot of the suspension of every well was injected in the flow cytometer and the fluorescence recorded at 533 nm ($\lambda_{exc}$=488 nm).

For the titration experiments conducted with a fluorometer, 20 μL of the 0.25‰ Beacon-S4-PS stock solution were suspended in 2 mL hybridization buffer (50 mM Tris-HCl, $MgCl_2$ 80 mM, pH 8) before spiking with 5 μL of the rc-DNA beacon sequence 5'-AAGTCGTAACAAGGTAACC-3'. The suspension was stirred 5 min at room temperature before the fluorescence emission was measured at 525 nm ($\lambda_{exc}$=488 nm).

Hybridization Assays with Genomic DNA

For the detection of genomic DNA, experiments were performed following the same approach as described for cDNA, but the samples were pre-heated for 5 min at 95° C. to de-hybridize the genomic DNA. Standard genomic DNA extracts from the bacteria *P. aeruginosa* strain ATCC 15442 and *F. johnsoniae* strain ATCC 17061 as well as the fungus *C. tropicalis* strain ATCC 750 were employed.

Synthesis of Gated Release Materials

Loading of M-PS and S-PS with SRG Dye (SRG-M-PS and SRG-S-PS)

M-PS and S-PS materials (50 mg) were suspended in 4 mL of 20 mM solution of the dye sulforhodamine G (SRG) in EtOH in 2 different 15 mL falcon tubes, and the suspensions were stirred for 24 hours at room temperature with the aim to achieve maximum loading of the pores of the M-PS and S-PS materials. Afterwards, the suspension containing SRG-M-PS in EtOH (1.25% w/v) was divided in 3 fractions of 1.3 mL each, and the suspensions were left for the further preparation of the gated materials Hg-SRG-M-PS, pH-SRG-M-PS and NH2-SRG-M-PS. The suspension containing the SRG-S-PS material (1.25% w/v) was divided in 2 fractions of 2 mL each and left for the further preparation of the gated material pH-SRG-S-PS.

Functionalization with Anchor Molecules for pH Gating (pH-SRG-M-PS and pH-SRG-S-PS)

30 or 44.4 μL of (3-Trimethoxysilylpropyl)diethylenetriamine (TMPD); 5 mmol TMPD $g^{-1}$ SRG-Z-PS, with Z=M, S) were added to a 1.3 or 2 mL suspension of SRG-M-PS or SRG-S-PS in EtOH (1.25% w/v), respectively, and the final mixtures were stirred for 5.5 h at room temperature, ensuring with this sequence that the diffusion of TMPD groups into the pores is hampered and functionalization with TMPD occurs primarily at the outer surface. Afterwards, materials SRG-M-PS and SRG-S-PS were centrifuged (6000 rpm, 5 min), washed with 12 mL of EtOH, centrifuged again (6000 rpm, 5 min) and washed afterwards 3 times with 40 mL of $H_2O$ at pH 3 and dried.

Functionalization with Anchor Molecules for Mercury Ion Gating (Hg-SRG-M-PS)

20 μL of 3-Mercaptopropyltriethoxysilane (MPTS; 5 mmol MPTS $g^{-1}$ SRG-M-PS) was added to a 1.3 mL suspension of SRG-M-PS in EtOH (1.25% w/v), and the final mixture was stirred for 5.5 h at room temperature. This sequence guarantees that diffusion of MPTS into the pores is hampered and functionalization with MPTS occurs primarily at the outer surface. Afterwards, the material was centrifuged (6000 rpm, 5 min), washed with 4 mL of EtOH, centrifuged again (6000 rpm, 5 min) and resuspended in 10 mL of a mixture of 5:1 v/v CHES-EtOH pH 9.6. Thereafter, 1.1 mL of a squaraine dye (1,3-bis(4-(bis(2-(2-methoxyethoxy)ethyl)amino)phenyl)-4-oxocyclobut-2-en-1-ylium-2-olate; 1.5 mM in EtOH) were added to the suspension and the mixture was stirred for 5 min. Finally, the solid Hg-SRG-M-PS was centrifuged (6000 rpm, 5 min), washed six times with EtOH 6 (50 mL) and dried. The squaraine dye was prepared by refluxing a mixture of N,N-bis(2-(2-methoxyethoxy)ethyl)aniline (890 mg, 3 mmol) and 3,4-dihydroxy-3-cyclobutene-1,2-dione (squaric acid, 171 mg, 1.5 mmol) in a solution of toluene:butanol 1:1 under azeotropical removal of water, yielding a blue solid that was isolated by vacuum filtration according to: Ros-Lis, J. V. et al, J. Am. Chem. Soc., 2004, 126 (13), 4064-4065.

Functionalization with Amino Groups (NH2-SRG-M-PS)

20 μL of 3-Aminopropyltriethoxysilane (APTES); 5 mmol APTES $g^{-1}$ SRG-M-PS) were added to a 1.3 mL suspension of SRG-M-PS in EtOH (1.25% w/v), and the final mixture was stirred for 5.5 h at room temperature. Afterwards, material NH2-SRG-M-PS was centrifuged (6000 rpm, 5 min), washed 2 times with 12 mL of EtOH, centrifuged again (6000 rpm, 5 min) and dried.

Coupling of Aptamer to Particles (Pen-SRG-M-PS)

Pen-SRG-M-PS material containing the aptamer Pen-COOH covalently bound to NH2-SRG-M-PS was prepared in a second step following a similar procedure described above for DNA'-S4-PS40. For that purpose, 20 μL of Pen-COOH aptamer stock solution (100 μM; water) 5'-COOH-C10-TTT TCT GAA TTG GAT CTC TCT TCT TGA GCG ATC TCC ACA-3' were added to 100 μL of a freshly prepared 1% (w/v) EDC solution in MES buffer (100 mM; pH 5), and afterwards 100 μL of a S—NHS solution in MES-buffer were added to the mixture. Reagents were mixed 15 min. The mixture of reactants was then added to a suspension prepared previously containing 1 mg of NH2-SRG-M-PS in 100 μL MES buffer (100 mM; pH 5), and the mixture was left to react in a thermomixer (1000 rpm) at 45° C. overnight. Afterwards, 200 μL tris(hydroxymethyl)aminomethane chloride and sodium lauryl sulfate buffer (0.1 M TRIS-HCl with 0.05% SDS) were added and, after centrifugation, the mixture was washed twice with 500 μL TRIS/SDS (0.1 M TRIS-HCl with 0.05% SDS). Finally, particles Pen-SRG-M-PS were re-dispersed in 500 μL 0.01 M Phosphate buffer (pH 8) to reach a sock solution concentration of 0.2%, and were stored on the refrigerator at 8° C.

Synthesis of Materials Containing a Polystyrene Core and a Magnetic Layer

Synthesis of Superparamagnetic Iron Oxide Nanoparticles (Fe10)

In a round bottom flask, 0.338 g of $FeCl_3 \times 6\ H_2O$ and 0.172 g $FeCl_2 \times 4\ H_2O$ were dissolved in 100 mL MilliQ water. The solution was then degassed with an argon stream for 20 min. Afterwards, a solution of 58 mL $NH_3$ sol. (16%) containing 4 g PVP (PVP 10) was added dropwise over a period of 2 min. The reaction mixture was stirred for 1.5 h with a mechanical stirrer at 150 rpm. The particles were subsequently separated with a magnet and washed with water, before re-dispersing in Milli-Q water. The particles were stored in a refrigerator in a concentration of ca. 3% (w/v).

Coating of Polystyrene Cores with Iron Oxide Nanoparticle Shell (Fe10@PS10)

In order to coat the organic polymer cores with the superparamagnetic magnetic layer, a solution containing 60 mg PS10 particles and 2 mL Fe10 particles (~3% in water) was prepared with 30 mL Milli-Q water in falcon tubes. The coating was performed by rotating the tubes on a rotator plate at 40 rpm for 1.5 h. Then, the particles were washed twice with water and once with ethanol, before drying.

Coating of Fe10@PS10 with Nonporous Silica Shell (N-Q× @Fe10@PS with Q=1, 3, 5)

60 mg of Fe10@PS10 particles were dispersed in 30 mL ethanol and 1 mL Milli-Q water. The solution was stirred with an overhead stirrer at 150 rpm. Then, 185 μL $NH_3$ sol. (32%) for N-1×@Fe10@PS10, 555 μL $NH_3$ sol. (32%) for N-3×@Fe10@PS10 and 925 μL $NH_3$ sol. (32%) for N-5× @Fe10@PS10 were added, followed by the dropwise addition of 185 μL, 555 μL or 925 μL TEOS. The mixtures were stirred over night at 38° C. The particles were washed multiple times with water and ethanol before drying, yielding N-Q×@Fe10@PS10 (with Q=1, 3, 5).

Coating of N-3×@Fe10@PS10 with MCM-41-Type Silica Shell (M@Fe10@PS10)

50 mg of N-3×@Fe10@PS10 particles were dispersed in 15 mL vials in 1 mL ethanol abs., 1.3 mL Milli-Q water and 50 μL ammonia (32%). 10 mg CTAB were given to this reaction mixture and the dispersion was sonicated with an ultrasonic bath for 10 min. Afterwards, 20 μL TEOS were added and the reaction mixture was stirred for 24 h at room temperature. Finally, the particles were centrifuged (5 min, RPM 6000) and washed three times with 20 mL ethanol, before drying in a vacuum at room temperature.

Coating of N-3×@Fe10@PS10 with SBA-15-Type Silica Shell (Sn@Fe10@PS with n=1, 2)

In an acidic synthesis route, a solution of 60 mg P123 in 30 mL of HCl (0.1 M) in water was prepared. To protect the magnetic material from these acidic conditions, N-3× @Fe10@PS10 particles were used. As explained further below, N-3×@Fe10@PS10 showed the most suitable morphology of Fe10@PS10 coated with a nonporous shell. Without the intermediate silica layer directly covering the magnetic material, the Fe10 shell would be dissolved under the acidic conditions. In case of S1@Fe10@PS, only 150 mg N-3×@Fe10@PS10 were added to the acidic solution with the micelle-forming templating agent and for S2@Fe10@PS10, 150 mg N-3×@Fe10@PS10 and 180 mg $MgSO_4$ were added to the acidic solution with the micelle-forming templating agent. The dispersions were sonicated with in an ultrasonic bath for 5 min. 0.160 mL TEOS were added under vigorous stirring and the reaction was stirred at room temperature for 24 h.

Coating of N-3×@Fe10@PS10 with SBA-15-Type Silica Shell (S4@Fe10@PS)

For the neutral synthesis route, a solution of 50 mg P123 and 80 mg $MgSO_4$ for S4@Fe10@PS10 in 40 mL Milli-Q water and 16.09 mL ethanol (abs.) was prepared. Then, 0.1 g N-3×Fe10@PS10 particles were added, and the dispersion was sonicated with an ultrasonic bath (amplitude 75 Hz) for 5 min. 0.222 mL TEOS were added under vigorous stirring and the reaction was stirred at 36° C. for 24 h. Afterwards, the mixtures were transferred to a Teflon container and hydrothermally treated for 24 h at 100° C. Then, the particles were centrifuged (5 min, RPM 6000) and washed three times with 20 mL ethanol, before drying in a vacuum at room temperature.

Functionalization with Amino Groups (NH2-N-Q× @Fe10@PS10 with Q=1, 3, 5)

The functionalization of N-Q×@Fe10@PS10 (Q=1, 3, 5) with amino groups was done in the same way as described above for NH2-Z-PSXY (XY=10, 40; Z=N, M, Sn; n=1-6).

Functionalization with Carboxylic Acid Groups (COOH-N-Q×@Fe10@PS10 with Q=1, 3,5)

The secondary functionalization of NH2-Z-PSXY (XY=10, 40; Z=N, M, Sn; n=1-6) with carboxylic acid groups was done in the same way as described above for COOH-Z-PSXY; XY=10, 40; Z=N, M, Sn; n=1-6).

Characterization of Materials Z-PSXY, NH2-Z-PSXY, COOH-Z-PSXY, DNA-Z-PSXY and DNA'-S4-PS40 (XY=10, 40; Z=N, M, Sn; n=1-6)

Scanning Electron Microscopy and Nitrogen Adsorption-Desorption Isotherms

The particles were characterized using different standard methods. 0.001% (w/v) Suspensions of the core-shell particles in the various functionalization stages were prepared in water. Zeta potentials of these solutions (2 mL) were measured on a Zetasizer Nano-ZS from Malvern. For porosimetry, 80-180 mg of the core-shell particles were used, and the micelle-forming templating agent was removed in an ultrasonic bath (400 μL 1 M HCl in ethanol) through sonication for 5 min before measurement of the $N_2$ absorption/desorption isotherms. Electron micrographs were recorded for 1% suspensions of the particles in ethanol. For TEM measurements, the polystyrene core had to be removed via pyrolysis at 520° C.

Figure 15:
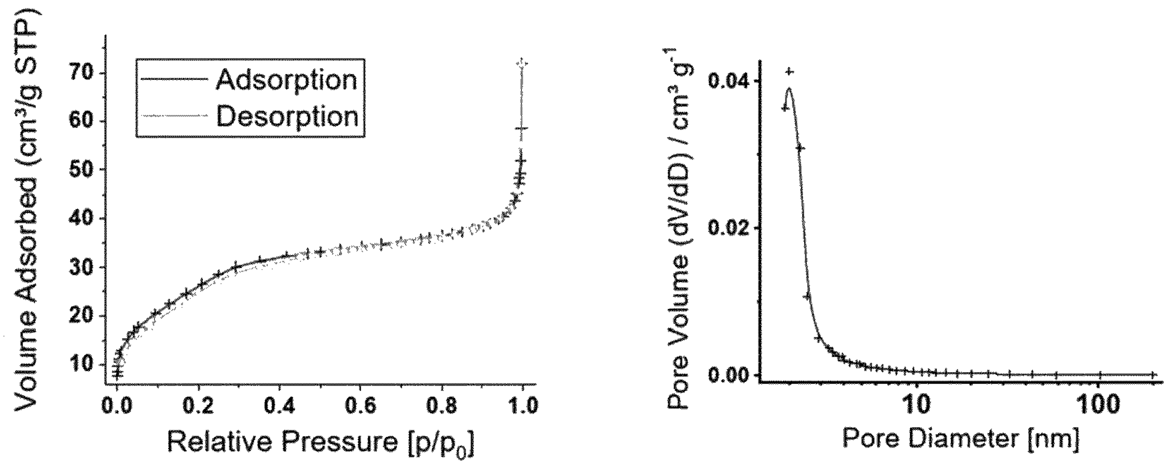
FIG. 15 shows $N_2$ adsorption-desorption isotherms (left) and corresponding pore size distribution (right) of M-PS40.
Figure 17:
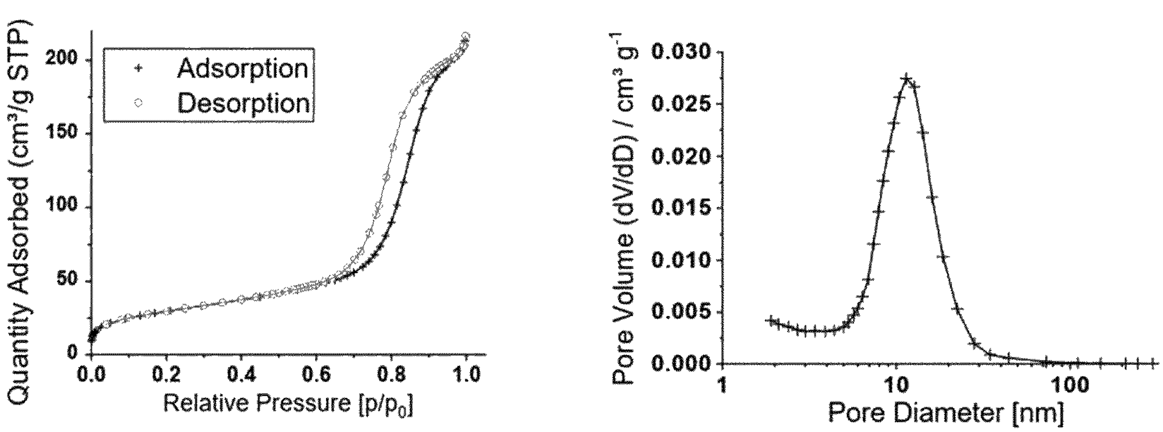
FIG. 17 shows $N_2$ adsorption-desorption isotherms (left) and corresponding pore size distribution (right) of S4-PS40.

Nitrogen adsorption/desorption studies shown in FIGS. 15 and 17 show a type-IV isotherm typical for such materials. Values of specific surface areas (in $m^2\ g^{-1}$) were estimated using the Brunauer-Emmett-Teller (BET) formalism as an evaluation method whereas pore size distributions were calculated using the desorption branch of the isotherms and the Barrett-Joyner-Halenda (BJH) method. External surface area, micropore surface area and volume were estimated by the t-plot method. The pore sizes were derived from the maximum of the peak in the distribution curves. The results are shown in Table 1 below.

TABLE 1

BET, external and micropore surface areas, total pore and micropore volumes and pore diameter derived from nitrogen adsorption/desorption studies using BET, BJH and t-plot methods.

| Sample | $S_{BET}$/ $m^2\ g^{-1}$ | $S_{t\text{-}plot\ micropore}$/ $m^2\ g^{-1}$ | $S_{t\text{-}plot\ ext}$/ $m^2\ g^{-1}$ | Total pore volume/ $cm^3\ g^{-1}$ | Micropore volume/ $m^2\ g^{-1}$ | Pore diameter/ nm |
|---|---|---|---|---|---|---|
| N-PS40 | 9.8 ± 2.0 | 1.2 | 8.6 | 0.021 | 0.0010 | — |
| M-PS40 | 108 ± 10 | 87.10 | 20.1 | 0.058 | 0.0430 | 2.0 ± 0.5 |
| S1-PS40 | 117 ± 20 | 12.4 | 104.5 | 0.24 | 0.0038 | 7.2 ± 1.8 |
| S2-PS40 | 108 ± 15 | 15.9 | 92.6 | 0.16 | 0.0056 | 9.0 ± 1.0 |
| S3-PS40 | 101 ± 10 | 11.9 | 89.2 | 0.20 | 0.0044 | 8.9 ± 8.0 |
| S4-PS40 | 107 ± 15 | 16.5 | 90.7 | 0.31 | 0.0061 | 11.5 ± 6.5 |

M-PS40 shows two well-distinguished adsorption steps in the adsorption/desorption isotherms, the first one ascribed to the nitrogen condensation inside the mesopores by capillarity, and a second step at higher $P/P_0$ values ascribed to the nitrogen adsorption on the outer particle surface, forming the mesoporous shell. The absence of a hysteresis loop for the MCM-41 shell in this interval supports the existence of uniform cylindrical mesopores. S4-PS40 however shows hysteresis loops in the region of $P/P_0$=0.7-0.9, indicating gas retention inside the pores and a slower desorption through the more complicated morphology of the voids.

Zeta Potential and Ninhydrin Test

To determine the success of the functionalization, zeta potential measurements were performed for the different materials. Table 2 collects the respective data for materials PSXY, N-PS40, M-PS40 S4-PSXY, NH2-N-PS40, NH2-M-PS40, NH2-S4-PSXY, COOH-N-PS40, COOH-M-PS40 and COOH-S4-PSXY (XY=10, 40) which indicates the successful functionalization of the core-shell particles.

TABLE 2

Zeta potentials of the different materials prepared.

| Sample | Zeta potential/mV |
|---|---|
| PS10 | −39.5 ± 1.4 |
| PS40 | −36.2 ± 1.0 |
| N-PS40 | −33.7 ± 1.1 |
| M-PS40 | −17.8 ± 0.7 |
| S4-PS10 | −36.2 ± 4.4 |
| S4-PS40 | −29.1 ± 4.0 |
| NH2-N-PS40 | +0.3 ± 0.6 |
| NH2-M-PS40 | +21.6 ± 1.0 |
| NH2-S4-PS10 | +23.2 ± 3.2 |
| NH2-S4-PS40 | +27.2 ± 2.3 |
| COOH-N-PS40 | −27.5 ± 1.2 |
| COOH-M-PS40 | −21.6 ± 1.8 |
| COOH-S4-PS10 | −37.8 ± 1.3 |
| COOH-S4-PS40 | −41.3 ± 0.7 |

The core particles, because of residual initiator, as well as the silica shelled particles M-PS40 and S4-PSXY (XY=10, 40), because of the presence of silanol groups, show a distinctly negative zeta potential. Upon amination, the sign was reversed, the excess of protonatable groups on the surface leading to strongly positive values in all cases except for NH2-N-PS40, for which the lower number of amino moieties on the surface (Table 3) is only able to produce a weakly positive value. Re-functionalization with deprotonatable carboxylic acid groups then endowed the particles again with negative zeta potentials. In general, neat as well as functionalized MCM-41-type shells yielded lower absolute values than their SBA-15-type counterparts. This might be the result of a lower amount of absolute external surface area of MCM compared with SBA shells (see Table 1), or of the accessibility of the potentially charged functions in the different pore systems.

Figure 19:
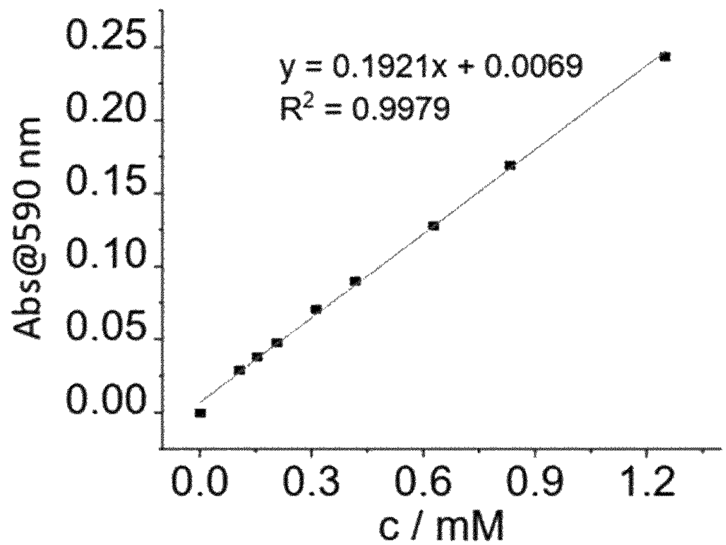
FIG. 19 is a Ninhydrin-test calibration curve employing pentylamine as standard.

The amino groups on the surface of the core-shell particles were quantified with the ninhydrin test. In this test, primary amines react with ninhydrin and produce the dye Ruhemann's Purple, which has an absorption maximum at 590 nm and can be conveniently quantified by UV/Vis absorption spectroscopy. The colored supernatant of the suspension was thus measured with a spectrophotometer and pentylamine was used as a standard to perform a calibration curve. FIG. 19 shows the calibration curve of the test and the values determined for the respective materials are reported in Table 3 below.

TABLE 3

Amount (mmol $g^{-1}$ solid), density (molecules $nm^{-2}$) and average distance (nm) of amino groups anchored on the surface of the respective materials.

| Sample | $C_{NH2}$/ mmol $g^{-1}$ solid | Surface area[a]/ $m^2 g^{-1}$ | Density/ groups $nm^{-2}$ | Distance/nm |
|---|---|---|---|---|
| NH2-M-PS10 | 0.67 ± 0.07 | 108 ± 10 | 4.0 ± 0.4 | 0.50 ± 0.03 |
| NH2-S1-PS10 | 0.26 ± 0.03 | 105 ± 10 | 1.4 ± 0.1 | 0.83 ± 0.05 |
| NH2-S2-PS10 | 0.39 ± 0.04 | 110 ± 15 | 2.3 ± 0.2 | 0.66 ± 0.04 |
| NH2-S3-PS10 | 0.22 ± 0.02 | n.d.[b] | 1.3 ± 0.1 [c] | 0.88 ± 0.05 [c] |
| NH2-S4-PS10 | 0.50 ± 0.05 | n.d.[b] | 2.8 ± 0.3 [c] | 0.59 ± 0.03 [c] |
| NH2-S5-PS10 | 0.46 ± 0.05 | n.d.[b] | 2.8 ± 0.3 [c] | 0.60 ± 0.04 [c] |
| NH2-S6-PS10 | 0.28 ± 0.03 | n.d.[b] | 1.7 ± 0.2 [c] | 0.77 ± 0.06 [c] |
| NH2-N-PS40 | 0.11 ± 0.02 | 9.8 ± 2.0 | 6.0 ± 0.5 | 0.41± 0.02 |
| NH2-M-PS40 | 1.63 ± 0.20 | 100 ± 10 | 9.8 ± 1.1 | 0.32 ± 0.02 |
| NH2-S1-PS40 | 0.31 ± 0.03 | 117 ± 20 | 1.7 ± 0.1 | 0.76 ± 0.04 |
| NH2-S2-PS40 | 0.40 ± 0.04 | 108 ± 15 | 2.3 ± 0.2 | 0.66 ± 0.03 |
| NH2-S3-PS40 | 0.70 ± 0.07 | 101 ± 10 | 4.2 ± 0.4 | 0.49 ± 0.03 |
| NH2-S4-PS40 | 0.88 ± 0.09 | 107 ± 15 | 5.0 ± 0.5 | 0.45 ± 0.03 |

[a]Obtained for the non-aminated particles, see also Table 6.

[b]Not determined.

[c] Surface areas of the corresponding Sn-PS40 particles were used for calculation.

As can be seen, the densities of amino groups on shells grown onto PS10 cores were in general distinctly lower than those on the respective shells grown onto PS40. With respect to shell type, NH2-M-PS40 contained ca. twice the number of amino groups compared to NH2-Sn-PS40, possibly due to better autocatalytic condensation of APTES in the narrow pores with a higher wall curvature. In addition, whereas the molecule density was comparable for Sn-PS10 (2.0±0.7 molecules $nm^{-2}$), the dependence on SDMs was more pronounced for the PS40 core.

Limits of Blank (LOB), Detection (LOD) and Quantification (LOQ) and Dynamic Range The parameters Limit of Blank (LOB), Limit of Detection (LOD), and Limit of Quantification (LOQ) describe the smallest concentration of a sample that can be reliably measured by an analytical procedure. LOB is defined as the highest putative analyte concentration expected to be found when replicates of a blank sample in absence of the analyte are measured. LOD is defined as the lowest analyte concentration likely to be reliably distinguished from the LOB and at which detection is feasible, whereas the LOQ is defined as the lowest concentration at which the analyte cannot only be reliably detected but can be properly quantified. These parameters were estimated according the following equations:

$$LOB = \text{mean blank} + 1.645(\sigma_{blank})$$

$$LOD = LOB + 1.645(\sigma_{low\ concentration\ sample})$$

$$LOQ = LOB + 10(\sigma_{low\ concentration\ sample})$$

The dynamic range was defined as the concentration range between the concentrations that possessed a signal intensity between 20% (IC20) and 80% (IC80) of the maximum signal.

The values listed in Table 4 have been detected according to an embodiment for the corresponding samples tested with t-DNA decorated core-shell particles.

TABLE 4

LOD, LOQ, maximum signal of fluorescence (Smax) and dynamic concentration range found for selected materials.

| Sample | LOD amol $\mu L^{-1}$ | LOQ amol $\mu L^{-1}$ | $S_{max}$ counts | $IC_{20}$ fmol $\mu L^{-1}$ | $IC_{80}$ fmol $\mu L^{-1}$ | Dynamic Range ($IC_{80}$-$IC_{20}$) fmol $\mu L^{-1}$ |
|---|---|---|---|---|---|---|
| DNA-S1-PS10 | 42 ± 22 | 222 ± 19 | 3940 ± 167 | 0.70 ± 0.05 | 5.6 ± 0.6 | 4.9 |
| DNA-S1-PS10 | 26 ± 10 | 121 ± 8 | 15773 ± 215 | 0.66 ± 0.02 | 5.0 ± 0.4 | 4.4 |
| DNA-N-PS40 | 580 ± 36 | 910 ± 65 | 19200 ± 62 | 4.19 ± 0.50 | 20.6 ± 0.4 | 16.5 |
| DNA-M-PS40 | 228 ± 78 | 752 ± 80 | 4778 ± 30 | 1.32 ± 0.08 | 24.0 ± 4.7 | 22.6 |
| DNA-S3-PS40 | 25 ± 30 | 108 ± 8 | 5978 ± 50 | 0.63 ± 0.35 | 78.0 ± 5.7 | 77.4 |
| DNA-S4-PS40 | 4 ± 2 | 80 ± 7 | 33322 ± 864 | 2.70 ± 0.60 | 35.0 ± 15 | 32.0 |
| c9-DNA'-S4- PS40 | 10 ± 5 | 58 ± 15 | 824558 ± 25808[a] | 10.35 ± 1.15 | n.d.[b] | n.d.[b] |
| c15-DNA'-S4- PS40 | 100 ± 20 | 364 ± 68 | 533047 ± 8505[a] | 19.36 ± 1.45 | n.d.[b] | n.d.[b] |

[a]signal was not saturated.

[b]as signal was not saturated, dynamic range values were not determined.

As can be seen DNA-S4-PS40 was the most sensitive material with an at least 50-times better sensitivity than the corresponding analogues DNA-M-PS40 and DNA-N-PS40. Materials DNA-S1-PS10 and DNA-S4-PS10 showed distinctly narrower dynamic ranges, while DNA-S3-PS40 showed the broadest dynamic range.

Figure 21:
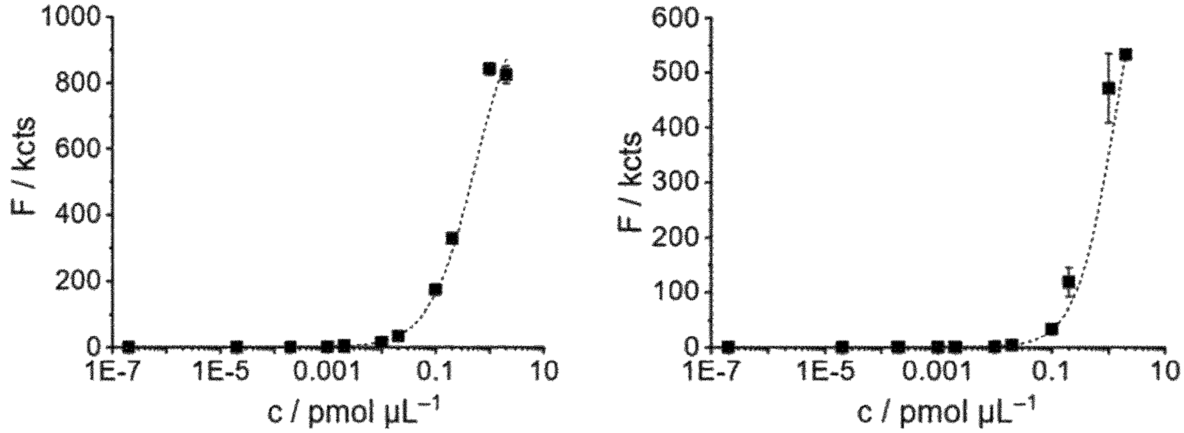
FIG. 21 shows the fluorescence of the t-DNA hybridized core-shell particles DNA'-S4-PS40 employing c9-DNA (left) and c15-DNA (right).

Hybridization assays performed with DNA'-S4-PS40, employing longer or shorter capture strands c9-DNA'-S4-PS40 and c15-DNA'-S4-PS40, are depicted in FIG. 21. As discussed in the text, the continued nonspecific binding of t-DNA strands to the excess of free amino/ammonium groups on the particles' surface even beyond the point of detector saturation makes it impossible to derive relevant dynamic ranges and yields significantly higher apparent $S_{max}$. Moreover, despite the latter, the sensitivity that can be reached with c9-DNA'-S4-PS40 and c15-DNA'-S4-PS40 is worse than that of DNA-S4-PS40. The difference between c9-DNA'-S4-PS40 and c15-DNA'-S4-PS40, i.e., that the particles with the shorter capture strands perform much better, is probably due to the type of assay that is carried out with the partner cn-DNA and NH2-S4-PS40: here, the carboxylic acid groups on the DNA strands are activated with EDC and NHS, in contrast to the particle surface for c-DNA anchoring to COOH-S4-PS40. When the c-DNA is activated, use of the smaller and faster moving c9-DNA can presumably lead to higher surface coverage than use of c15-DNA.

TABLE 5

Oligonucleotide sequences used (all oligonucleotides have been obtained at metabion GmbH, 82152 Planegg/Steinkirchen, Semmelweisstr. 3, Germany; and were purified before use by HPLC). The column entitled "No." indicates the number of the corresponding sequence (sequence No.) in the attached sequence listing.

| Oligonucleotide | Sequence | No. |
|---|---|---|
| c-DNA | 5'-C6 Amino-TTT ATG TCG TTT GCT GTA-3' | 1 |
| c9-DNA | 5'-Carboxy C10-TTT ATG TCG TTT-3' | 2 |
| c15-DNA | 5'-Carboxy C10-TTT ATG TCG TTT GCT GTA-3' | 3 |
| t-DNA | 5'-6-Fam-TAC AGC AAA CGA CAT-3' | 4 |
| t9-DNA | 5'-6-Fam-AAA CGA CAT-3' | 5 |
| t-DNA-1M-Center | 5'-6-Fam-TAC AGC AGA CGA CAT-3' | 6 |
| t-DNA-1M-3End | 5'-6-Fam-TAC AGC AAA CGA CGT-3' | 7 |
| t-DNA-2M | 5'-6-Fam-TAC AGC AGA CGA CGT-3' | 8 |
| t-DNA-4M | 5'-6-Fam-TGC AGC AGA CGG CGT-3' | 9 |
| HPV6 | 5'-C6 Amino-TTT TCC GTA ACT ACA TCT TCC A-3' | 10 |
| HPV6RC | 5'-6-Fam-T GGA AGA TGT AGT TAC GGA -3' | 11 |
| HPV11 | 5'-C6 Amino-TTT TCT GTG TCT AAA TCT GCT AC-3' | 12 |
| HPV11RC | 5'-6-Fam-GT AGC AGA TTT AGA CAC AGA-3' | 13 |
| HPV16 | 5'-C6 Amino-TTT TAC CTA CGA CAT GGG GAG-3' | 14 |
| HPV16RC | 5'-6-Fam-CTC CCC ATG TCG TAG GTA-3' | 15 |
| HPV18 | 5'-C6 Amino-TTT TGC TTC TAC ACA GTC TCC T-3' | 16 |
| HPV18RC | 5'-6-Fam-A GGA GAC TGT GTA GAA GCA-3' | 17 |
| DNA beacon | 5'-FAM-TAGAAGGGTTACCTTGTTACGACTTCT[AmC$_6$dT]CTA-DABCYL-3' | 18 |
| rc-DNA beacon | 5'-AAGTCGTAACAAGGTAACC-3') | 19 |
| Pen-COOH | 5'-COOH-C10-TTT TCT GAA TTG GAT CTC TCT TCT TGA GCG ATC TCC ACA-3' | 20 |

Characterization of Dye-Doped Polystyrene Cores

Figure 27:
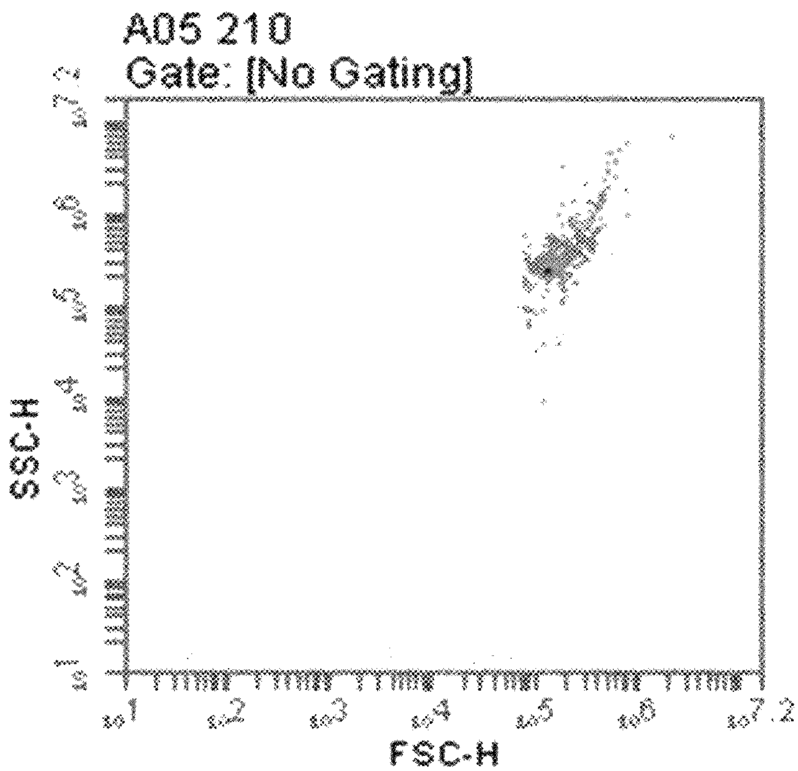
FIG. 27 is a scattering plot of PS particles doped with dye I.
Figure 28:
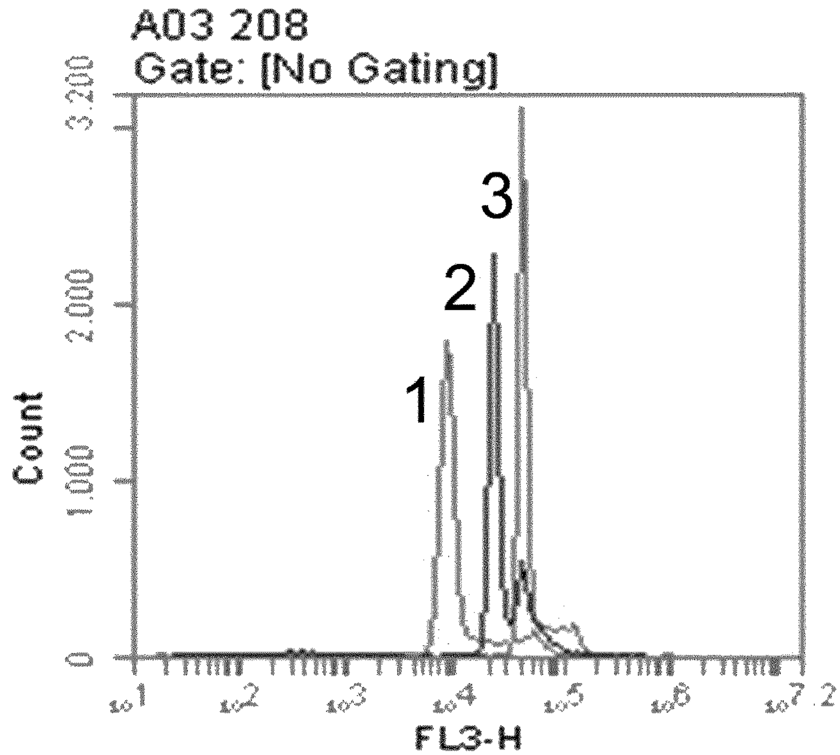
FIG. 28 shows the particle distribution plot as a function of the fluorescence, showing the different doped PS with different concentrations of dye I, the concentration increasing from 1 to 3.
Figure 40:
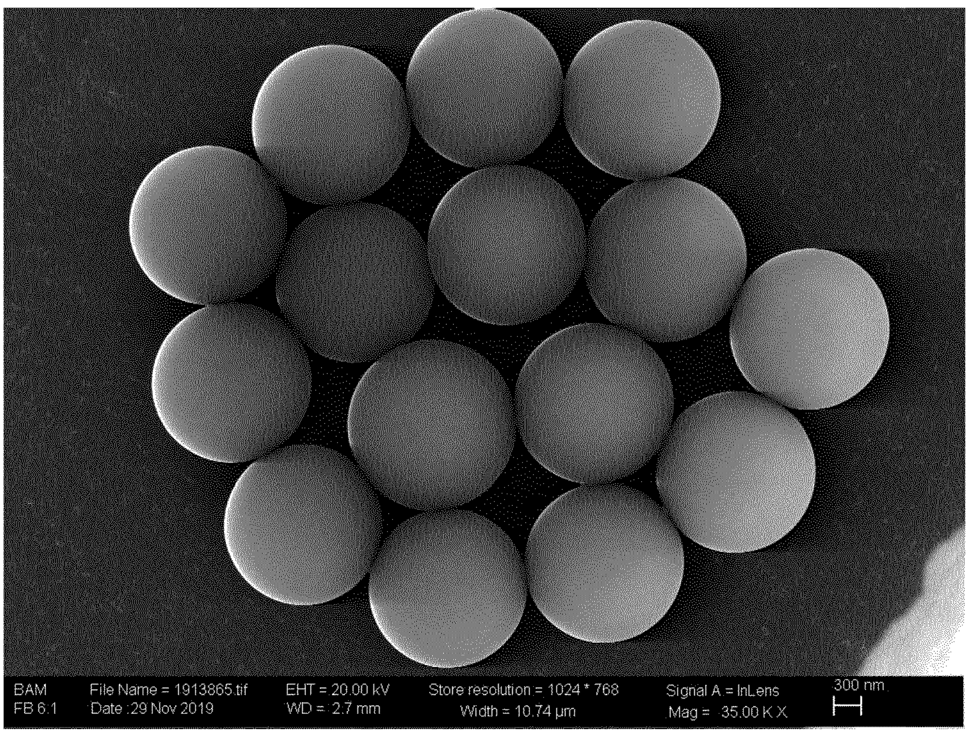
FIG. 40 is a SEM micrograph of doped PS10 with dye II (in a concentration of 0.25 nM, scale bar 300 nm).

Suspensions of PS10 particles containing dye II doped into its core were investigated with respect to their dispersity by flow cytometry. FIG. 27 shows a scattering plot in the form of a dot plot for such H-doped PS10 particles, plotting forward (FSC) vs. sideward (SSC) scattering signals. Therein, the FSC signal is sensitive with respect to the size of the measured particles, wherein the SSC signal is sensitive with respect to surface structure/roughness and isotropy (non-sphericity). As can be seen in FIG. 40, doped PS10 particles are monodisperse after doping with dye II; no fused particles were found. FIG. 28 shows a plot of the particles as a function of the fluorescence of the cores doped with different concentrations of dye II (0.5 nM; 0.25 nM; 0.125 nM). All three samples are distinguishable by their fluorescence signal. The sample with the dye II concentration 0.25 nM was chosen to be coated with Fe10 and silica.

Characterization of Materials Fe10, N-Q×@Fe10@PS10, M@Fe10@PS10, S4@Fe10@PS and NH2-N-Q× @Fe10@PS10 (Q=1, 3, 5)

Scanning Electron Microscopy and Ninhydrin Test

Fe10 Particles

Figure 24:
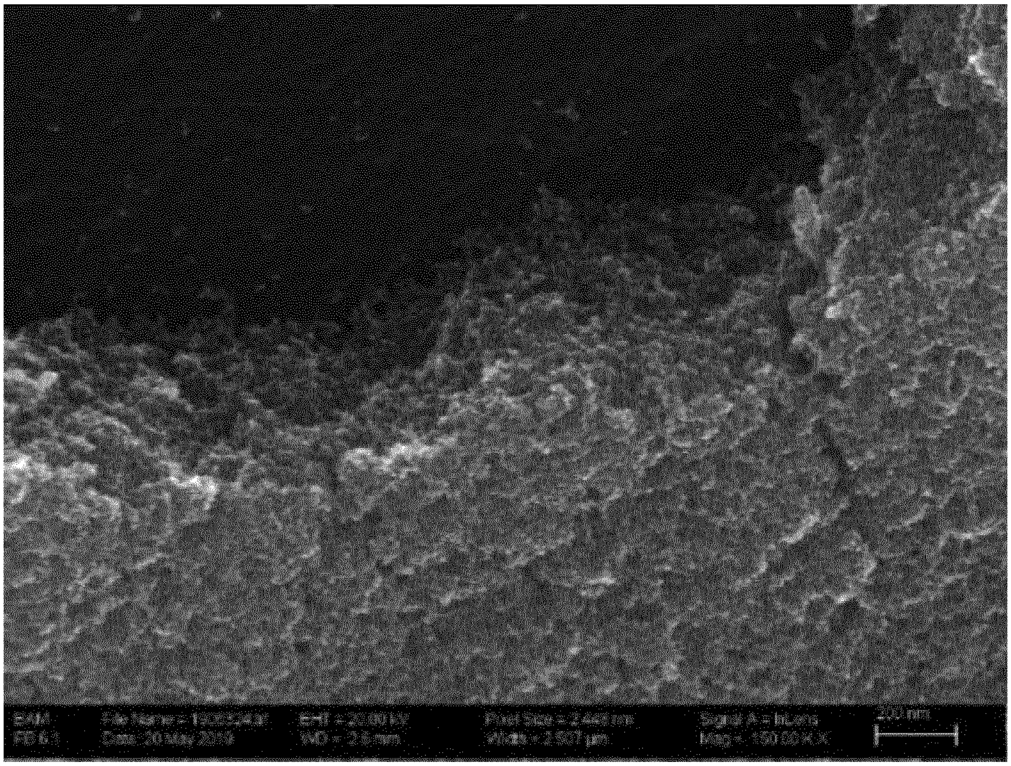
FIG. 24 is a SEM micrograph of Fe10 after drying (scale bar 200 nm).
Figure 25:
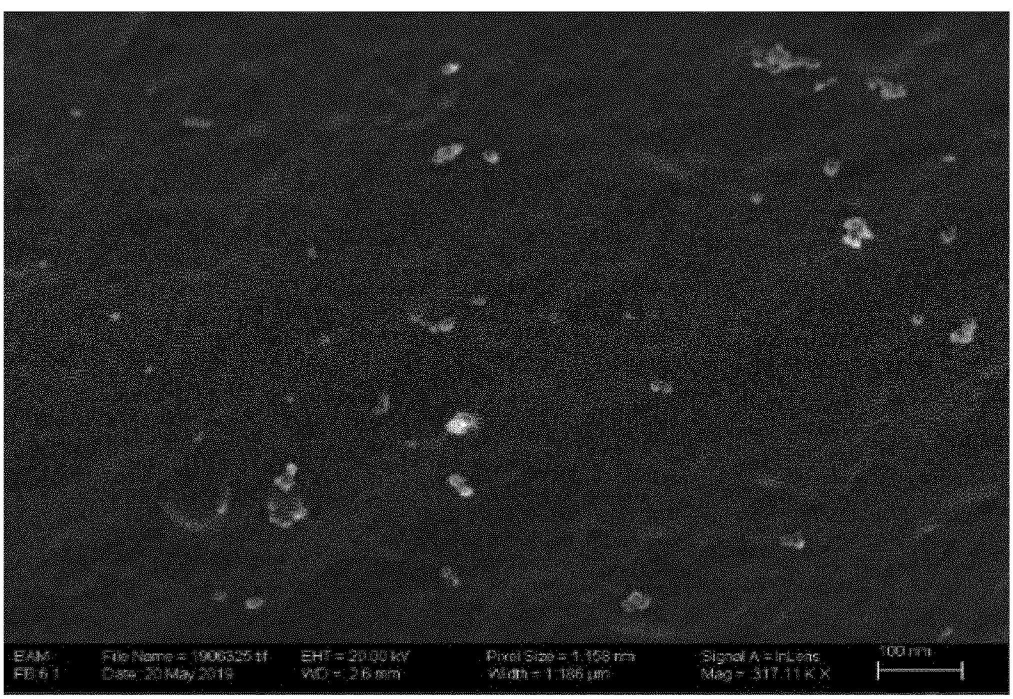
FIG. 25 is a SEM micrograph of single Fe10 particles (scale bar 100 nm).
Figure 26:
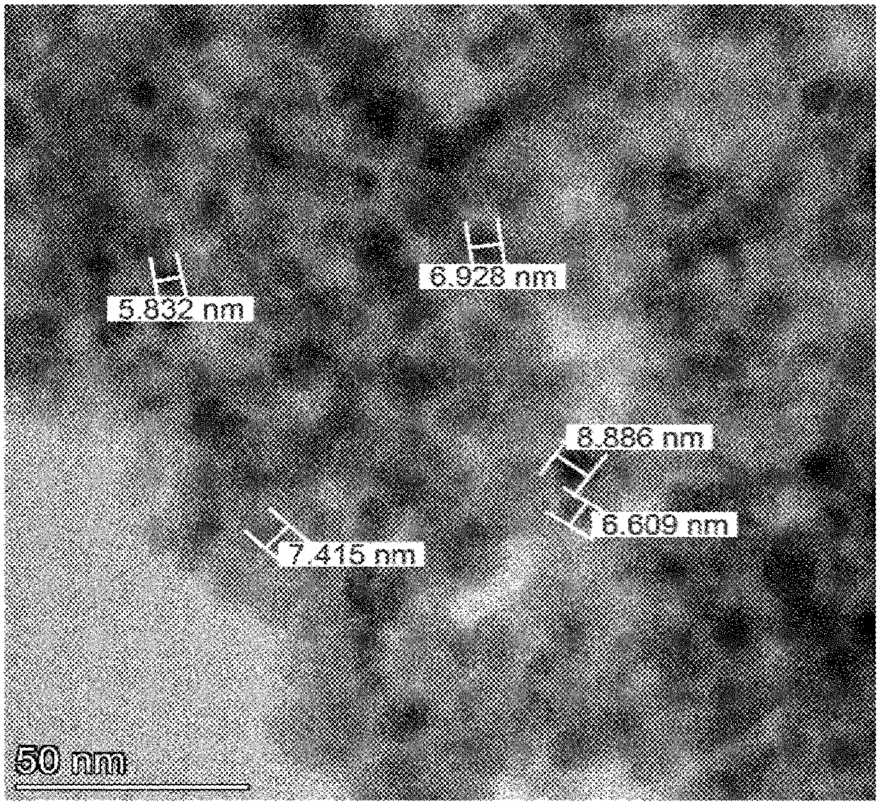
FIG. 26 is a TEM micrograph of Fe10 particles.

Images collected under scanning or transmission electron microscopy showed that the use of PVP in the synthesis of the Fe10 particles avoids particle agglomeration and retains a stable iron oxide nanoparticle dispersion in water. The particles appear agglomerated in FIG. 24, presumably because of the drying during sample preparation on the electron-microscopy grid. However, as visible in FIG. 25 the particles are still separable and single particles can be seen, e.g., when samples were prepared via spin-coating. FIG. 26 shows again the single, separated particles with a diameter of about 7 nm.

N-Q×@Fe10@PS10 Particles with Q=1, 3, 5

Figure 29:
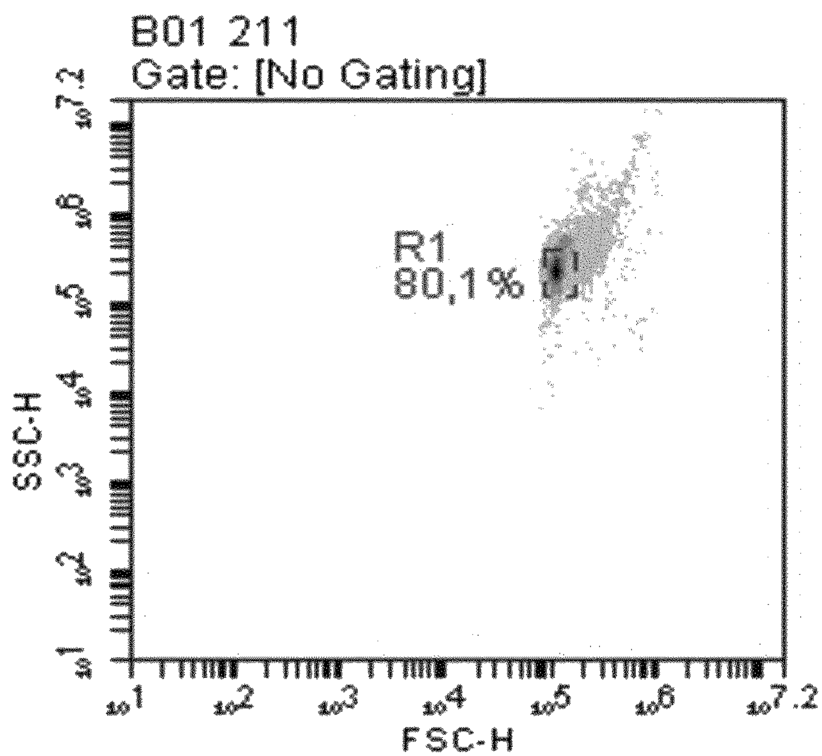
FIG. 29 is a scattering plot of doped N-3×@Fe10@PS10.
Figure 30:
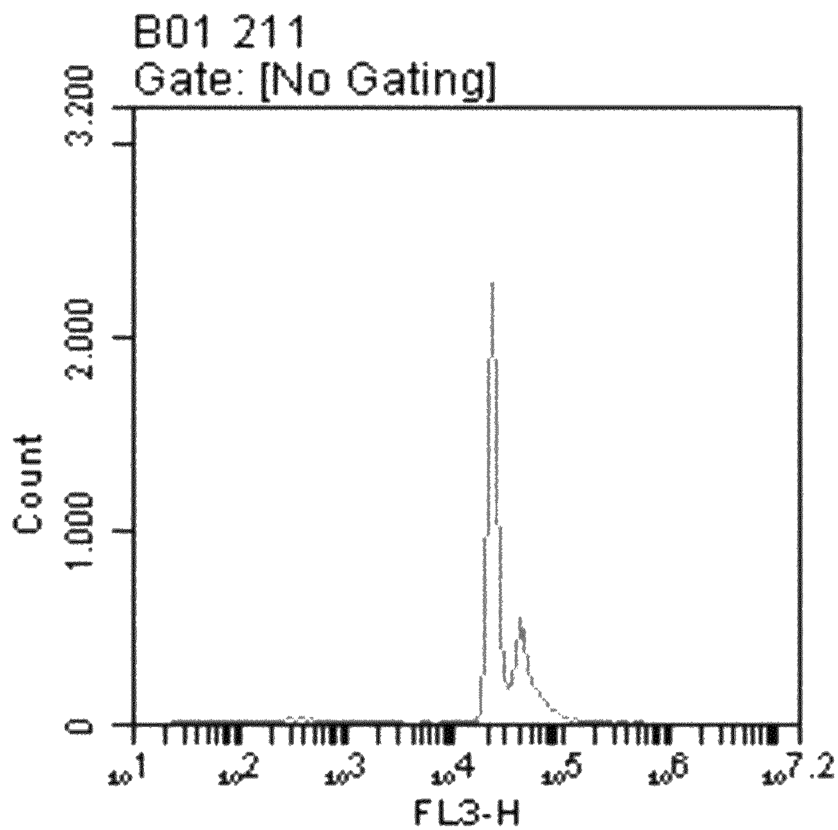
FIG. 30 shows the particle distribution plot as a function of the fluorescence of N-3×@Fe10@PS.

The dispersity of N-Q×@Fe10@PS10 with (Q=1, 3, 5) was also investigated by flow cytometry. As shown in FIG. 29, once coated with Fe10 and silica the particles show increased scattering, especially in the SSC-H channel, indicating a higher roughness of the surface in comparison to the PS particles. However, it is evident that these particles are still highly monodisperse. Fluorescence measurements of the particles (FIG. 30) displayed the same distribution as the initial, uncoated particles (FIG. 28), indicating that dye II was retained in the PS core after the formation of both shells.

Figure 31:
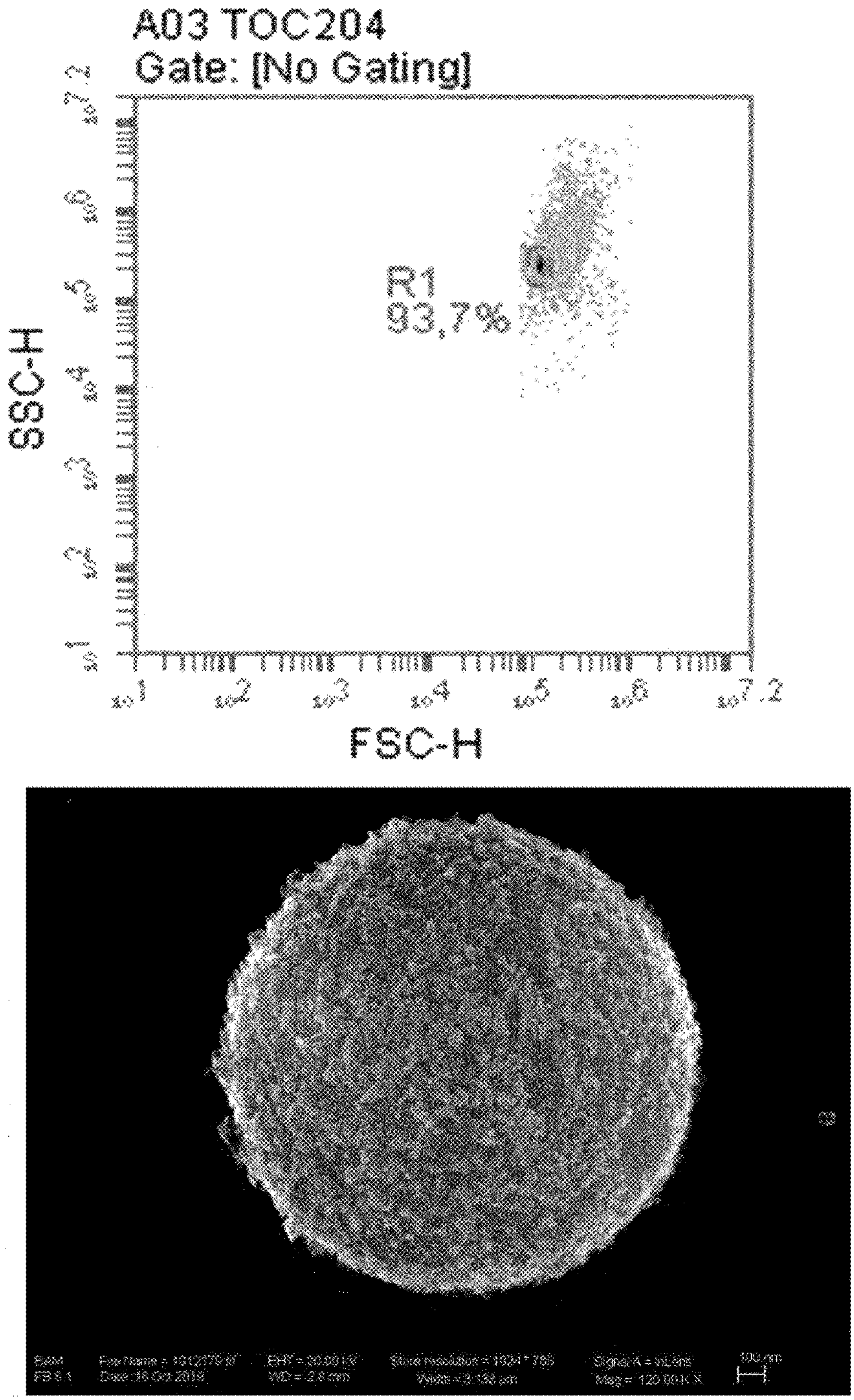
FIG. 31 shows a scattering plot distribution (top) and SEM micrograph (bottom, scale bar 100 nm) of N-1× @Fe10@PS10.
Figure 32:
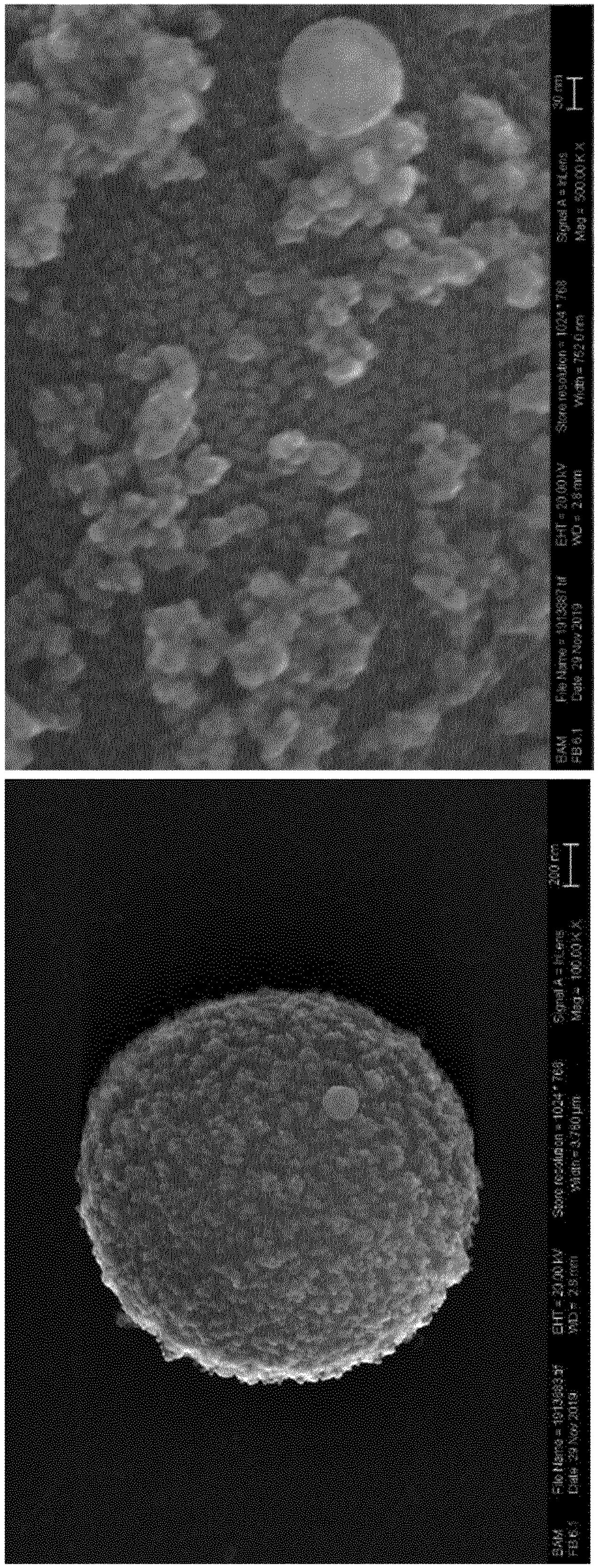
FIG. 32 shows SEM micrographs of N-3×@Fe10@PS10, showing a particle in overview (left, scale bar 200 nm) and the roughness of a silica shell in close-up (right, scale bar 30 nm).
Figure 33:
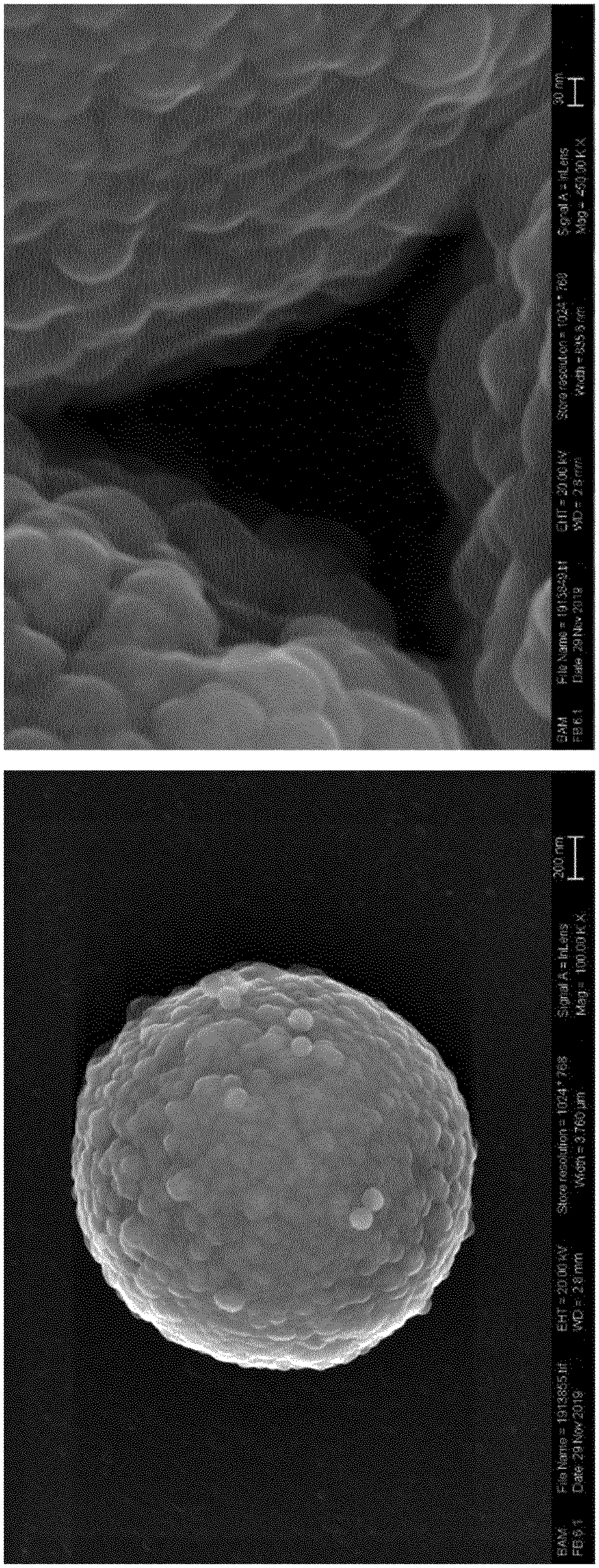
FIG. 33 shows SEM micrographs of N-5×@Fe10@PS10 showing a particle in overview (left, scale bar 200 nm) and the roughness of a silica shell in close-up (right, scale bar 30 nm).

FIGS. 31-33 show the different shell thicknesses achievable by using different amounts of TEOS/$NH_3$ as done for N-1×@Fe10@PS10, N-3×@Fe10@PS10 and N-5× @Fe10@PS10 by way of their SEM images. It is obvious that the thickness of the silica shell increases with the amount of TEOS:$NH_3$, from a thin silica shell (FIG. 31; N-1×@Fe10@PS10) to a medium-thick silica shell (N-3× @Fe10@PS10 in FIG. 32 or N-5×@Fe10@PS10 in FIG.

33). The positions where the Fe10 particles were deposited before synthesizing the first inorganic oxide shell are visible for those synthesis routes that lead to thinner shells, because the first inorganic oxide shell incorporates the Fe10 particles, mediated by the PVP coating.

Figure 34:
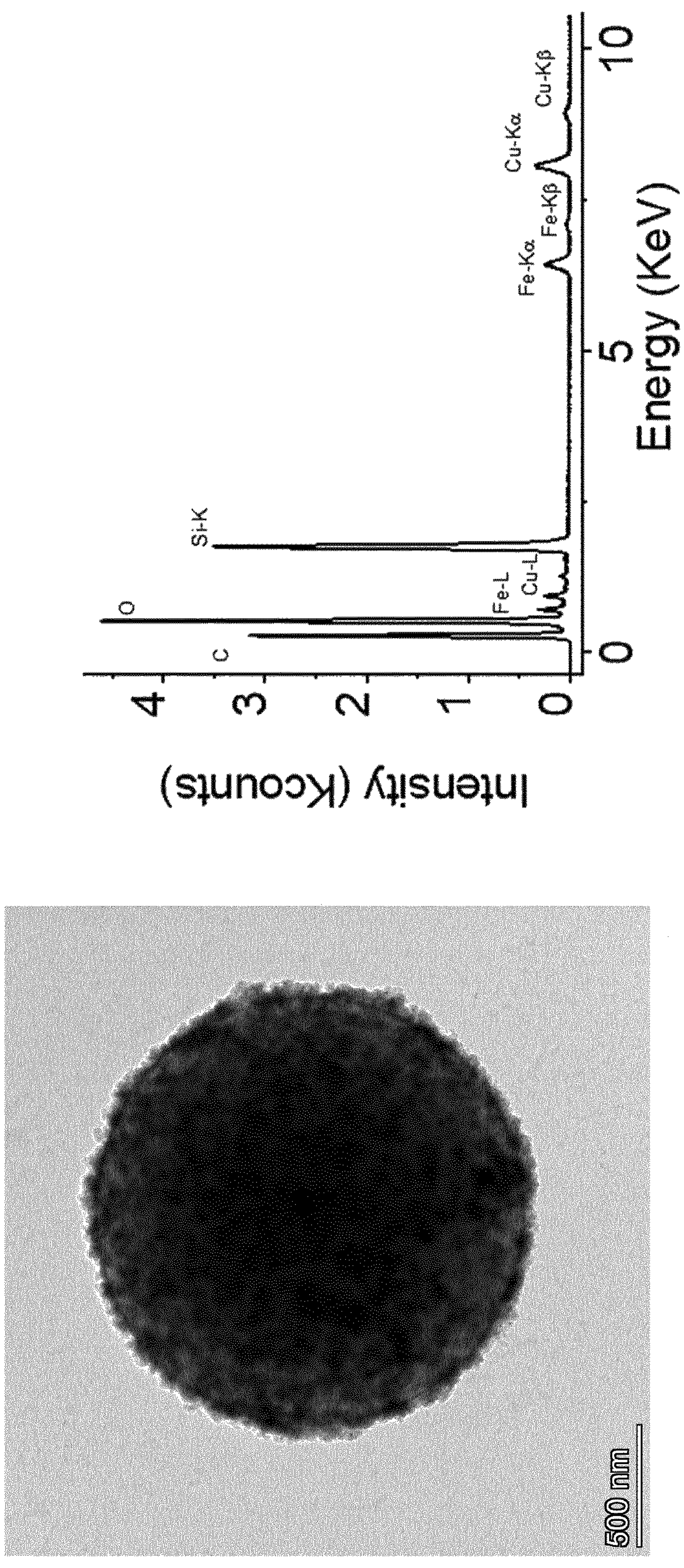
FIG. 34 is a TEM micrograph (left) and the corresponding EDX spectrum (right) of N-3×@Fe10@PS10.

Because N-3×@Fe10@PS10 showed the best coating and the least amount of free silica after the reaction, only these particles were used for the final assay. The particle morphology of N-3×@Fe10@PS10 was also verified by transmission electron microscopy and scanning transmission electron microscopy. In the TEM image in FIG. 34, the even spread of Fe10 over the surface of the PS particles is shown. Also, the $SiO_2$ shell covering the particle is visible.

Figure 35:
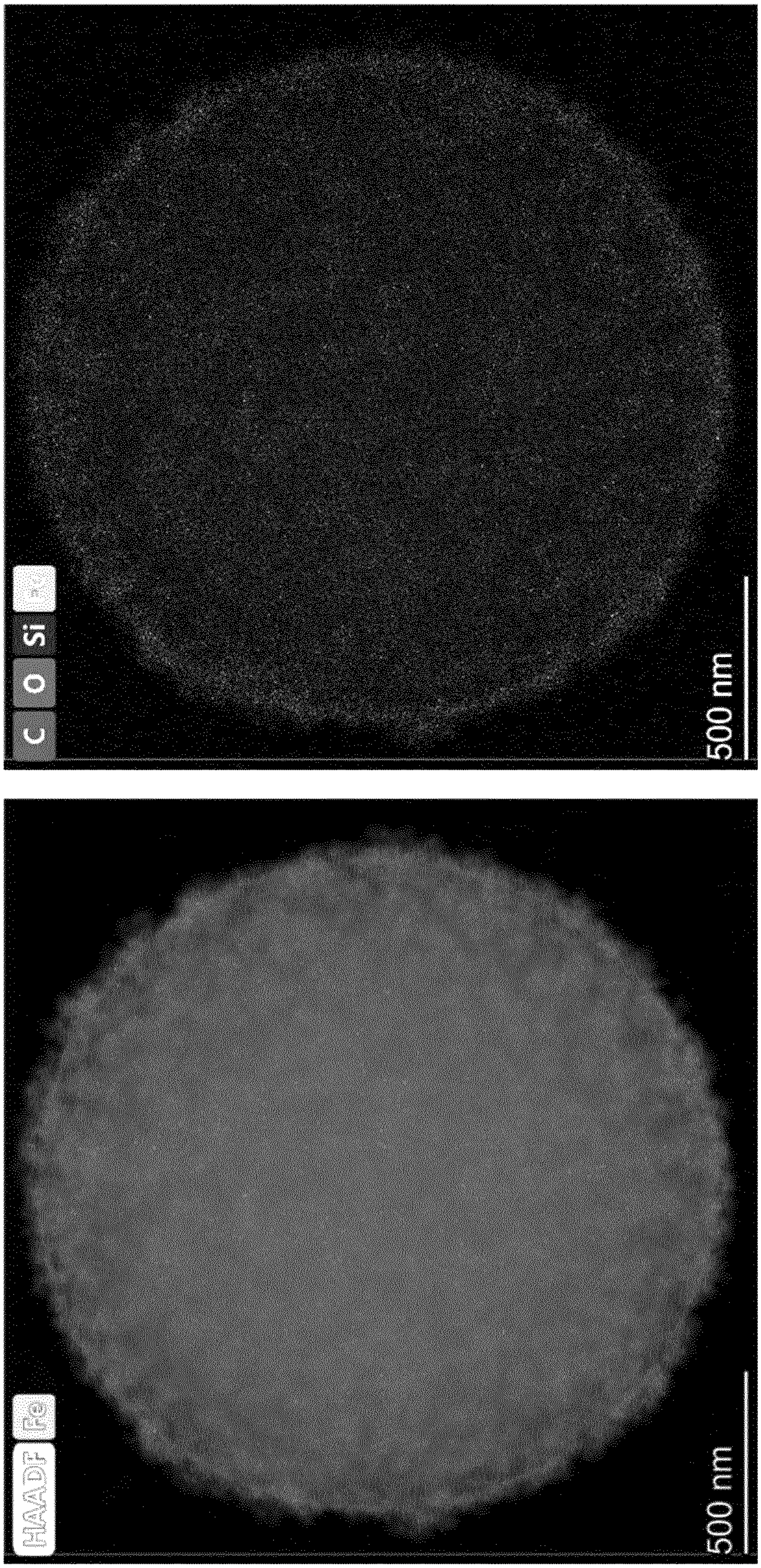
FIG. 35 shows a high-angle annular dark-field imaging (HAADF) STEM mapping of the Fe content (left) and STEM mapping of N-3×@Fe10@PS10 (right).

FIG. 35 shows the STEM mapping of N-3×@Fe10@PS10. The distinct $SiO_2$ shell on the PS core (right side, STEM mapping) and the layer of Fe10 particles evenly spread over the whole particle is displayed (left side, high-angle annular dark-field imaging (HAADF) STEM mapping).

M@Fe10@PS10

Figure 36:
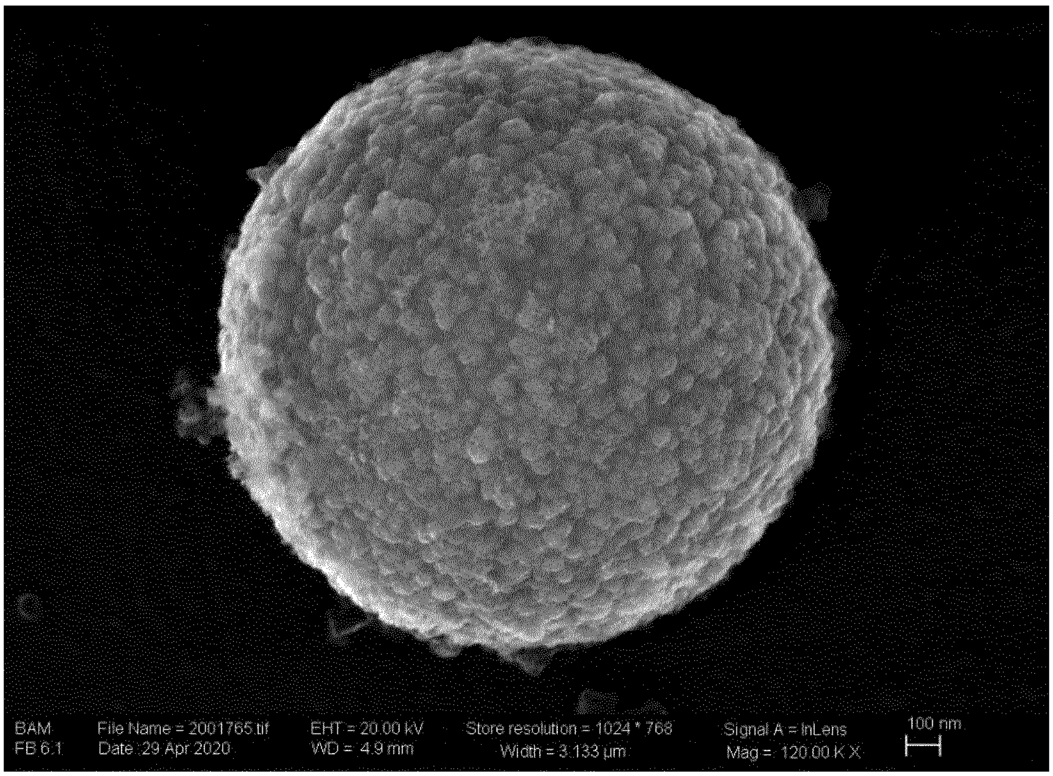
FIG. 36 is a SEM micrograph of M@Fe10@PS10 (scale bar 100 nm).

M@Fe10@PS particles were prepared from N-3×@Fe10@PS, to protect the iron shell, following the same procedure as for M-PS40. As shown in FIG. 36, a mesoporous silica shell was formed, on the nonporous first silica shell containing the magnetic iron nanoparticles. As can also be seen in FIG. 36, surprisingly small mesoporous silica nanoparticles were obtained through the convergent synthesis approach, following the growth of the first inorganic oxide shell. Interconnected mesoporous MCM-41-type particles with an average diameter of 45±10 nm were found, being about 3-times smaller compared with the smallest particle size that can are commonly achieved with the conventional divergent approach. Despite the smaller size, a homogeneous mesoporous shell was achieved with mesopores of the typical diameter of 2.2±0.5 nm.

Sn@Fe10@PS with n=1, 2, 4

Figure 37:
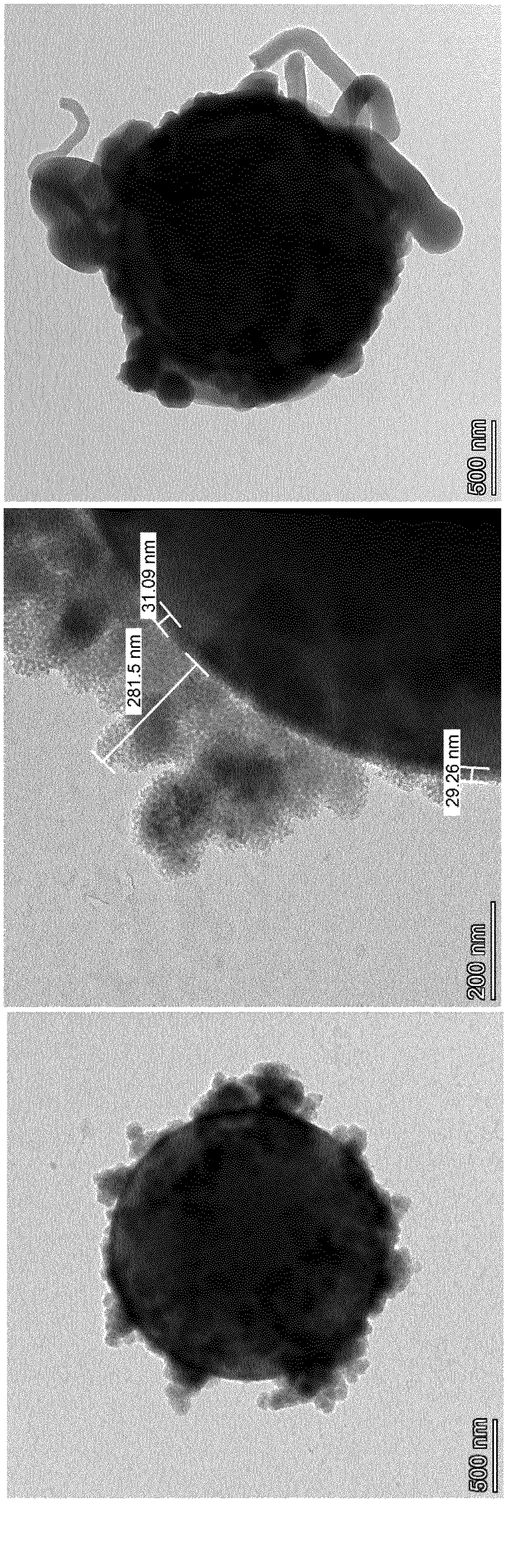
FIG. 37 are TEM micrographs of S1@Fe10@PS10 (left), a close up of the porous silica shell (middle) and TEM micrograph of S2@Fe10@PS10 (right).
Figure 38:
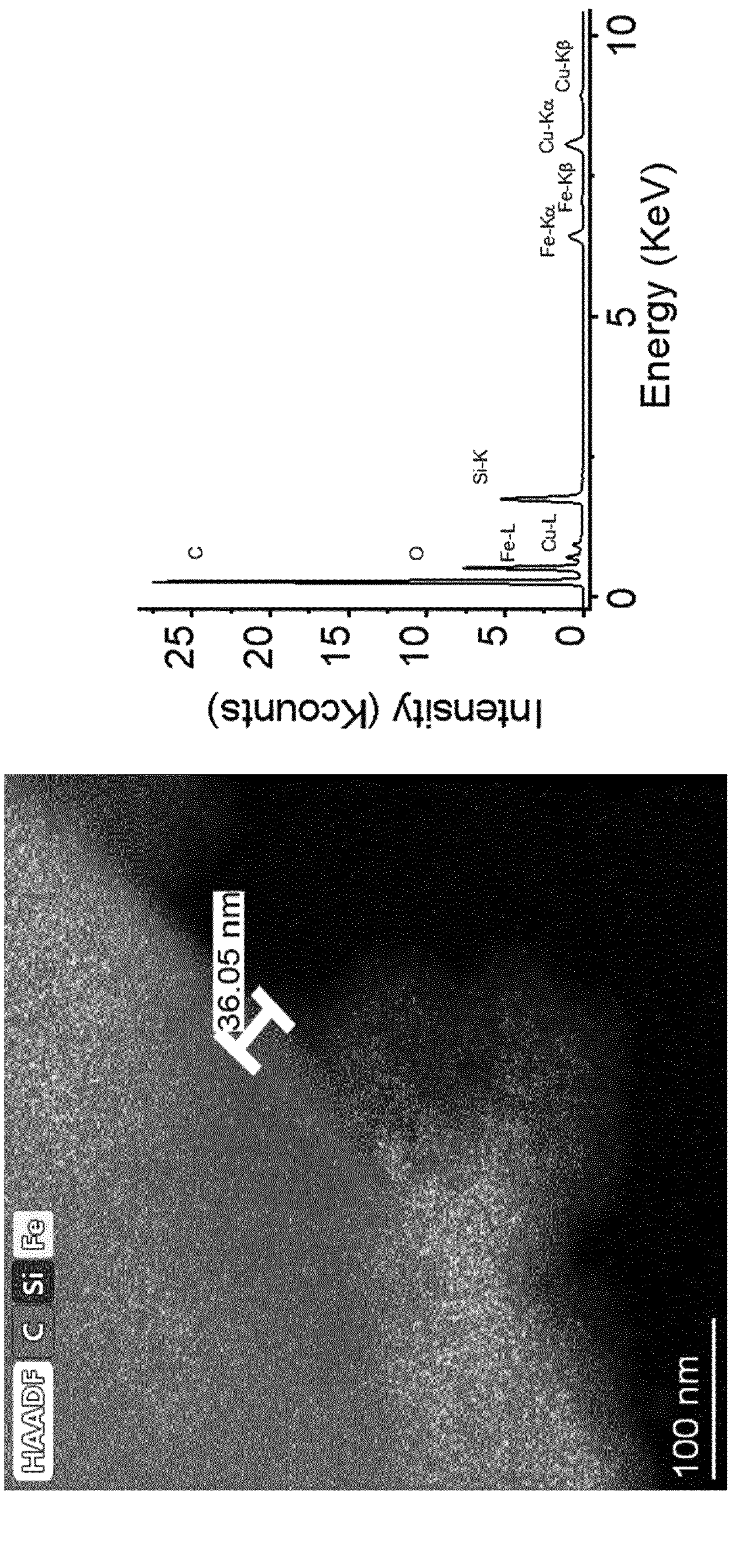
FIG. 38 is a High-angle annular dark-field imaging (HAADF) STEM mapping (left) and corresponding EDX spectra (right) of S1@Fe10@PS10.

Shell formation and pore structure of materials Sn@Fe10@PS performed under acidic (S1@Fe10@PS and S2@Fe10@PS) and neutral conditions (S4@Fe10@PS) with the addition of salts following a similar procedure as for S1-PS40, S2-PS40 and S4-PS40, respectively, were evaluated through TEM and STEM. For the preparation of Sn@Fe10@PS particles, Fe10@PS particles were used as a core and were coated with a first inorganic oxide shell. As shown in FIG. 37, acidic conditions allowed to obtain rough and porous silica shells on the particles S1@Fe10@PS (FIG. 37 left and middle) and S2@Fe10@PS (FIG. 37 right), covering the whole particle. The presence of the magnetic layer could also be shown through STEM mapping and the EDX spectrum, which confirmed the presence of iron atoms (see FIG. 38 for material prepared S1@Fe10@PS as an example). STEM mapping allowed us also to observe the different distributions of the layers, in which the distinction of a first layer of silica on the PS core and a second layer of agglomerated silica was observed. Despite these promising results, in which a partially ordered structure for S1@Fe10@PS and a more ordered pore structure for S1@Fe10@PS was observed, the shells formed were not completely homogeneous. Also, in this case, the convergent synthesis approach resulted in surprisingly small mesoporous SBA-15 type nanoparticles with an average diameter of 120±40 nm. This size is even ca. 10-times smaller compared with the conventional divergent approach, in which the size of typical SBA-15 particles is 1000±300 nm. Despite their small size, a homogeneous mesoporous shell was resulted, showing mesopores of 7±2 nm.

Figure 41:
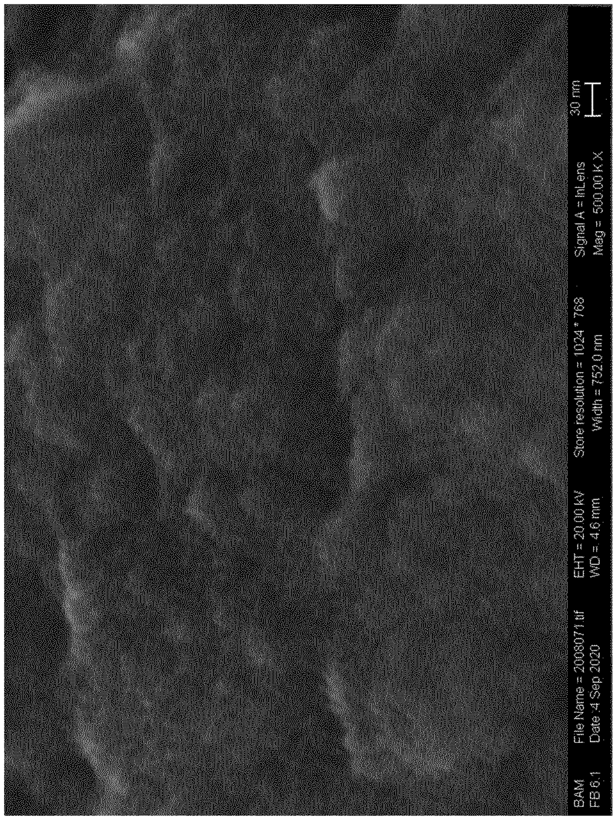
FIG. 41 is a SEM micrograph of S4@Fe10@PS10 showing a particle in overview (left, scale bar 100 nm) and the porosity of the silica shell in close-up (right, scale bar 30 nm).
Figure 41:
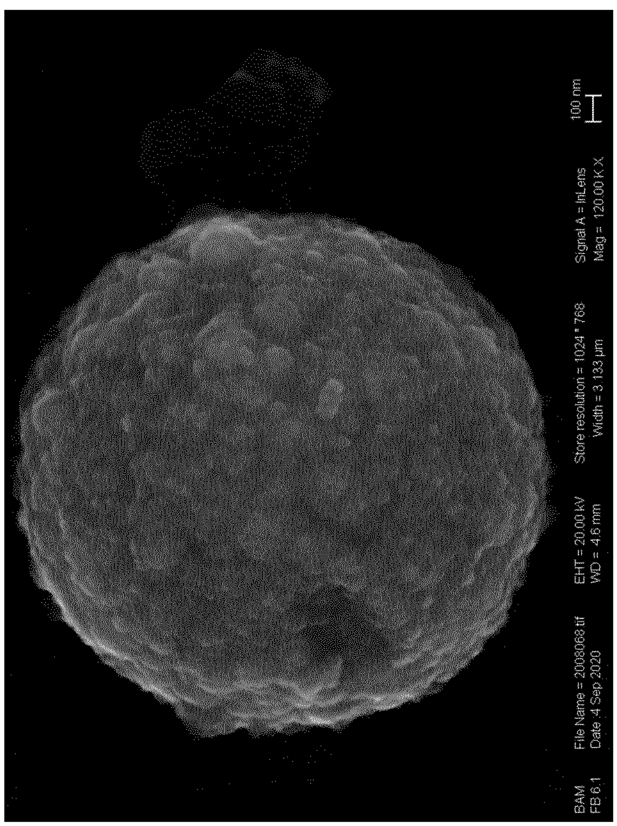
Figure 42:
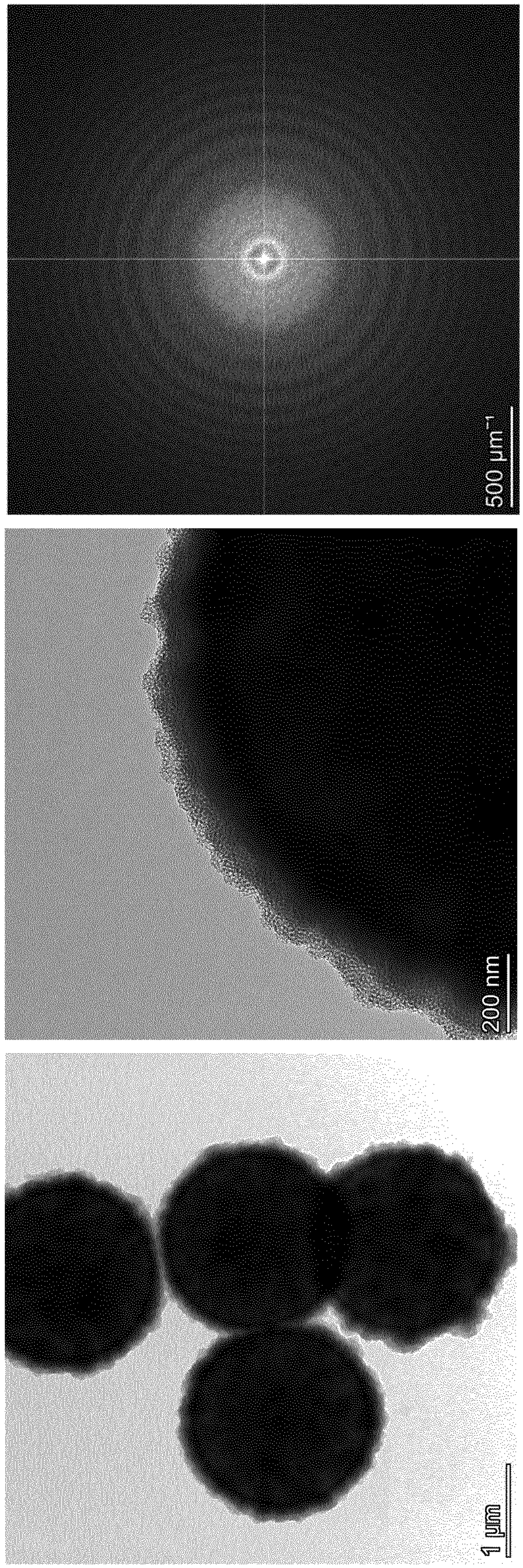
FIG. 42 is a TEM micrograph of S4@Fe10@PS10 showing a particle in overview (left), the porosity of the silica shell in close-up (middle) and the corresponding FFT image (right).

For S2@Fe10@PS, bigger SBA-15 type particles were formed at the surface compared with S1@Fe10@PS, having a mixture of nanoparticles with diameters of 225±45 nm nm and of rod-shape objects with sizes of 600±200×200±50 nm. TEM images of this material allowed us to clearly observe the pattern of an ordered hexagonal network arrangement of the SBA-15 materials at the surface, having an hexagonal unit cell parameter of 7.9±0.8 nm, a wall thickness of 1.9±1 nm and a pore size of 5.8±1 nm (see FIG. 37 right). Much better uniformity of the mesoporous shell was observed when neutral conditions were employed, on the material S4@Fe10@PS (see FIGS. 41 and 42). Whereas SEM pictures (FIG. 41) allowed us to observe the presence of a uniform shell completely covering the whole core, in which no individual particles could be observed, a regular mesoporosity was observed through TEM images (FIG. 42 left and middle). Corresponding FFT images (FIG. 42 right) allowed us to observe also the periodicity of the mesoporous shell formed, having a hexagonal unit cell parameter of 11.9±2.6 nm, a wall thickness of 3.6±1 nm and a pore size of 8.3±1 nm.

NH2-N-Qx@Fe10@PS10 with Q=1, 3,5

To assess the possibilities of further particle functionalization, amino groups were attached to the surface using 3-aminopropyltriethoxysilane (APTES). The amount of amino groups covalently grafted to the surface was determined with the ninhydrin test explained above. Corresponding results are shown in Table 6 listing the absorbance for three samples with different $SiO_2$ shell thickness and the corresponding amounts of amino groups on the surface of the particles. T

TABLE 6

Ninhydrin test of NH2-N-Q × @Fe10@PS10 with Q = 1, 3, 5. Therein, the number "Q" = 1, 3, 5 indicates increasing volumes of 1×, 3×, and 5× of TEOS/$NH_3$ present in the reaction to influence shell growth and thickness.

| Sample | Absorbance | $c_{NH2}$/ mM | Amount of $NH_2$/ mmol $g^{-1}$ solid |
|---|---|---|---|
| NH2-N-1 × @Fe10@PS10 | 0.0858 | 0.961 | 0.346 |
| NH2-N-3 × @Fe10@PS10 | 0.1330 | 1.525 | 0.549 |
| NH2-N-5 × @Fe10@PS10 | 0.0219 | 0.196 | 0.071 |

The particles with the smoothest type of shell display the lowest signal. This is probably due to the higher surface area of the more raspberry-like particles. The ninhydrin test was also performed with particles in which the silanol groups were previously activated under acidic conditions. After the activation and functionalization, the particles were still magnetic and had the same absorbance signal.

Results Discussion

DNA Hybridization Assay with an MCM-41-Type Shell

Figure 5:
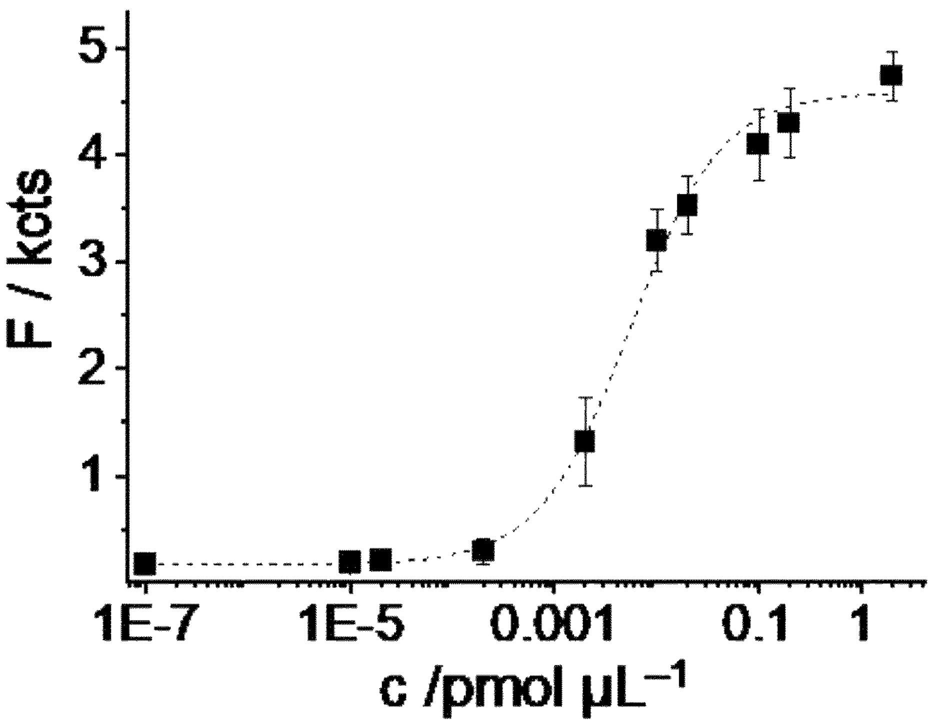
FIG. 5 illustrates the fluorescence of DNA-M-PS40 as a function of the amount of added t-DNA. A four parametric logistic fit is shown as dotted line.

To perform DNA quantification using the prepared particles, a capture oligonucleotide (c-DNA) strand was covalently bound to COOH-M-PS40 via an active ester route using 1-ethyl-3-(3-dimethylaminopropyl)carbodiimide (EDC) and N-hydroxysuccinimide (NHS), resulting in DNA-M-PS40. In a second step, DNA-M-PS40 was incubated with a fluorescently labelled target DNA (6-carboxyfluorescein or FAM-labelled t-DNA) strand, the t-DNA being complementary to the c-DNA strand. The amount of t-DNA bound to the particles was then analyzed by flow cytometry. For this, 5 μL of solutions containing t-DNA at different concentrations were added to wells of an ELISA plate containing 5 μL of the particle suspension (0.025% w/v) and 95 μL of hybridization buffer. The respective background measurements were done analogously. FIG. 5 shows the fluorescence intensity plotted against the concentration of t-DNA and the corresponding four-parametric logistic fit. Following this procedure, an LOD of 228±78 amol $\mu L^{-1}$ and an LOQ of 752±80 amol $\mu L^{-1}$ were found.

Figure 20:
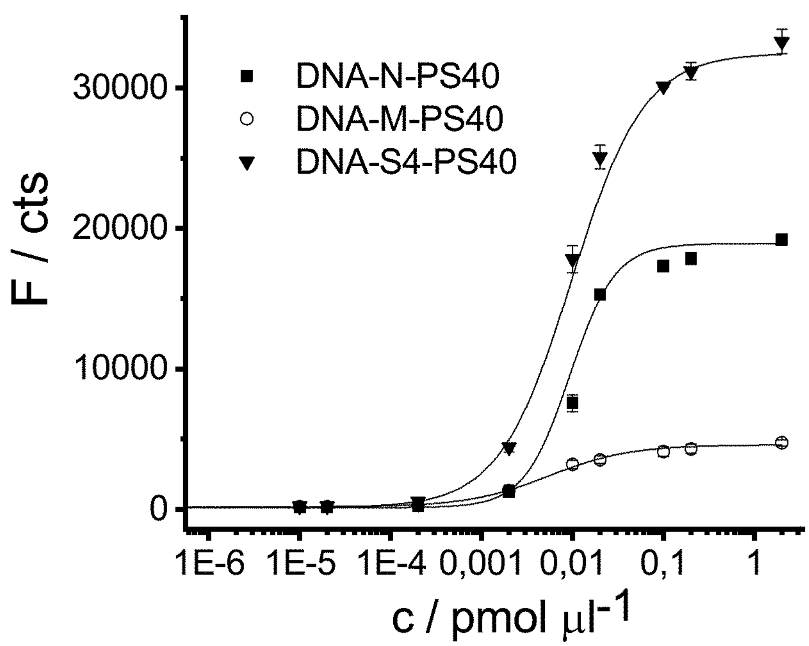
FIG. 20 shows the fluorescence of the core-shell particles DNA-N-PS40 (solid squares), DNA-M-PS40 (open circles) and DNA-S4-PS40 (solid triangles) as a function of the amount of added t-DNA. Four parametric logistic fits shown as lines.

Comparing this sensitivity with the sensitivity obtained for DNA-N-PS40, the present hybrids were twice as sensitive (see Table 4, FIG. 20). However, the maximum signal gain was lower for DNA-M-PS40 than for DNA-N-PS40 which we tentatively ascribe to the narrow pore size of 2 nm of the mesoporous silica shell formed on M-PS40, potentially hampering full exploitation of the massively increased specific surface area. Comparison of the functionalization data given in Table 3 and in Sarma, D. et al., Langmuir 2016, 32 (15), 3717-3727 support this assumption. Whereas N-PS40 has a specific surface are of ca. 10 $m^2 g^{-1}$ and functionalization densities of ca. 6 $NH_2$ groups $nm^{-2}$, the latter is comparable for M-PS40 with ca. 10 $NH_2$ groups $nm^{-2}$ while the mesoporous shell possesses a 10-fold higher specific surface area of ca. 100 $m^2 g^{-1}$ (Tables 1, 3). Thus, although M-PS40 offers distinctly more amino groups per particle than N-PS40 (which is also reflected in the zeta potentials, see Table 2), either the conjugation efficiency with c-DNA or the probability for hybridization seems to be distinctly lower, most likely due to the small size of the pores of M-PS40 (ca. 2 nm). While already diffusion of c-DNA into the narrow pores might be hampered once c-DNA moieties start to be anchored to carboxylic acid groups close to the pore openings, the hybridization of t-DNA at the c-DNA moieties closer to the pore openings would enhance the rigidity of these objects through single-to-double strand conversion, hampering diffusion in the pores even more. Nonetheless, the improvement in sensitivity encouraged us to take the next step and prepare mesoporous materials with wider pore diameters.

Coating of Polystyrene Core Particles with SBA-15 Shell

Figure 6:
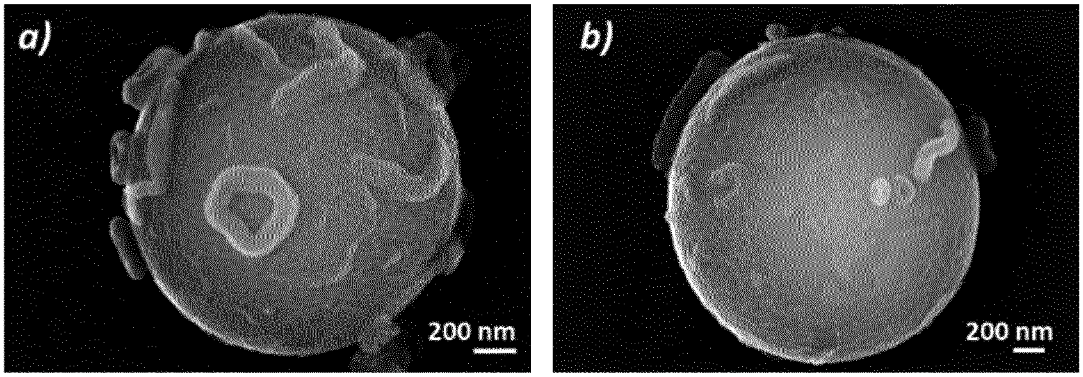
FIG. 6 shows SEM micrographs of S1-PS10 (a) and S1-PS40 (b) with SBA-15-type shells synthesized under acidic conditions with Pluronic 123 (P123) as a template and $MgSO_4$ as structure directing agent.

When aiming at larger pore diameters in mesoporous silica, pore expanders such as for instance 1,3,5-trimethylbenzene (TMB) can be used with the conventional MCM-41-type protocol. However, such reagents can destabilize the silica framework. An alternative approach is the use of other micelle-forming agents as templates, being bigger in size and/or forming larger micelles, e.g., triblock copolymers such as P123. Such auxiliary reagents lead to SBA-15-type mesoporous materials. Two approaches of the latter type were followed here. First, P123-mediated silica shell synthesis was attempted under acidic conditions, by using $MgSO_4$ or CTAB to enhance the interaction between the surface of the core particle and the micelles formed by the template molecules. A second type of synthesis was performed under neutral conditions with $MgSO_4$ or NaCl as structure-directing mediator. After completion of the reaction, a hydrothermal treatment is commonly carried out to stabilize the silica framework with the larger pores. Here, a fraction of the surfactant was removed during the washes of the particles in ethanol, while complete removal was achieved during the activation of the silanol groups of the surface in a mixture of ethanol and diluted hydrochloric acid. Following a similar procedure as for the MCM-41-type shell, the SBA-15-type shells were also characterized by porosimetry. In addition, for better visualization, scanning electron microscopy (SEM) measurements were carried out. As mentioned above, the first attempt was an acidic approach involving P123 and $MgSO_4$ and using PS10 and PS40 particles as the cores, resulting in materials S1-PS10 and S1-PS40, respectively (FIG. 6). Despite the successful growth of a porous shell of ca. 10 nm thickness, the surface exhibited many seemingly attached silica objects of a worm-like structure and the shell as such showed lager open areas. We tentatively ascribe this behavior to a not optimal assembly of the micelles on the core particle's surface, most likely because of pH and auxiliary agents.

Figure 7:
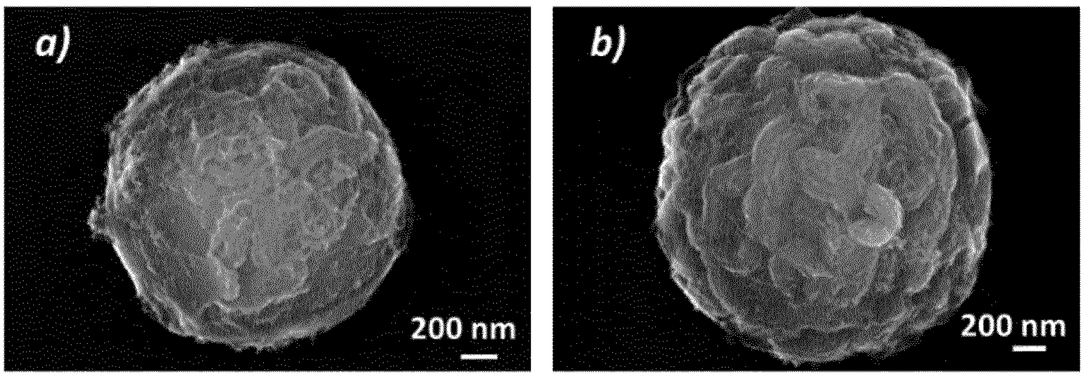
FIG. 7 shows SEM micrographs of S2-PS10 (a) and S2-PS40 (b) with SBA-15-type shells synthesized under acidic conditions with P123 and CTAB.

In a second attempt, CTAB was used as a co-surfactant with P123, yielding materials S2-PS10 and S2-PS40, respectively (FIG. 7). The resulting shells were now mostly complete but still showed worm- and rod-like features. However, these structures seemed to be more an integral part of the shell protruding from the surface than simply attached features as above. Consequently, the thickness of the shell was distinctly higher with ca. 100 nm. In the case of S2-PS40, this phenomenon was more pronounced than for S2-PS10 (FIG. **7*b*** vs. 7a). The inclusion of the rod-like structures however was random, resulting in a non-uniform shell.

Figure 8:
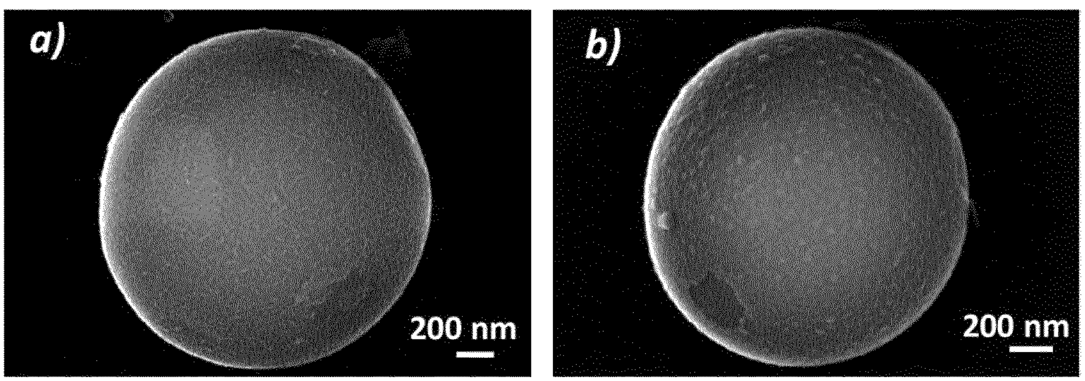
FIG. 8 shows SEM micrographs of S3-PS10 (a) and S3-PS40 (b) with SBA-15-type shells synthesized under neutral conditions with P123 and NaCl.

To improve the uniformity of the silica coating and to avoid potential dye losses due to protonation—when hydrophobic dyes are sterically incorporated into latexes, i.e., into a hydrophobic organic polymer (core) particle, an acidic environment during coating can result in dye loss because protonation commonly renders such dyes much better water-soluble. Therefore, a neutral synthetic route was attempted next. Again, the nature and amount of the structure-directing mediator salt to increase the interaction between silica seeds (i.e. nanoparticles) and the non-ionic block copolymers is supposedly a key factor. It has been reported that the addition of salts such as NaCl to the reaction enhances the interaction between the inorganic and the organic species. Inorganic cations such as $Na^+$ can coordinate with silanol groups and water bound at the silica surface, yet they can also interact with the ether-type oxygens of the surfactant. In our case, when using polystyrene particles as supporting structure for which we know that the core's PVP is also facilitating silica nanoparticle assembly and overgrowth, these interactions most likely also include interactions between the structure-directing mediator salt and the carbonyl oxygens of the chains of PVP10 and PVP40. Here, two different structure-directing mediator salts were used, $MgSO_4$ and NaCl, differing in the nominal charge and charge density of the metal ion. In a first approach, S3-PS10 and S3-PS40 using 188 mM NaCl (with respect to 14 mM TEOS) as structure-directing mediator were prepared (FIG. 8). As can be seen, both S3-PS10 and S3-PS40 show a nearly complete shell. Although the shells on both core particles were homogeneous, the shell thickness was too thin, only ca. 20 to 30 nm.

Figure 9:
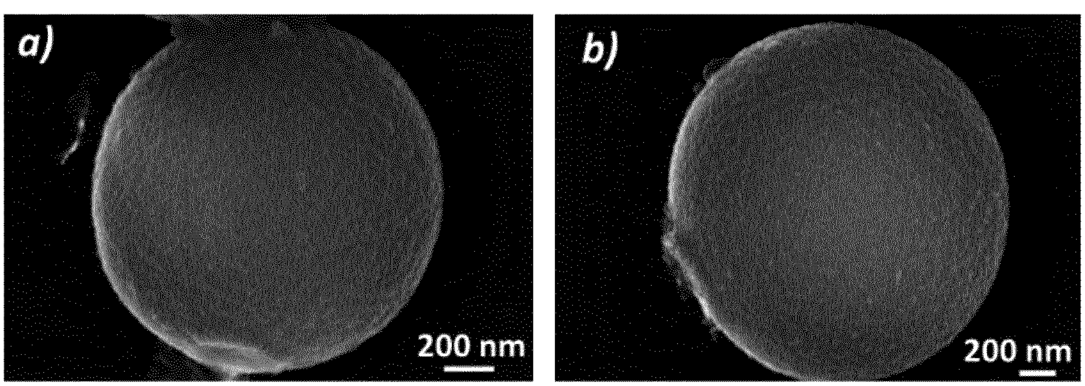
FIG. 9 shows SEM micrographs of S4-PS10 (a) and S4-PS40 (b) with SBA-15-type shells synthesized under neutral conditions with P123 and $MgSO_4$.

Better results were obtained for S4-PS10 and S4-PS40, employing $MgSO_4$ at 28 mM (with respect to 14 mM TEOS) as structure-directing mediator in a neutral synthesis. As is shown in FIG. 9, this approach yielded a much thicker shell, presumably due to the $Mg^{2+}$ cation's higher charge density potentially leading to a stronger interaction between the core, the micelle-forming templating agent and the silica. The shell was ca. 70±10 nm thick for S4-PS40 and ca. 120±40 nm for S4-PS10. Although the shell of S4-PS40 was thinner than that of S4-PS10, it was more homogeneous.

Figure 16:
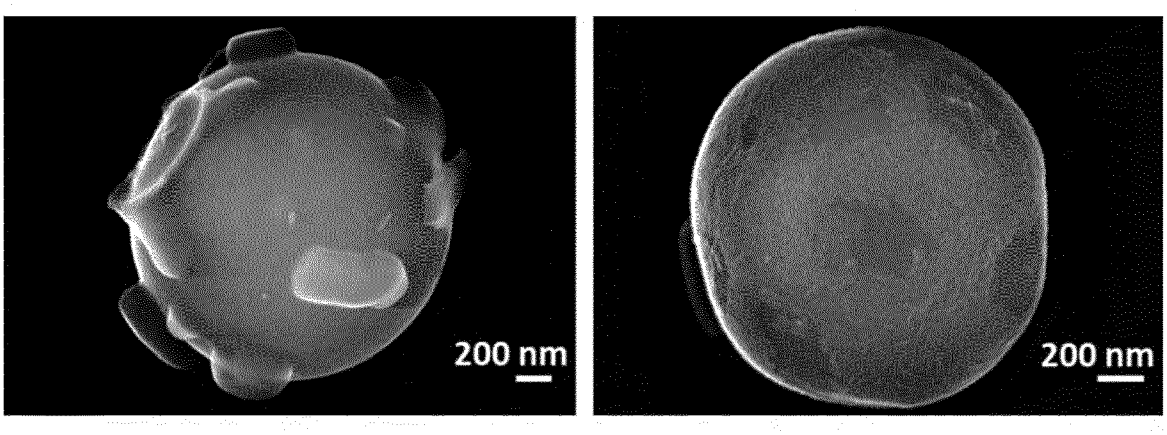
FIG. 16 shows SEM micrographs of SBA-15-type shell obtained under neutral conditions employing a high (S5-PS10; left) and a low (S6-PS10; right) amount of $MgSO_4$.
Figure 18:
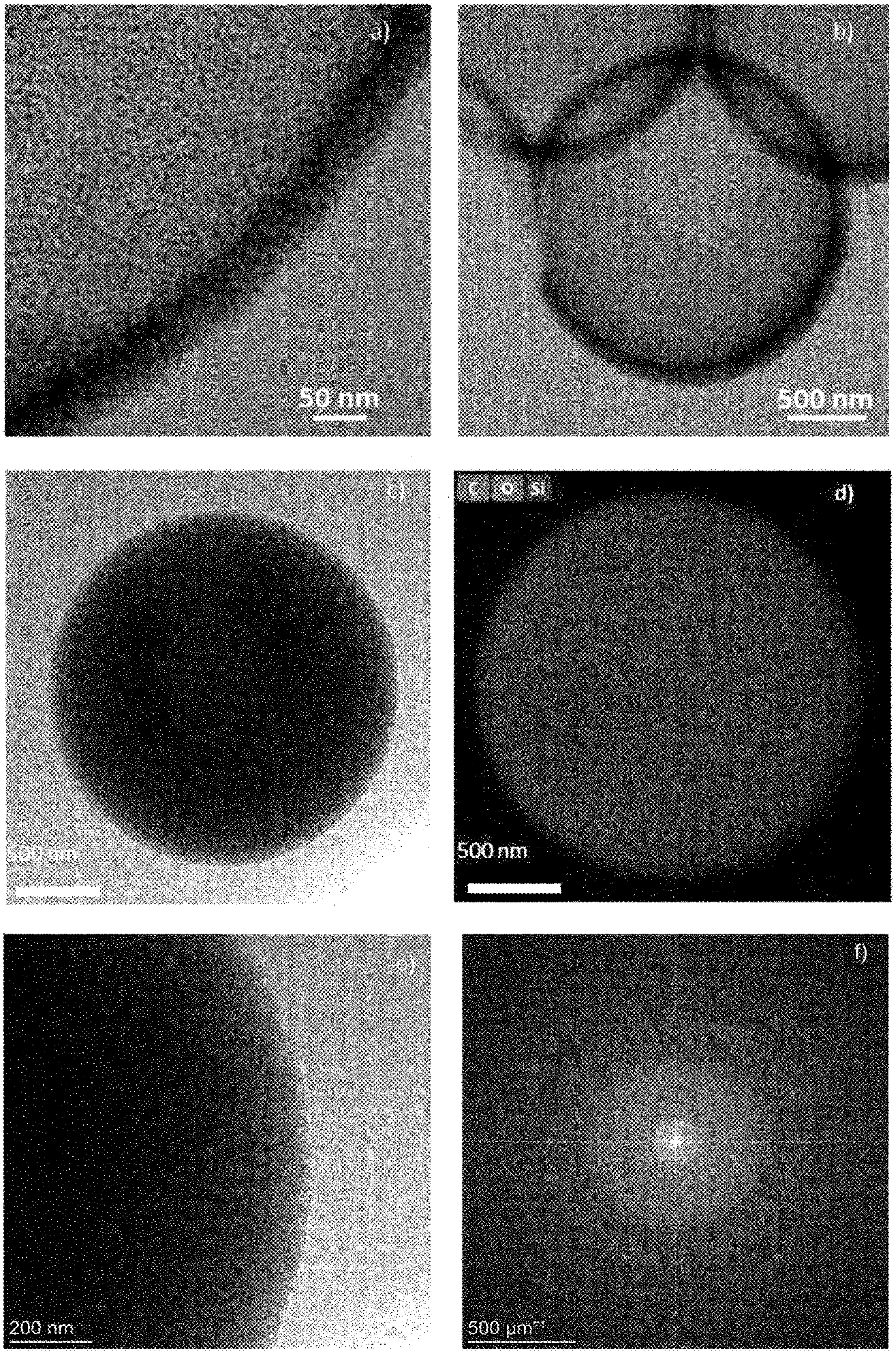
FIG. 18 are TEM micrographs of calcinated S4-PS40 particles (a, b), TEM micrograph (c) and STEM mapping (d) of an S4-PS40 particle, (e) TEM micrograph showing the mesoporous structure of the S4-PS40 particles and (f) corresponding Fast Fourier Transform (FFT) image from TEM images of S4-PS40 particles.

Intrigued by these features, the influence of the amount of structure-directing mediator present in the reaction mixture was studied, using PS10 as a core. Accordingly, S5-PS10 and S6-PS10 were synthesized using a 3-times higher (85 mM $MgSO_4$; 14 mM TEOS) and a 3-times lower (9 mM $MgSO_4$; 14 mM TEOS) amount of $MgSO_4$ as SDM. SEM images revealed that the shell on the S6-PS10 particles was mostly thinner or less uniform in comparison with S5-PS10. As shown in FIG. 16, the reaction conditions of S5-PS10 allowed for the formation of a ca. 100 nm thick shell which, however, was rather nonporous with rod-like silica objects remaining in solution. The higher amount of $MgSO_4$ seems to have a negative effect on template organization on the core particles. In contrast, S6-PS10 with a lower amount of salt showed incomplete shell formation, although with a mesoporous structure. Based on these studies, it is obvious that S4-PS40 offers the most uniform and controlled shell. $N_2$ adsorption-desorption isotherms (FIG. 17) showed a typical type-IV isotherm, in which the adsorption step can be related to $N_2$ condensation inside of the pores. However, the presence of a hysteresis loop and the broad pore size distribution (FIG. 17) confirm the existence of internal connections between the pores. The average pore size of S4-PS40 was determined to 11.5±6.5 nm, the specific surface area to 107.2 $m^2$ $g^{-1}$ and the pore volume to 0.33 $cm^3$ $g^{-1}$. The mesoporosity of the material was confirmed by transmission electron microscopy (TEM) measurements of calcinated S4-PS40 (FIG. 18). Additional TEM, fast Fourier transform (FFT) and scanning transmission electron microscopy (STEM; elemental mapping) measurements were carried out to verify an intact shell before removal of the PS-core (FIG. 18*c, d*), in which the periodicity of the pores can also be observed, having the corresponding diffraction pattern illustrated by the FFT (FIG. 18*e*). In comparison with the MCM-41-type shells of the earlier materials, the pores of the shells on S4-PS40 have a much larger diameter and a higher pore volume, potentially enhancing the performance as a DNA assay material because of reduced steric hindrance of diffusing DNA strands.

Accordingly, DNA assays were carried out with S4-PS40. For control purposes similar experiments were conducted with S4-PS10. The SBA-15-type shells were functionalized along the same procedure as described for the MCM-41-type shells. Successful functionalization with amino groups and carboxylic acid groups was controlled through zeta potential measurements and the ninhydrin test (see Tables 2, 3). Considering larger pore sizes and thicker shells for the SBA-15-type materials (ca. 11 nm in comparison with the ca. 2.5 nm of MCM-41-type materials), better access of the single c-DNA strands into the pores and to the carboxylic acid groups located on the pore walls should be guaranteed, which is finally expected to result in better sensitivity. It is briefly mentioned that a typical pore diameter in case of SBA-type materials is in the range of 6 nm to 20 nm, and in the case of MCM-type materials in the range of 2 nm to 3 nm.

DNA Hybridization Assay with an SBA-15-Type Shell

Figure 10:
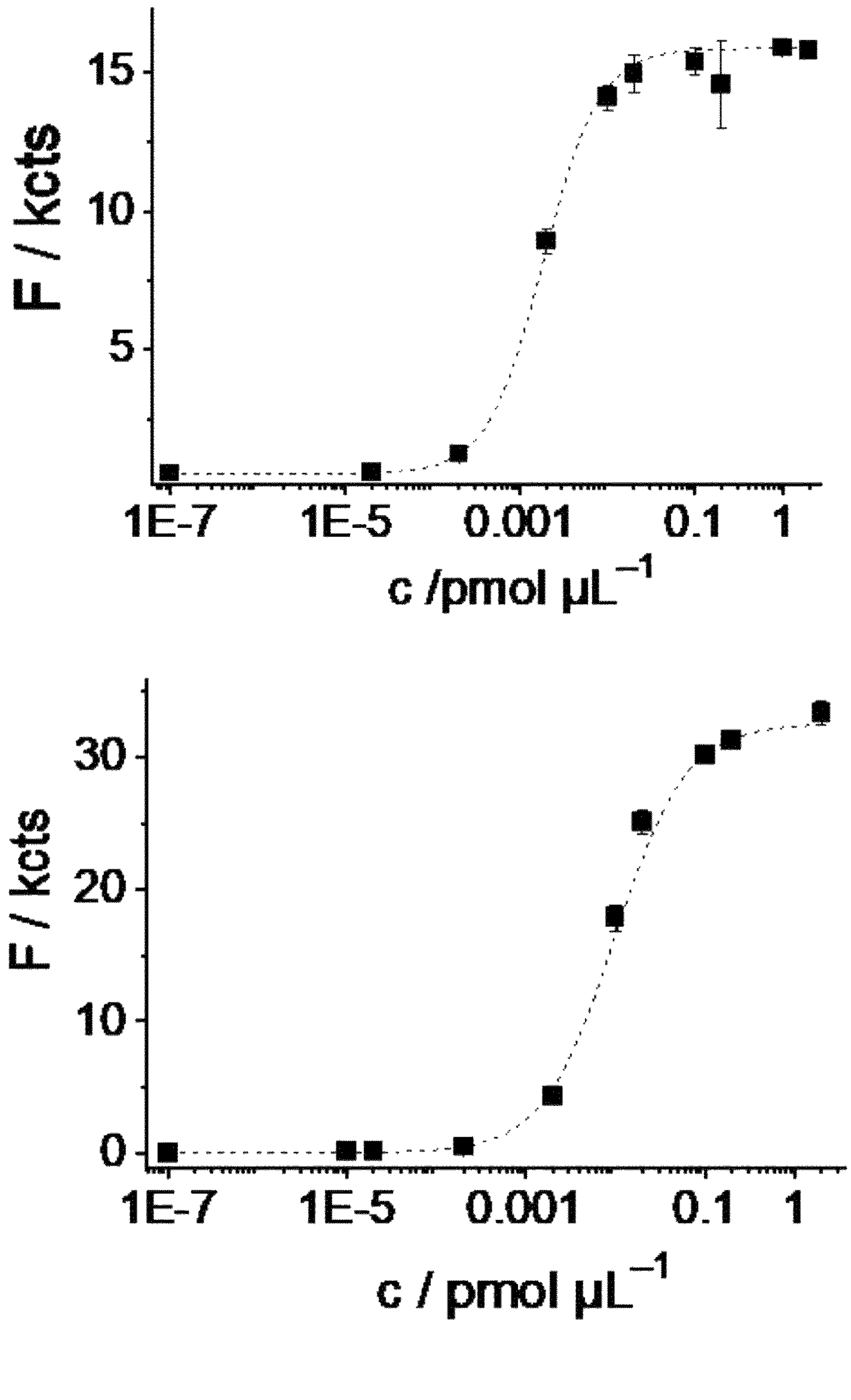
FIG. 10 shows the fluorescence of DNA-S4-PS10 (top) and DNA-S4-PS40 (bottom) as a function of the amount of added t-DNA.

The particles DNA-S4-PS10 and DNA-S4-PS40 were prepared following the same protocol as for DNA-N-PS40 and DNA-M-PS40, resulting in the grafting of the same sequence of c-DNA with an amino group at the 5' terminus to COOH-S4-PS10 and COOH-S4-PS40. After the corresponding hybridization with the complementary t-DNA strand, suspensions of DNA-S4-PS10 and DNA-S4-PS40 were measured with the flow cytometer. FIG. 10 shows a DNA assay with DNA-S4-PS10 (top) and DNA-S4-PS40 (bottom). As can be seen, DNA-S4-PS40 showed a better performance in comparison with DNA-M-PS40 (FIG. 5). For better comparison, the best performing particles of each shell-type, DNA-N-PS40, DNA-M-PS40 and DNA-S4-PS40, are compared in a single plot in FIG. 20, showing the much better response of DNA-S4-PS40 in comparison with the others. Moreover, even though DNA-S4-PS10 offered a better response than DNA-M-PS40, the overall signal gain in fluorescence was two times lower than that of DNA-S4-PS40.

The LODs of both materials, DNA-S4-PS10 and DNA-S4-PS40, were determined to 26±10 amol $\mu L^{-1}$ and 4±2 amol $\mu L^{-1}$, respectively, and the LOQs to 121±8 amol $\mu L^{-1}$ and 80±7 amol $\mu L^{-1}$. Thus, the limit of detection with an SBA-15-type shell is considerably lower than that of non-porous particles or particles with an MCM-41-type shell, and also much lower in comparison with previous reports in the literature. Apparently, the step to an SBA-15-type shell did not only increase the overall signal gain in fluorescence but also improved the sensitivity of the assay, having also a somewhat broader dynamic range (2-35 fmol $\mu L^{-1}$) in comparison with DNA-N-PS40 (4-21 fmol $\mu L^{-1}$) or DNA-M-PS40 (1-24 fmol $\mu L^{-1}$), see also Table 5. In case of DNA-S4-PS10 it can be deduced that not only is the intensity of the fluorescence lower, but also are the uncertainties of measurement slightly higher and is the dynamic range reduced, tentatively ascribed to the less homogeneous shell of S4-PS10.

A possible loss in sensitivity by first converting amino groups into carboxylic acid groups before DNA coupling was assessed by coupling c-DNA with a carboxylic acid group at the 5' terminus directly to NH2-S4-PS40 particles, yielding DNA'-S4-PS40, and carrying out DNA assays as reported above. The experiments revealed that DNA-S4-PS40 showed a more sensitive response compared to DNA'-S4-PS40 (cf. FIG. 10 vs. FIG. 21 and Table 7). For these assays, c-DNA strands with 9 (c9-DNA) and 15 bases (c15-DNA) were used. The choice of these c-DNAs also allowed us to get better insight into potential steric effects involved. A strong increase in the fluorescence was found in both assays, not reaching a plateau because of the signal from a single particle already saturating the detector at higher t-DNA concentrations. This huge increase of the fluorescence in comparison with DNA-S4-PS40 is ascribed to the nonspecific binding of t-DNA with its net negatively charged phosphate backbone to the excess of free amino groups—in their ammonium form—that are still present on the surface after c-DNA functionalization of NH2-S4-PS40. While reaching high fluorescence readout, c9-DNA'-S4-PS40 and c15-DNA'-S4-PS40 yielded LODs of 10±5 amol $\mu L^{-1}$ and 100±20 amol $\mu L^{-1}$ as well as LOQs of 50±15 amol $\mu L^{-1}$ and 364±68 amol $\mu L^{-1}$, respectively. Due to the continued increase in fluorescence signal, the dynamic range cannot be estimated for DNA-S4-PS40. Although the assays with COOH-re-functionalized $NH_2$-coated S4-PS40 particles, i.e., with DNA-S4-PS40, and with native $NH_2$-coated S4-PS40 particles, i.e., with DNA'-S4-PS40, show comparable sensitivities, the main problem in case of DNA'-S4-PS40 is the higher amount of nonspecific binding of t-DNA strands, increasing the number of false positives from ca. 2% for DNA-S4-PS40 to ca. 18% for DNA'-S4-PS40 (see Table 6). Lower nonspecific binding for DNA-S4-PS40 is presumably due to a better shielding of the net positively charged residual amino groups when they are first converted with small succinic anhydride molecules into a net negatively charged carboxylic acid-expressing surface than when 5'-COOH-c-DNA is directly coupled to NH2-S4-PS40. The enhanced electrostatic interaction between nonreacted $NH_2$ (as —$NH_3^+$) groups of DNA'-S4-PS40 and the phosphate groups on the DNA backbone presumably leads to enhanced nonspecific binding.

Figure 22:
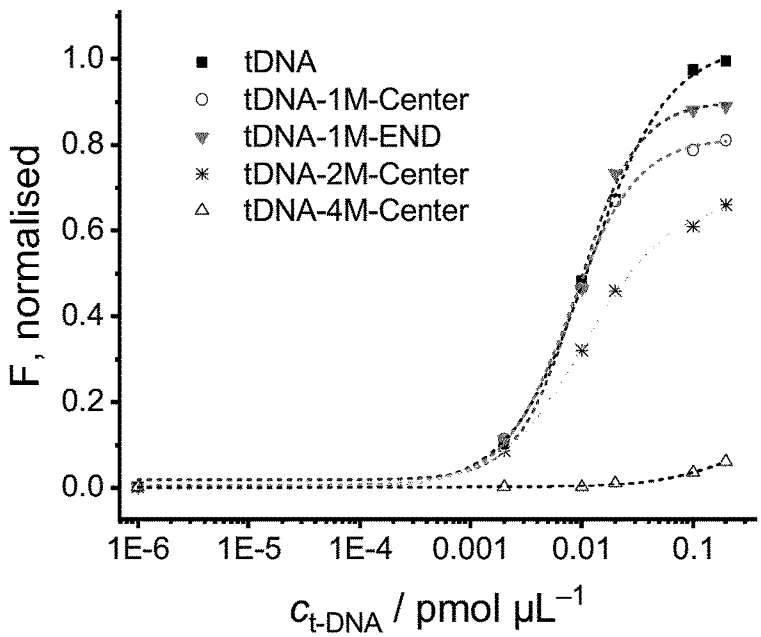
FIG. 22 shows the fluorescence normalized to the maximum fluorescence intensity in presence of t-DNA of the different core-shell particles (DNA-S4-PS40) as a function of the amount of added t-DNA containing different mismatches.

Regarding sequence specificity, control experiments with single, double and quadruple base mismatches revealed that DNA-S4-PS40 showed a comparable performance as has been reported before in the literature, only determined by nucleic acid hybridization behavior based on pairing vs. mismatching (see below, Table 5, FIG. 22).

False Positive Studies

The influence of false positives on the detection performance was assessed by carrying out the assays in the same way as described for the regular binding studies only using particles that were not functionalized with c-DNA. Thus, the fluorescence generated in the presence of 2 pmol $\mu L^{-1}$ t-DNA was compared for COOH-S4-PS40 and NH2-S4-PS40 with that found for DNA-S4-PS40 and DNA'-S4-PS40; S4-PS40 was also included for comparison, exemplifying the influence of patches or areas of unmodified silica surface (Table 7). It is evident from Table 7 that especially terminal amino modification of the silica surface has a dramatic effect on non-specific binding. Whereas low non-specific binding was observed for S-PS40 and COOH-S4-PS40, NH2-S4-PS40 showed a pronounced signal despite the lack of c-DNA on its surface. Considering these values, contributions of non-specific binding of t-DNA of ca. 2% and 18% were found for the materials DNA-S4-PS40 and c15-DNA'-S4-PS40, respectively. These values were calculated by estimation of the percentage of fluorescence in presence of t-DNA of the respective precursor materials COOH-S4-PS40 and NH2-S4-PS40 as a function of the total fluorescence of materials DNA-S4-PS40 and c15-DNA'-S4-PS40.

TABLE 7

False-positive signals in DNA assays with different particles; $F_o$ = fluorescence signal in presence of t-DNA, $F_B$ = fluorescence signal in absence of t-DNA.

| Sample | $F_o$/cts | $F_B$/cts |
|---|---|---|
| S4-PS40 | 712 ± 64 | 133 ± 11 |
| COOH-S4-PS40 | 663 ± 59 | 149 ± 14 |
| DNA-S4-PS40 | 33322 ± 864 | 111 ± 9 |
| NH2-S4-PS40 | 94859 ± 8537 | 433 ± 38 |
| c18DNA'-S4-PS40 | 533047 ± 8505 | 146 ± 13 |

Selectivity Studies

To assess the selectivity of the core-shell particles ("sensory beads"), experiments with five different t-DNA strands containing one or more mismatches were carried out. Identical c-DNA was employed for all the measurements, i.e., particles DNA-S4-PS40. The mismatched t-DNAs were chosen as to one mismatch at the end of the oligonucleotide strand, one mismatch in the middle of the strand, two mismatches and four mismatches in the strand, see Table 5 for the respective sequences. FIG. 22 reveals that the highest signal is achieved when no mismatch is present on the t-DNA, followed by the strands with one terminal mismatch and the t-DNA with one mismatch in the middle. As would be expect, two mismatches lead to signals that are significantly lower while t-DNA with four mismatches is hardly bound at all. These experiments demonstrate that the selectivity of the newly developed method is comparable to others in the field and simply determined by nucleic acid hybridization behavior based on pairing vs. mismatching.

Multiplex Assay with Human Papilloma Virus (HPV) DNA Sequences

Considering the results obtained, several particles carrying different c-DNA strands were prepared with the aim to perform a multiplexed detection. The single-stranded target DNAs selected here were corresponding to certain specific fragments of four different types of Human Papilloma Viruses, HPV 6, 11, 16 and 18. For that purpose, in a first step, the precursor polystyrene PS40 core was doped with four different concentrations of a red BODIPY dye (see Examples), with the aim to fluorescently code the particles. This coding yielded a family of PS particles, termed, from highest to lowest concentration of dye, PS40a, PS40b, PS40c and PS40d. The BODIPY dye emits in the red region with an emission maximum centered at 650 nm, well-separated from the green fluorescence of the FAM label of the t-DNA strand, allowing for convenient readout in two different fluorescence channels of the flow cytometer.

Figure 11:
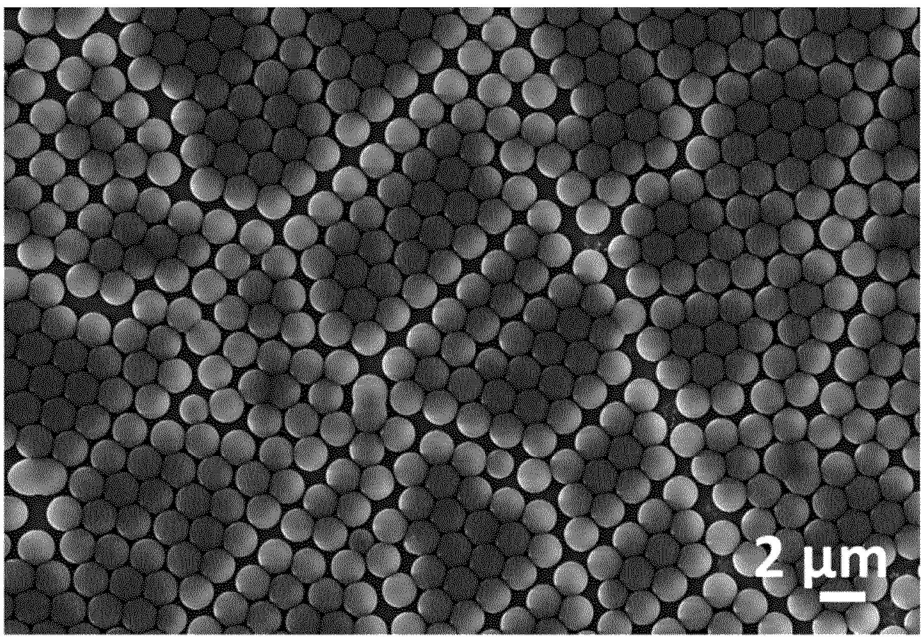
FIG. 11 is a SEM overview micrograph of a 1:1:1:1 mixture of doped PS40a-d particles (mixture of different particle cohorts).

The dye was incorporated into the particles by swelling the cores with THE Particles PS40a-d were then analyzed by SEM. As can be seen in FIG. 11, the doping procedure had no detrimental effect on the monodispersity of the particles. The small number of fused particles was found to be irrelevant for the flow cytometric assay. Moreover, separation by a particle sorting clean-up is easily possible.

In a first multiplexing experiment, a 4:1 assay format was performed, in which a mixture of the four types of particles containing four different DNA strands for the determination of different Human Papilloma Virus species (HPV)-DNA [HPV6]-S4-PS40a, DNA[HPV11]-S4-PS40b, DNA [HPV18]-S4-PS40c and DNA[HPV16]-S4-PS40d with xy=6, 11, 18, 16; where "xy" corresponds to Human Papilloma Virus (HPV) class 6, 11, 18 or 16 and a-d corresponds to the different dye concentration of dye doped on the polystyrene core-were mixed in a solution containing only one type of HPV t-DNA, i.e., t-DNA[HPV16].

Figure 12:
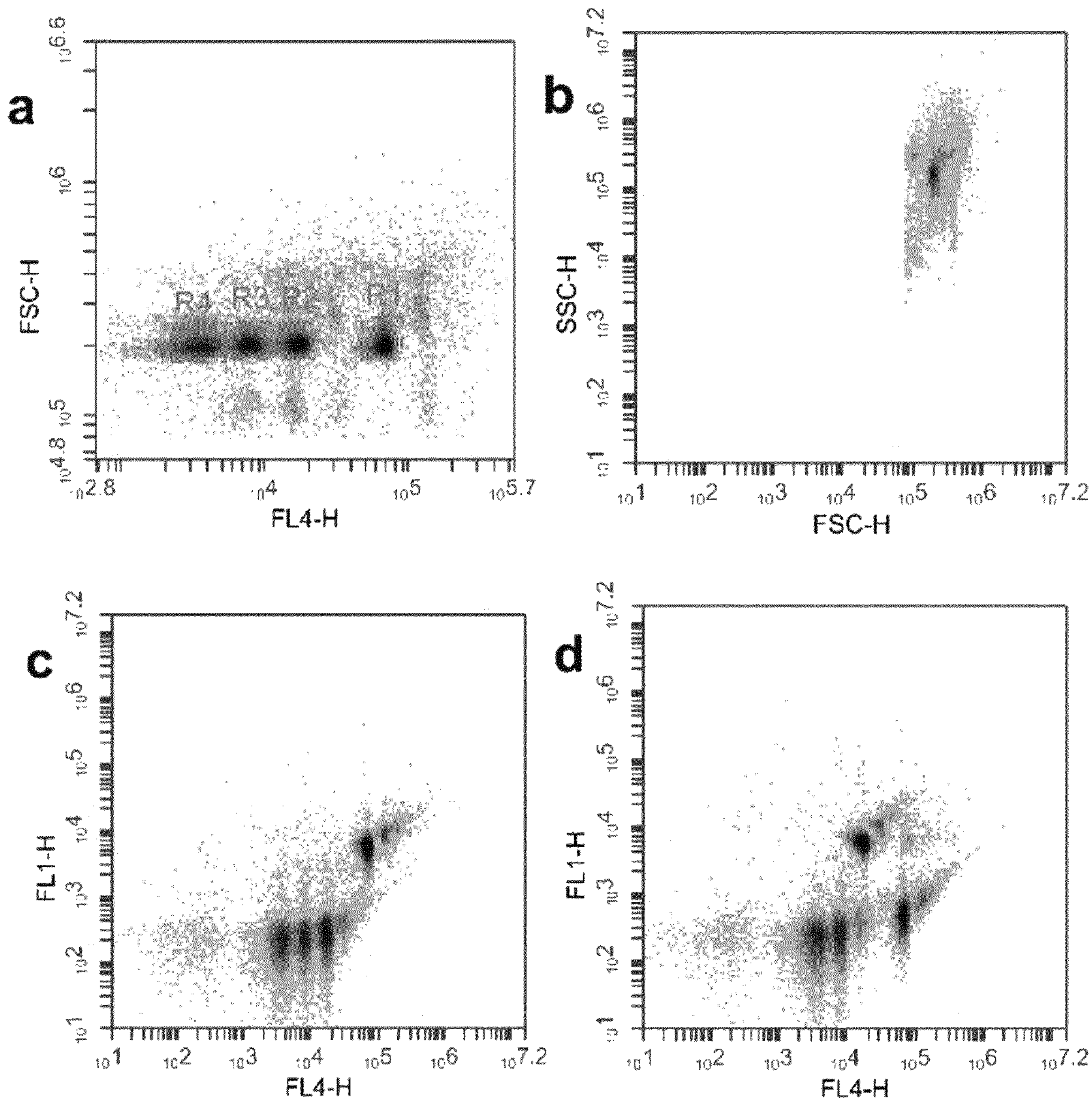
FIG. 12 shows dot plots of a) FSC vs FL4 for particles DNA[HPVxy]-S4-PS40a-d, (with xy=6, 11, 18, 16; where "xy" corresponds to Human Papilloma Virus (HPV) class 6, 11, 18 or 16 and a-d corresponds to the different dye concentration of dye doped on the polystyrene core); b) the corresponding scatter plot; c) multiplexing with dye-doped particles in presence of t-DNA[HPV16]; and d) multiplexing with t-DNA[HPV 11] as indicated by enhanced fluorescence.

FIG. 12*a* shows a dot plot of FSC vs FL4, the channel in which the red fluorescence of the BODIPY dye FL4 was recorded, and FIG. 12*b* shows the corresponding forward vs. sideward scattering plot, revealing that the mixture of particles has the same scattering properties and, hence, the same size independent of the amount of dye loaded into the core. FIG. 12*a* also shows that the four particles are all clearly separated from each other when coded with the four different concentrations of the BODIPY dye employed here. With this spatial separation, a correlation of signals between FL1 and FL4 was possible for the operation of the multiplexed assay. Four different regions of interest were assigned and gated using R1-R4, corresponding to the signals generated by DNA-S4-PS40a-d.

As can be seen in FIG. 12*c*, in which the fluorescence of bound FAM-labeled t-DNA, recorded in channel FL1, is plotted vs the fluorescence of the coding dye (FL4), four distinct populations of particles can be discerned, in which only one of them, DNA[HPV16]-S4-PS40d, shows a stronger signal in FL1, corresponding to the presence of the single added analyte t-DNA[HPV16]. FIG. 12*d* shows a similar experiment, only that now t-DNA[HPV 11] was added, leading to an increased FL1 signal only for DNA [HPV11]-S4-PS40b. This type of dot plot allowed already for a straightforward qualitative multiplexed analysis.

Figure 23:
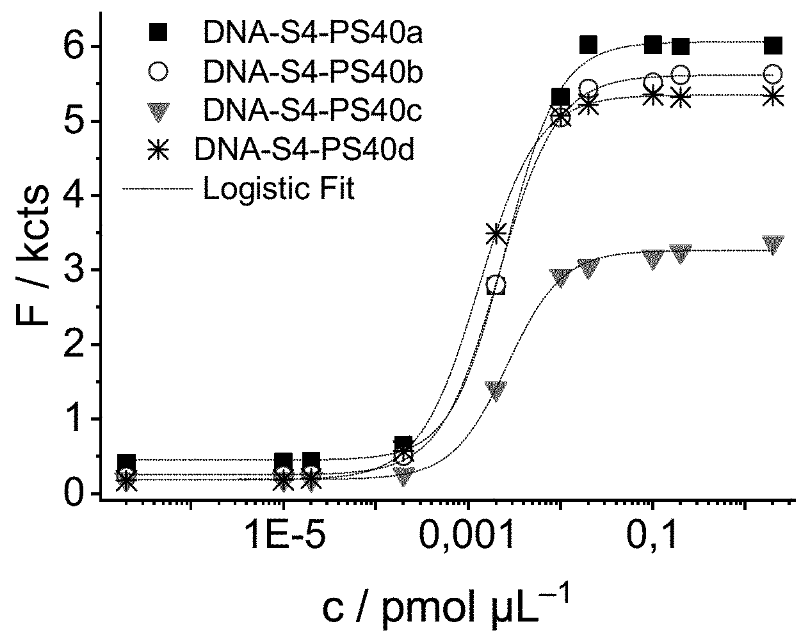
FIG. 23 shows the fluorescence of hybridized DNA [HPVxy]-S4-PS40a-d using the complementary t-DNA [HPVxy] strand in a 1:1 (top) and a 4:1 (bottom) assay format. "xy" corresponds to HPV class 6, 11, 18 or 16, whereas a-d corresponds to the different dye concentration of dye doped on the polystyrene core.
Figure 23:
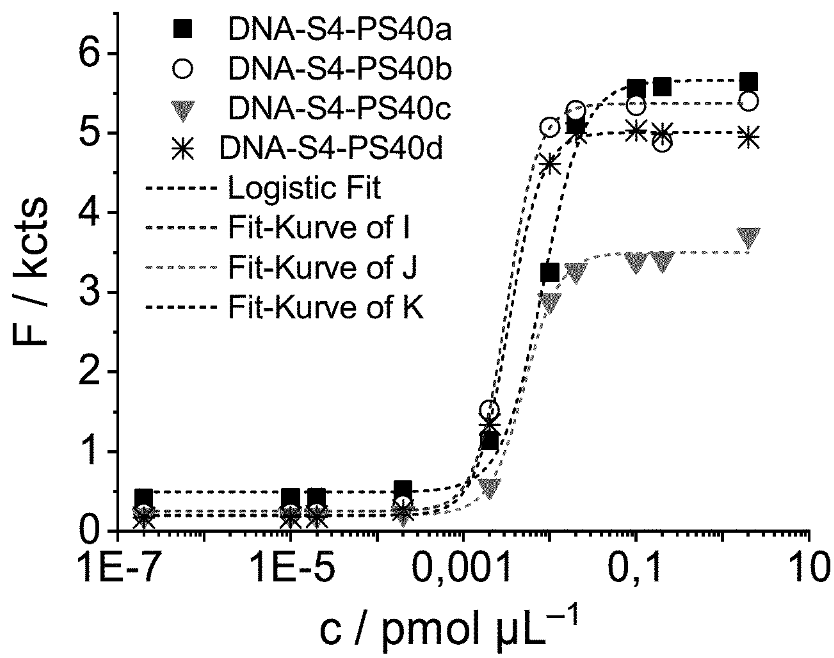

To perform a quantitative analysis of the sample, the dot plots have to be gated with the corresponding signal areas R1-R4. Using this approach, a direct readout of the fluorescence signal in FL1 for only one type of DNA[HPVxy]-S4-PS40z (with xy=6, 11, 18, 16 and z=a-d) was possible. This enables an assessment of the cross-reactivity of a 4:1 multiplex assay in relation to an individual 1:1 assay, using one type of particle and the corresponding type of t-DNA. FIG. 23 shows the calibration curves of the respective 1:1 and 4:1 assays (see below). It is evident that rather similar responses were obtained for both types of assays, only that the LOD is slightly higher for the multiplex than for the single-plex approach (LODs of ca. 50 amol $\mu L^{-1}$). In general, however, the multiplexed assay shows excellent sensitivity and negligible cross-reactivity, see FIGS. 12 *c,d*, impressively showing the performance features of the particles.

Figure 13:
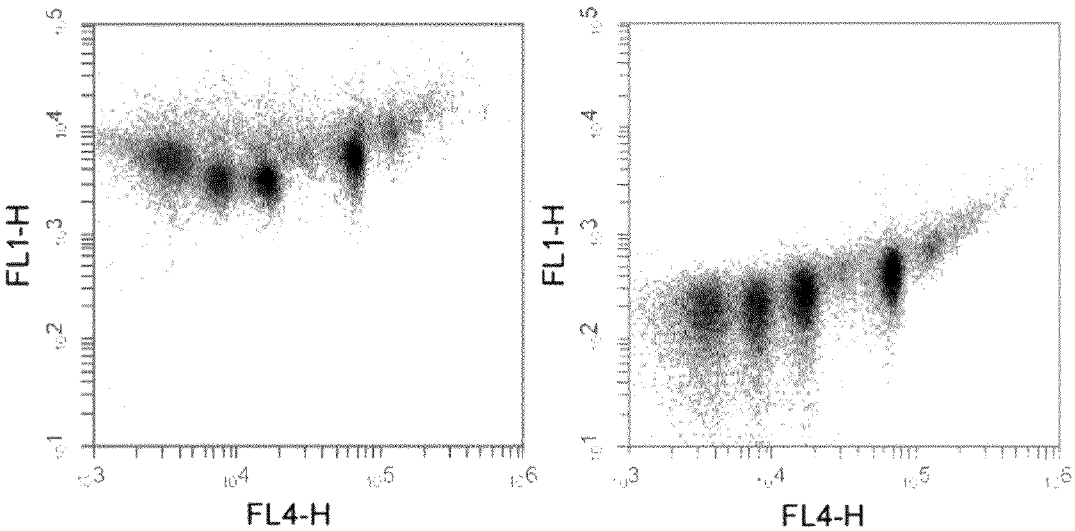
FIG. 13 is a dot plot of a 4:4 multiplex assay with DNA[HPVxy]-S4-PS40a-d in the presence of different concentrations of t-DNA[HPVxy] (left) and in absence of t-DNA (control; right). "xy" corresponds to HPV class 6, 11, 18 or 16, whereas a-d corresponds to the different dye concentration of dye doped into the polystyrene core.

In a further step, samples were spiked with arbitrary amounts of DNA (in the working range of the assay; see Table 8). FIG. 13 shows the corresponding 4:4-type multiplex assay with all the different types of DNA[HPVxy]-S4-PS40a-d in the presence of all four types of t-DNA[HPVxy] (left panel) and the blank control (right panel) after having carried out the hybridization protocol mentioned above. A clear change in the signal is visible when the complementary strands are present. From the blank controls it is obvious that the background signal in FL1 in FIG. 13 (right) is in all cases rather similar and considerably low. Using the calibration curves of FIG. 23, it was possible to determine the amounts of spiked DNA in a single experimental run (See Table 8 below).

TABLE 8

Data obtained in the 4:4 multiplex experiment

| Particles | Amount of t-DNA added to 4:4 assay/pmol $\mu L^{-1}$ | Calculated amount of t-DNA (i.e. recovery)/pmol $\mu L^{-1}$ |
|---|---|---|
| DNA-S4-PS40a | 0.1 | 0.13 ± 0.05 |
| DNA-S4-PS40b | 0.01 | 0.018 ± 0.01 |
| DNA-S4-PS40c | 0.002 | 0.02 ± 0.01 |
| DNA-S4-PS40d | 2 | 2.0 ± 0.15 |

As can be seen in Table 8, good recoveries were found in all the cases except for the smallest amount of DNA used here, 0.002 pmol $\mu L^{-1}$ of t-DNA[HPV11], which could not be reliably quantified. Since HPV sequences are sufficiently different to avoid significant base-pairing/hybridization analyte cross-talk (see Table 5 for the corresponding sequences), the increase of signal at lower concentrations is ascribed to nonspecific binding of small amounts of t-DNA to the residual amino/ammonium groups on the surface of the particles, because conversion of amino groups with succinic anhydride cannot be expected to be quantitative. Such an effect thus has a more pronounced impact at lower concentrations. Overall, the multiplexed assays were successful in proving that this type of doped polymer core/functionalized mesoporous shell particles can be used as a powerful tool in simple single-particle assay formats, competing well with reported approaches (e.g. Spiro, A. et al. Appl. Environ. Microbiol. 2000, 66 (10), 4258-4265; Thiollet, S. et al, J. Fluoresc. 2012, 22 (2), 685-697) that usually rely on larger core-shell particles (3-6 μm) and utilize molecular beacons or longer strands, while offering higher simplicity, versatility and modularity. The use of smaller beads such as the core-shell particles reported here entails faster reaction kinetics and allows for small reaction volumes, increasing throughput and being more economical.

As demonstrated, two different kinds of mesoporous shells were successfully synthesized on different polystyrene cores (PS10 and PS40). Both types of shells were functionalized to allow the coupling of DNA on their surface. With these particles, DNA assay were carried out to determine the particles' performance in fluorometric DNA analysis by a single-particle analysis method such as flow cytometry. When comparing the MCM-41- and the SBA-15-type shells it was found that the SBA-15-type shells have a higher surface area, larger pores and allowed to reach distinctly lower limits of detection.

Furthermore, the shells using PS40 particles were more reproducible and had a better dispersity than the shells using PS10 particles. The best performance was observed for DNA-S4-PS40, in which an SBA-15-type shell was synthesized under neutral conditions and with $MgSO_4$ as ionic mediator, arriving at an LOD of 4±2 amol $\mu L^{-1}$ that is ca. 2 orders of magnitude lower in comparison with nonporous shells (DNA-N-PS40) and still ca. 50-fold lower compared to MCM-41-type shells with narrower pores (DNA-M-PS40). It was found that for particles with such a high active surface area, choice of the grafting sequence is decisive as direct coupling of carboxylic acid-terminated c-DNA to aminated carrier particles (NH2-S4-PS40), resulting in DNA'-S4-PS40, yields also favorable sensitivities but suffers from much stronger nonspecific binding. Finally, the versatility of the particle platform was demonstrated by doping a red-fluorescent dye at different concentrations into the polystyrene core before shelling (deposition of the shell) and secondary functionalization and using a small library of such coded beads (i.e. core-shell particles) for the multiplexed determination of four different types of HPV DNA. It is important to note that the doping step, although involving organic solvents and a swelling of the core particles, has no detrimental effect on the further coating through convergent shell growth and the subsequent functionalization workflow.

Thus, the multiplexed assay impressively illustrates the potential that the mesoporous particles possess for simple yet sensitive bioassays. Although the primary motivation of this research was the development of a sensitive bioanalytical platform, one can easily imagine that such core-shell particles are also promising for other applications such as drug delivery or sensing which rely on the unique features of mesoporous silica shells.

Beacon-S-PS Sensory Particle Platform

Figure 43:
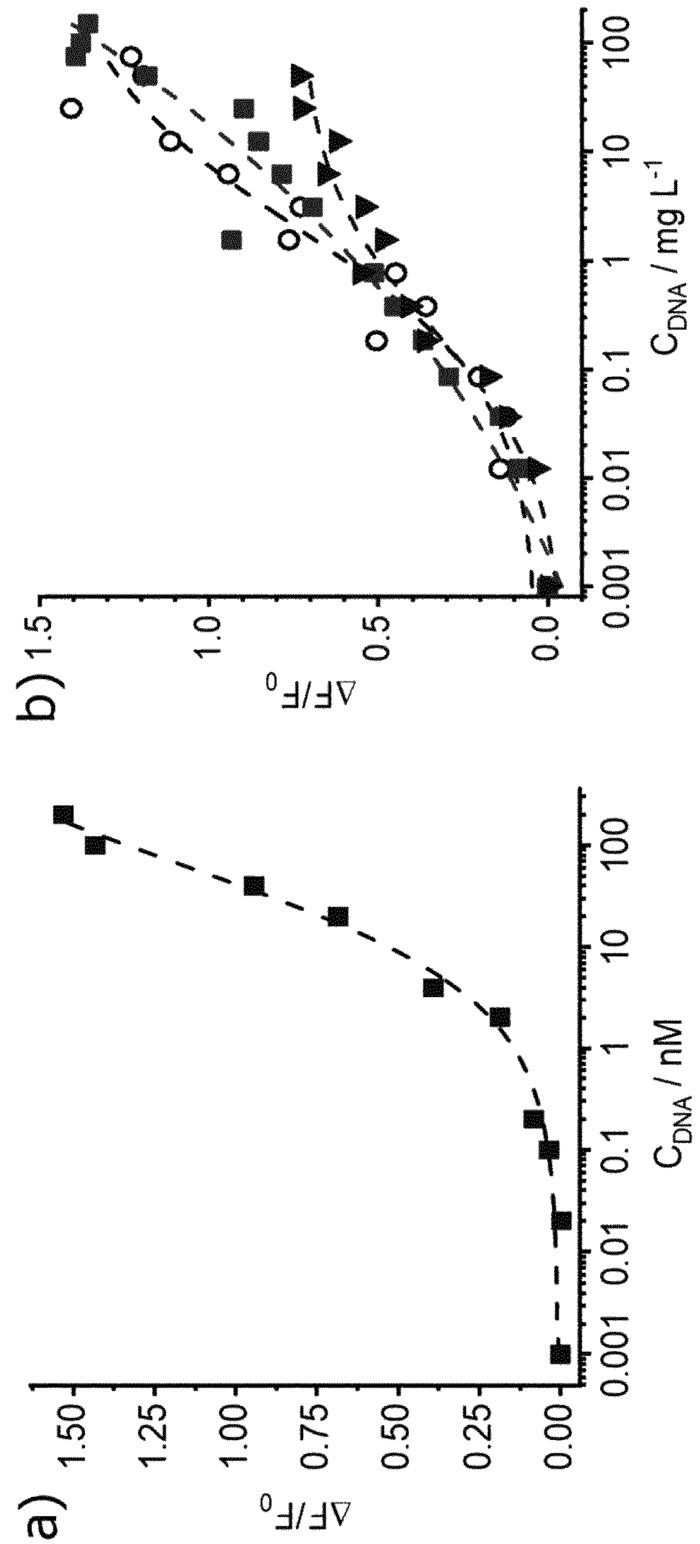
FIG. 43. (a) Emission intensity at 520 nm ($\lambda_{exc}$=490 nm) of Beacon-S-PS in hybridization buffer upon addition of cDNA. (b) Emission intensity at 520 nm ($\lambda_{exc}$=490 nm) of Beacon-PS in hybridization buffer vs. concentration of genomic DNA from various microorganisms: the fungus *C. tropicalis* ATCC 750 (solid squares), and the bacteria *P. aeruginosa* ATCC 15442 (open circles) and *F. johnsoniae* ATCC 17061 (solid triangles).

Beacon-S-PS (20 μL of a 0.25‰ stock solution) were suspended in 2 mL of hybridization buffer and increasing amounts of cDNA were added. After mixing for 5 min, the emission intensity was measured and, in both cases, the signal increased with increasing concentrations of cDNA (FIG. 43*a*), yielding a LOD of 0.26±0.07 nM and LOQ of 0.6±0.1 nM. In addition, more realistic samples were also measured with Beacon-S-PS in suspension assays, targeting standard genomic DNA extracts from the bacteria *P. aeruginosa* strain ATCC 15442 and *F. johnsoniae* strain ATCC 17061 as well as the fungus *C. tropicalis* strain ATCC 750. While control measurements with pre-heated buffer did not yield any changes in fluorescence, the addition of a pre-heated genomic DNA solution to a Beacon-S-PS suspension in hybridization buffer produced a fluorescence increase as a function of the concentration of genomic DNA. As shown in FIG. 43*b*, all the extracts resulted in similar responses of the sensory material at low concentrations. Saturation was then only observed for *F. johnsoniae* at genomic DNA concentrations of >10 mg $L^{-1}$. The Beacon-S-PS response towards genomic DNA from a mouse was also evaluated, and no response was observed. LODs of 20 13, 43±15 and 48±20 μg $L^{-1}$ and LOQs of 60±25, 120±20 and 50±20 μg $L^{-1}$ for genomic DNA of *C. tropicalis, P. aeruginosa* and *F. johnsoniae* were found, respectively. Such sensory particles would allow the direct detection of microbial contamination in aqueous extracts from diesel samples.

M-PS and S-PS as Potential Scaffold for Drug Release and Sensing Applications

Figure 44:
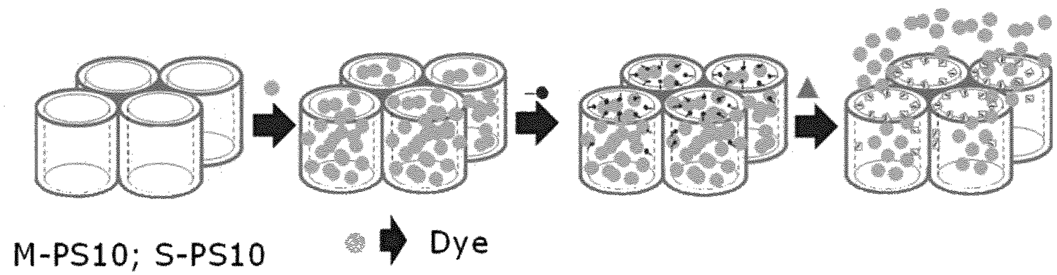
FIG. 44. Scheme showing the working principle of an embodiment comprising materials designed for controlled release applications upon pH change stimulus (pH-SRG-M-PS10 and pH-SRG-S-PS10) and also two different gated materials for sensing of Hg(II) (Hg-SRG-M-PS10) and penicillin (Pen-SRG-M-PS10).
Figure 44:
Figure 44:
Figure 44:
Figure 44:
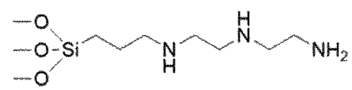
Figure 44:
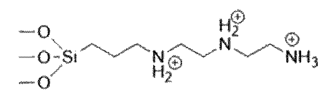
Figure 44:
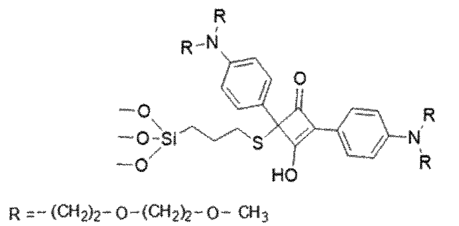
Figure 44:
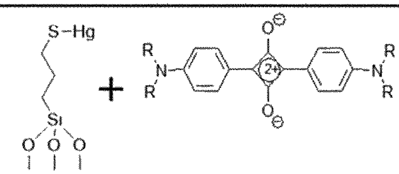

To demonstrate the applicability of the scaffolds M-PS and S-PS for drug release and sensing applications via gated indicator release, materials designed for the gated release upon a pH stimulus (pH-SRG-M-PS10 and pH-SRG-S-PS10) and gated materials for the sensing of Hg(Hg-SRG- M-PS10) and penicillin (Pen-SRG-M-PS10) were prepared. FIG. 44 shows a scheme with the working principle of the materials prepared. As there are some drug release applications where a fast release from the carrier is important, e.g. in radiotherapy, corresponding release systems can be attractive in this field, beside sensing/analytical applications.

Hg-SRG-M-PS10

Figure 45:
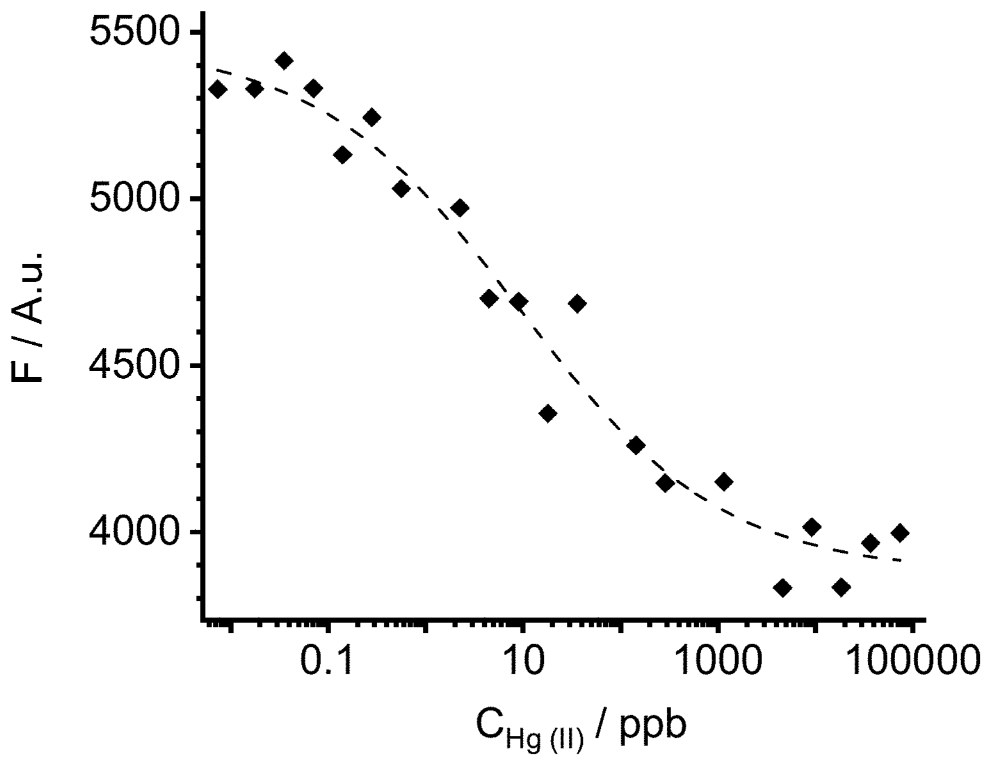
FIG. 45. Emission intensity measured with a cytometer at 533 nm ($\lambda_{exc}$=488 nm) of Hg-SRG-M-PS10 in PBS buffer (0.02% w/v) upon addition of different concentrations of Hg(II).

The working principle of squaraine-gated mesoporous materials for the detection of Hg(II) is as follows. Hg(II) cations are able to react with the thiol-squaraine moiety anchored on the material, the thiol exemplifying the anchor molecule and the squaraine the pore-closing material, detaching the squaraine dye from the surface, allowing the opening of the pores with the subsequent release of dye (see FIG. 44). Hg-SRG-M-PS10 was thus evaluated against different concentrations of Hg(II) in PBS buffer (80 mM; pH 7.5) on a cytometer. For that purpose, a stock solution of 600 μg of Hg-SRG-M-PS10 in 3 mL of PBS was prepared, having a concentration of 0.2% (w/v). Fractions of 20 μL of the stock solution of the Hg-SRG-M-PS10 particles were mixed with fractions of 180 μL of PBS containing different concentrations of Hg(II), ranging from 80 ppm to 0.02 ppb. Control experiments with PBS buffer in absence of Hg(II) were also performed. Suspensions were mixed 5 min at 800 rpm and afterwards fluorescence of the suspensions was evaluated with the FL1 channel of the cytometer (green channel, 533/30 nm; $\lambda_{exc}$=488 nm). As can be seen in FIG. 45, a fluorescence decrease as a function of the concentration of Hg(II) was observed, ascribed to the release of the dye from the particles, retaining less dye in the particles after the analytical reaction, reaching an LOD of 0.4±0.2 ppb.

pH-SRG-M-PS10 and pH-SRG-S-PS10

Figure 46:
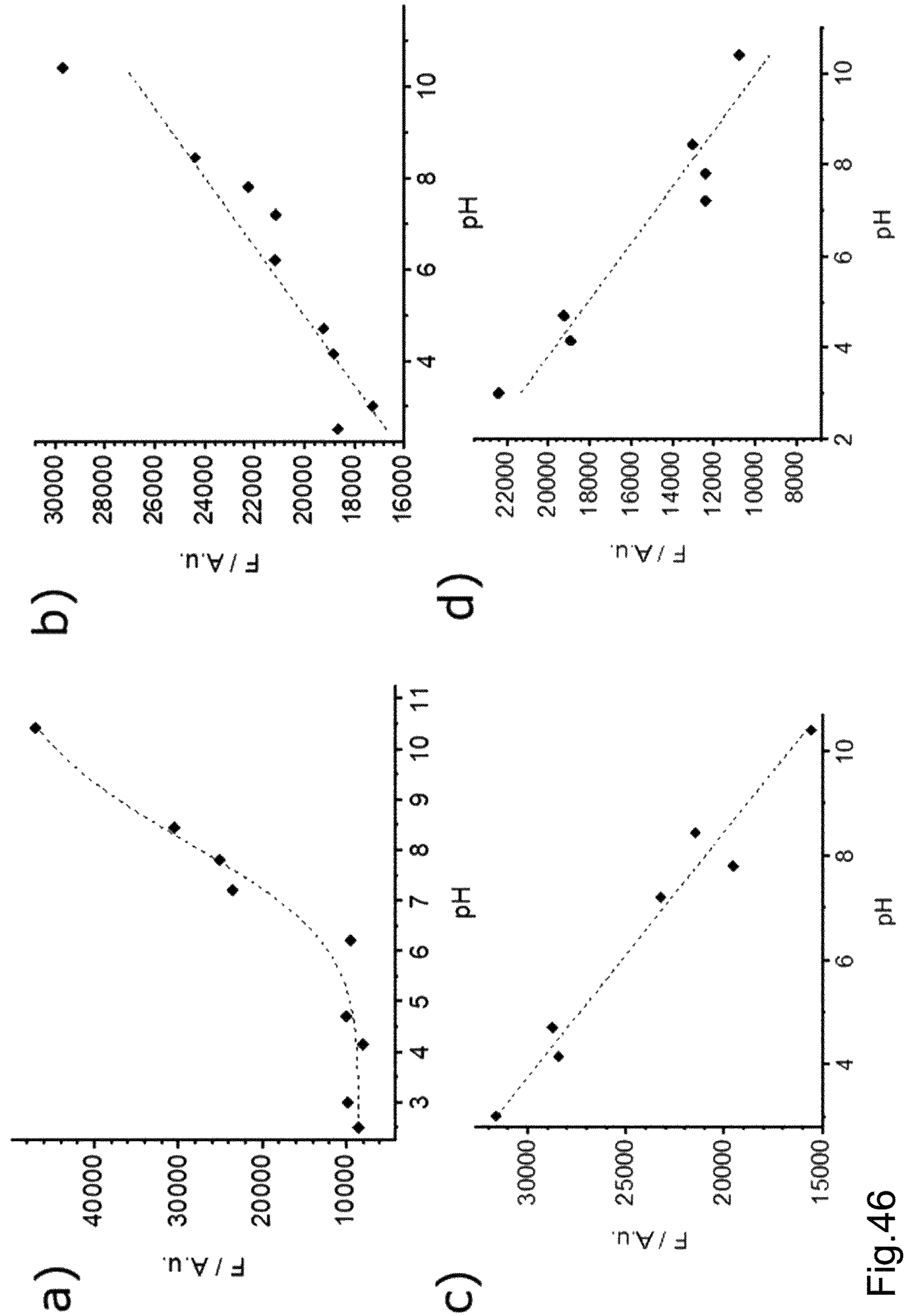
FIG. 46. a)-b). Emission intensity at 550 nm ($\lambda_{exc}$=520 nm) measured with a fluorometer for the materials a) SRG-M-PS10 and b) pH-SRG-S-PS10 as a function of the pH. c)-d) are the corresponding emission intensities measured with a cytometer at 533 nm ($\lambda_{exc}$=488 nm) of c) SRG-M-PS10 and d) pH-SRG-S-PS10 as a function of the pH.

The working principle of pH-modulated gated mesoporous materials is as follows. The materials contain linear tetraamino alkyl moieties as anchor molecules on the surface, which are protonated at acidic pH values, allowing an efficient blockage of the pores due to electrostatic repulsion of the ammonium chains. With an increase of the pH, a partial deprotonation of the ammonium groups is observed, allowing partial release of a dye from the pores (see scheme 44 for more details). The performance of pH-SRG-M-PS10 and pH-SRG-S-PS10 as a function of the pH was evaluated in water on a cytometer and also on a fluorometer. For that purpose, stock solutions of 300 μg of pH-SRG-M-PS10 and pH-SRG-S-PS10 in 300 μL of PBS were prepared, having a concentration of 1% (w/v). Fractions of 20 μL of the stock solution of the pH-SRG-M-PS10 and pH-SRG-S-PS10 particles were mixed with several fractions of 300 μL of water at different pH, ranging from pH 3 until pH 4. Suspensions were mixed 5 min at 800 rpm and afterwards suspensions were centrifuged (10000 rpm; 2 min), with the aim to collect 100 μL of the corresponding supernatants and measure the fluorescence of dye release on the fluorometer at 550 nm ($\lambda_{ex}$ 520 nm). FIG. 46*a* and FIG. 46*b* show the fluorescence enhancement as a function of the pH in both materials pH-SRG-M-PS10 and pH-SRG-S-PS10, respectively, in agreement with the deprotonation of the amino groups anchored on the surface of the sensing materials pH-SRG-M-PS10 and pH-SRG-S-PS10. We can observe how the release in case of pH-SRG-M-PS10 strongly increases at basic pH, whereas the release from pH-SRG-S-PS10 increased linearly. This could be ascribed to the different pore sizes of the materials, having a more efficient inhibition with smaller pores.

Additionally, the fluorescence of the dyes that remained in the unopened pores of the particles was measured with the cytometer. For that purpose, centrifuged materials pH-SRG-M-PS10 and pH-SRG-S-PS10 were resuspended again with the remaining supernatants and suspensions were measured on the cytometer, measuring fluorescence of the suspensions with the FL1 channel of the cytometer (green channel, 533/30 nm; $\lambda_{exc}$=488 nm). As can be seen in FIG. 46*c* and FIG. 46*d*, the fluorescence decreased as a function of increasing pH for the materials pH-SRG-M-PS10 and pH-SRG-S-PS10, respectively, ascribed to the release of the dye from the particles.

Pen-SRG-M-PS10

Figure 47:
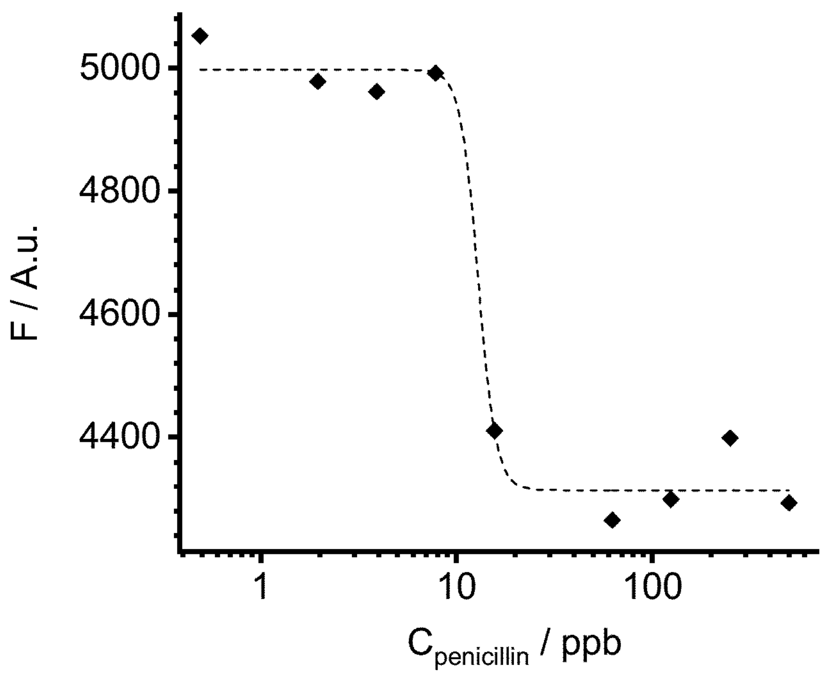
FIG. 47. Emission intensity measured with a cytometer at 533 nm ($\lambda_{exc}$=488 nm) of Pen-SRG-M-PS10 in PBS buffer (0.02% w/v) upon addition of different concentrations of penicillin.

The working principle of an aptamer-gated mesoporous material is according to: Oroval, M. et al., Chem. Comm. 2013, 49 (48), 5480-5482 as follows. The aptamer Pen-COOH 5'-COOH-C10-TTT TCT GAA TTG GAT CTC TCT TCT TGA GCG ATC TCC ACA-3' for the detection of penicillin was anchored on the SRG-M-PS10 particles, with the aim to observe a release of the dye from the pores of Pen-SRG-M-PS10 in presence of penicillin due to the reassembly of the aptamer after the formation of the complex between the penicillin and the aptamer. Performance of Pen-SRG-M-PS10 against penicillin was evaluated in phosphate buffer (10 mM; pH 8) containing 5 mM of $MgCl_2$ on the cytometer. For that purpose, fractions of 30 μL of the stock solution (0.2% w/v) of Pen-SRG-M-PS10 were mixed with fractions of 300 μL of PBS containing different concentrations of penicillin, ranging from 500 ppb to 0.05 ppb. Control experiments with buffer in absence of penicillin were also performed. Suspensions were mixed 5 min at 800 rpm and afterwards fluorescence of the suspensions was evaluated with the FL1 channel of the cytometer (green channel, 533/30 nm; $\lambda_{exc}$=488 nm). As can be seen in FIG. 47 fluorescence decrease as a function of the concentration of penicillin was observed, ascribed to the release of the dye from the particles, having as consequence lower dye retained on the particles, reaching an LOD of 9.5±1 ppb.

ABBREVIATIONS

ACVA=4,4'-azobis(4-cyanovaleric acid)
APTES=3-(aminopropyl)triethoxysilane
CTAB=cetyltrimethylammonium bromide
c-DNA=capture DNA;
ELISA=enzyme-linked immunosorbent assay;
EDC=1-ethyl-3-(3-dimethylaminopropyl)carbodiimide;
FAM=6-carboxyfluorescein;
FFT=Fast Fourier Transform
FL1-H=Fluorescence registered on the cytometer; band pass filter at 533/30 nm.
FL4-H=Fluorescence registered on the cytometer; band pass filter at 670/20 nm.
FSC, FSC-H=forward scattering;
HPV=Human Papilloma virus;
LOQ=limit of quantification;
LOD=limit of detection;
MilliQ water=highly deionized ultrapure water, resistivity >18 MΩ·cm
MCM-41=Mobile Composition of Matter No. 41;
MES=2-(N-morpholino)ethanesulfonic acid;
PEO=poly(ethylene oxide);
Pluronic 123=triblock copolymer of PEO, PPO und PEO;
PPO=poly(propylene oxide);
PS=polystyrene;
PVP=poly(vinylpyrrolidone);
RAD=Radius of rotor used for centrifugation;
RPM=revolutions/rotations/rounds per minute;
SBA-15=Santa Barbara Amorphous Material No. 15;
SDS=sodium dodecyl sulfate;

S-NHS=N-hydroxysulfosuccinimide;
SSC, SSC-H=sideward scattering;
SEM=scanning electron microscopy;
STEM=scanning transmission electron microscopy;
TEM=transmission electron microscopy;
THF=tetrahydrofuran
t-DNA=target-DNA;
TEOS=tetraethyl orthosilicate;
TRIS=tris(hydroxymethyl)aminomethane The present invention has been explained with reference to various illustrative embodiments and examples. These embodiments and examples are not intended to restrict the scope of the invention, which is defined by the claims and their equivalents. As is apparent to one skilled in the art, the embodiments described herein can be implemented in various ways without departing from the scope of what is invented. Various features, aspects, and functions described in each of the embodiments can be combined with features, aspects, and functions as described in other embodiments.

The invention claimed is:

1. A core-shell particle comprising an organic polymer core which is completely covered by a first inorganic oxide shell, wherein the first inorganic oxide shell comprises a silica (SiO2), an alumina (Al2O3), or a titania (TiO2);

wherein the first inorganic oxide shell comprises a layer of a magnetic material which is disposed directly on the polymer core;

further comprising a mesoporous second inorganic oxide shell, wherein the mesoporous second inorganic oxide shell covers the first inorganic oxide shell;

wherein the mesoporous second inorganic oxide shell comprises silica (SiO2), alumina (Al2O3), or a titania (TiO2).

2. The core-shell particle according to claim 1, wherein the polymer core comprises an organic fluorescent dye which is either covalently coupled to the polymer core or at least one of its constituents or sterically entrapped within a polymer network comprising the organic polymer core, and wherein the first inorganic oxide shell and the mesoporous second inorganic oxide shell insulates the polymer core and the magnetic material from an external environment;

wherein a type and/or concentration of the dye within the polymer core is adjusted such as to allow particle coding, which enables multiplexing assays comprising cohorts of different core-shell particles.

3. The core-shell particle according to claim 1, wherein the magnetic material comprises nanoparticles, the nanoparticles comprising at least one of: Fe, Fe2O3, Fe3O4, Co, Ni, Gd, Dy, CrO2, MnAs, MnBi, EuO, NiO/Fe, and Y3Fe5O12.

4. The core-shell particle according to claim 1, wherein the inorganic oxide of the first inorganic oxide shell and of the mesoporous second inorganic oxide shell is silica.

5. The core-shell particle according to claim 1, wherein the mesoporous second inorganic shell comprises a silica and is selected from one of:

2-dimensional structures, i.e. cylindrical pores, or 3-dimensional structures, i.e. cage-type structures, a MCM-41 type material, comprising pores with diameters of about 2.5±0.5 nm;

a SBA-type material, comprising pores with diameters of about 13±7 nm;

a UVM-7 type material comprising a bimodal distribution of the pores with diameters of about 2±0.5 nm (first mode) and of about 20±10 nm (second mode);

a HMS type material comprising pores with diameters of about 3±1 nm;

a FSM-16 type material comprising pores with diameters of about 3±1 nm;

- a FDU-15 type material comprising pores with diameters of about 7±3 nm;
- a COK-12 type material comprising pores with diameters of about 7±2 nm;
- a structure with cubic symmetry such as MSU-X comprising pores with diameters of about 4±2 nm;
- a structure with cubic symmetry such as MSU-H comprising pores with diameters of about 3±1 nm;
- a MCM-48 type material comprising pores with diameters of about 4±1.5 nm;
- a SBA-16 type material comprising pores with diameters of about 10±5 nm;
- a FDU-12 type material comprising pores with diameters of about 15±5 nm;
- a KIT-5 type material comprising pores with diameters of about 9±5 nm; and
- a cage-type mesocaged solid selected from the group consisting of FDU-1 (Imm), SBA-1 (Pmn) and AMS-8 (Fdm), each comprising spherical or ellipsoidal cages that are connected 3-dimensionally by smaller cage-connecting windows.

6. The core-shell particle according to claim 1, wherein pores of the mesoporous second inorganic oxide shell contain an indicator or a recognition unit grafted to an inner pore surface and/or to an outer pore surface;

wherein the indicator is selected from: a fluorescent dye, an electrochemically active substance, a redox-active substance, and an electrochemiluminescently active substance;

wherein the recognition unit is selected from: a short nucleic acid oligomer which is able to pair with a corresponding nucleic acid sequence sought for;

wherein the indicator, the oligonucleotide and the hapten are adapted to bind and/or to indicate an analyte or a labeled analyte, and wherein the analyte is selected from a metal ion, an inorganic anion, a sugar, a hormone, a drug, a pesticide, a toxin, a chemical warfare agent, a DNA strand, and a RNA strand.

7. The core-shell particle according to claim 1, wherein the mesoporous second inorganic oxide shell comprises an anchor molecule grafted to an outer pore surface and/or to an inner pore surface; and (a) wherein the anchor molecule is selected from an oligonucleotide, a hapten, a cyclodextrin, a calixarene, a curcubituril, a cavitand, a crown ether, a pillararene, an organic thiol, a peptide, and an organic oligoamine; and wherein the anchor molecule is adapted to bind the pore-closing material;

or (b) wherein the anchor molecule is selected from an oligoamine, a photochromic molecule, and a thermoresponsive molecule; and wherein the anchor molecule is adapted to swell/de-swell upon interaction with an external stimulus selected from protons, light and temperature.

8. The core-shell particle according to claim 1, wherein the pores contain a reporter, the reporter being selected from: a dye, an electrochemically active substance, a redox-active substance or an electrochemiluminescently active substance, wherein the dye is selected from: a colored dye, a fluorescent dye, a chemiluminescent dye, and an electrochemiluminescent dye;

and wherein the pores are closed by a pore-closing material which is adapted to specifically bind an analyte, and/or wherein the pores are either opened upon specifically binding the analyte by the pore-closing material or upon specifically binding the analyte by the anchor molecule.

9. The core-shell particle according to claim 8, wherein the pore closing material is selected either from: an antibody, a Fab or F(ab')2 fragment of an antibody, an aptamer—wherein an aptamer is considered to comprise a synthetic oligonucleotide or a synthetic peptide which are able to specifically bind an analyte, protein A, protein G, avidin, streptavidin, biotin, a carbohydrate binding molecule, a lectin, an enzyme, an affinity ligand, a nucleic acid oligomer able to bind a specific analyte or electrostatically bind as a polyanion to a polycationically decorated pore surface, a molecule which is able to react with an organic thiol, and a molecule or material that can swell/de-swell or change its conformation in the presence/absence of analyte species, e.g., protons, or in response to a stimulus, e.g., light or temperature;

or wherein the pore-closing material is selected from: a nanoparticle comprising of gold or silver, a carbon nanodot or a quantum dot or semiconductor nanocrystal that has a diameter between 2 nm and 25 nm, chosen so that it matches the diameter of the pore of the mesoporous material, and being decorated with an antibody, a Fab or F(ab')2 fragment of an antibody, an aptamer, a protein A, a protein G, an avidin, streptavidin, a biotin, a carbohydrate binding molecule, a lectin, an enzyme, an affinity ligand, a nucleic acid oligomer which is able to pair with a corresponding sequence sought for or able to bind a specific analyte, a molecule which is able to react with an organic thiol, and a molecule that can bind to a cyclodextrin, a calixarene, a curcubituril, a cavitand, a crown ether, a pillararene, and an organic thiol.

10. The core-shell particle according to claim 8, wherein the pore closing material is anchored at or close to pore openings of the mesoporous second inorganic oxide shell by a molecule selected from: a hapten, an oligonucleotide, a cyclodextrin, a calixarene, a curcubituril, a cavitand, a crown ether, a pillararene, a peptide, an organic thiol, and an organic oligoamine.

11. A method for producing the core-shell particle according to claim 1, comprising:

providing a core comprising an organic polymer material;

depositing a first layer comprising a magnetic material on the core;

I producing a first inorganic oxide shell comprising a silica (SiO2), an alumina (Al2O3), or a titania (TiO2) directly on the layer comprising the magnetic material and on a surface of the polymer core which is not covered by the layer comprising the magnetic material, so that the silica, the alumina and the titania are covering the magnetic layer completely as a closed shell; and producing a mesoporous second inorganic oxide shell, wherein the mesoporous second inorganic oxide shell covers the first inorganic oxide shell; and wherein the mesoporous second inorganic oxide shell comprises silica (SiO2), alumina (Al2O3), or titania (TiO2);

wherein providing the core comprising the organic polymer material comprises polymerizing a monomer in a presence of a polyvinylpyrrolidone, and wherein depositing the first inorganic oxide shell and depositing the mesoporous second inorganic oxide shell comprises generating inorganic oxide nanoparticles from an inorganic oxide precursor in a presence of a polyvinylpyrrolidone, wherein the polyvinylpyrrolidone has a median molecular weight of between 7.000 to 40.000 Dalton; and wherein the monomer comprises styrene or a derivative of styrene comprising two polymerizable groups, and the organic polymer core comprises a spherical polystyrene particle which is decorated at its surface with PVP chains, which during depositing the first inorganic oxide shell are covered with a convergently grown shell comprising the inorganic oxide as convergently overgrown nanoparticles.

12. The method according to claim 11, wherein depositing the second inorganic oxide shell comprises applying a micelle forming templating agent which is selected from a micelle forming surfactant and a micelle forming block-copolymer and, in addition to the micelle forming templating agent, applying a structure-directing mediator salt, selected from NaCl and MgSO4;

wherein the templating agent is selected from CTAB and Pluronic 123, and wherein a pore expander is used during depositing the second inorganic oxide shell; and wherein the used pore expander comprises a micelle swelling agent and is selected from an alkane comprising one of a hexane, a heptane, an octane, a nonane, a decane; from N,N-dimethylhexadecylamine; from 1,3,5-trimethylbenzene; from triisopropylbenzene; from xylene; and from tetrapropoxysilane.

13. The method according to claim 11, further comprising:

depositing and/or coupling inside and/or outside the pores a reporter, wherein the reporter is selected from: a dye, an electrochemically active substance, a redox-active substance, a fluorescent indicator or fluorescent molecular probe; or depositing and/or coupling inside and/or outside the pores a recognition unit, wherein the recognition unit is selected from: a short nucleic acid oligomer which is able to pair with a corresponding nucleic acid sequence sought for;

and comprising, if the reporter is deposited but not covalently coupled inside the pores:

closing the pores with a pore-closing material, wherein the pore closing material is adapted to specifically bind an analyte; or closing the pores with a pore-closing material, wherein the anchor molecule is adapted to specifically bind an analyte.

14. The method according to claim 13, further comprising:

grafting a molecule to a surface of the mesoporous second inorganic shell as an anchor molecule for the pore-closing material, wherein the anchor molecule is selected from: a hapten, a cyclodextrin, a calixarene, a curcubituril, a cavitand, a crown ether, a pillararene, a peptide, an oligonucleotide, an organic thiol, and an organic oligoamine.

15. The method according to claim 13, wherein the pore-closing material is selected from: a nanoparticle comprising of gold or silver, a carbon nanodot, a quantum dot, and a semiconductor nanocrystal, wherein a diameter of the nanoparticle is selected between 2 nm and 25 nm, and is adapted to match a median diameter of a pore of the mesoporous second inorganic shell, wherein the nanoparticle is carrying an antibody, a Fab or F(ab')2 fragment of an antibody, an aptamer, a protein A, a protein G, an avidin, a streptavidin, a biotin, a carbohydrate binding molecule, a lectin, an enzyme, an affinity ligand, a nucleic acid oligomer which is able to pair with a corresponding sequence sought for or able to bind a specific analyte, a molecule which is able to react with an organic thiol, and a molecule that can bind to a cyclodextrin, a calixarene, a curcubituril, a cavitand, a crown ether, a pillararene, and an organic thiol.

16. The method according to claim 13, wherein the pore-closing material is selected from: an antibody, a Fab or F(ab')2 fragment of an antibody, an aptamer, a protein A, a protein G, an avidin, a streptavidin, a biotin, a carbohydrate binding molecule, a lectin, an enzyme, an affinity ligand which is able to bind the analyte; from a nucleic acid oligomer able to bind a specific analyte or electrostatically bind as a polyanion to a polycationically decorated pore surface, and a molecule or material that can swell/de-swell in the presence/absence of analyte species, e.g., a proton, a light stimulus or a temperature stimulus.

17. The method according to claim 11, wherein if the corresponding inorganic oxide shell comprises silica, for producing the first inorganic oxide shell and/or the second mesoporous inorganic oxide shell as a precursor in a sol-gel process a silicon alkoxide is used which is selected from: Si(OCH3)4, Si(OC2H5)4, Si(O-nC3H7)4, Si(O-i-C3H7)4, Si(O-n-C4H9)4, and Si(O-i-C4H9)4.

18. The method according to claim 11, wherein if the corresponding inorganic oxide shell comprises alumina, for producing the first inorganic oxide shell and/or the second mesoporous inorganic oxide shell as a precursor in a sol-gel process an organic aluminum compound is used which is selected from: aluminum isopropoxide, aluminum chloride, or aluminum nitrate nonahydrate, and wherein if the corresponding inorganic oxide shell comprises titania, for producing the first inorganic oxide shell and/or the second mesoporous inorganic oxide shell as a precursor in a sol-gel process an organic titanium compound is used which is selected from: titanium tetraisopropoxide, titanium tetraisopropoxide (Ti[OCH(CH3)2]4) or titanium n-butoxide (Ti[OC4H9]4).

19. The method according to claim 11, wherein a pH value during producing the first and/or second inorganic shell is alkaline due to ammonia cations, and the micelle-forming templating agent is a surfactant selected from: a cationic alkyltrimethylammonium according to formula CnH2nTA+, wherein n=8-18, e.g. CTABr, CTACl; an anionic alkylsulfonate surfactant according to formula CnH2nSO32-, wherein n=12-18, with a cation selected from: Na+, K+, Ca2+, and Mg2; and an alkylphosphate surfactant according to formula CnH2nPO43-, wherein n=12-22, with a cation selected from Na+ and K+;

or wherein the pH value during producing the first and/or second inorganic shell is acidic, and the micelle-forming templating agent is selected from a pluronic;

or wherein the pH value during producing the first and/or second inorganic shell is neutral, and the templating agent is selected from a pluronic.

20. A method for detecting an analyte in a sample, comprising providing a core-shell particle according to claim 1;

wetting the particle with a sample comprising an unknown concentration of the analyte; and detecting a signal generated by recognition of a fluorescently labeled analyte by a recognition unit which is coupled to the mesoporous second inorganic shell; or detecting a signal generated by recognition of an analyte by a reporter which is coupled to the mesoporous second inorganic shell, wherein the reporter changes its color, fluorescence, electrochemically generated luminescence or redox behavior upon analyte binding; or detecting a signal generated by a reporter which is released from the mesoporous second inorganic oxide shell upon analyte recognition by a pore closing material, the method further comprising:

separating and/or counting particles which comprise either:

stepped fluorescence signals associated with a coding of the cores of the particles comprising different concentrations of a dye;

fluorescence signals appearing in different wavelength ranges associated with a coding of the cores of the particles comprising dyes with different spectral fluorescence properties; and/or fluorescence signals decaying with different fluorescence lifetimes associated with a coding of the cores of the particles comprising dyes with different fluorescence lifetimes.

* * * * *